United States Patent
Rey et al.

(10) Patent No.: US 10,511,168 B2
(45) Date of Patent: Dec. 17, 2019

(54) INTELLIGENT CURRENT LEAD DEVICE AND OPERATIONAL METHODS THEROF

(71) Applicants: Christopher Mark Rey, Knoxville, TN (US); Thomas James Tracy, Jr., Tallahassee, FL (US); Benjamin Scott Andrews, Tallahassee, FL (US)

(72) Inventors: Christopher Mark Rey, Knoxville, TN (US); Thomas James Tracy, Jr., Tallahassee, FL (US); Benjamin Scott Andrews, Tallahassee, FL (US)

( * ) Notice: Subject to any disclaimer, the term of this patent is extended or adjusted under 35 U.S.C. 154(b) by 934 days.

(21) Appl. No.: 15/082,215

(22) Filed: Mar. 28, 2016

(65) Prior Publication Data

US 2017/0025850 A1    Jan. 26, 2017

Related U.S. Application Data

(60) Provisional application No. 62/147,661, filed on Apr. 15, 2015.

(51) Int. Cl.
  *H02J 1/14* (2006.01)
  *H05K 7/20* (2006.01)
  (Continued)

(52) U.S. Cl.
  CPC .............. *H02J 1/14* (2013.01); *H01B 5/00* (2013.01); *H02J 3/14* (2013.01); *Y02E 40/60* (2013.01)

(58) Field of Classification Search
  CPC ...... H02J 1/14; H02J 3/14; H01B 5/00; Y02E 40/60
  (Continued)

(56) References Cited

U.S. PATENT DOCUMENTS

| 5,735,127 A | * | 4/1998 | Pfotenhauer | F25B 9/14 165/4 |
| 9,590,409 B2 | * | 3/2017 | Faulkner | H02G 1/08 |

(Continued)

FOREIGN PATENT DOCUMENTS

| EP | 0 843 323 | * | 5/1998 |
| GB | 2036469 | * | 6/1980 |

*Primary Examiner* — Timothy J Thompson
*Assistant Examiner* — Amol H Patel
(74) *Attorney, Agent, or Firm* — Luedeka Neely Group, P.C.; Rick Barnes

(57) ABSTRACT

An intelligent current lead device, its design, fabrication, and methods of operation are described in this disclosure. The intelligent current lead device described in this disclosure electrically and thermally connects and disconnects one or more power sources or loads operating at one temperature reservoir with one or more machines or devices operating at either the same or a different temperature reservoir. The intelligent current lead can operate in either an active mode or passive mode. The intelligent current lead device may incorporate the use of multiple types of diagnostic sensors and instrumentation, which can be monitored, interpreted, and analyzed. The program logic of the intelligent current lead may be used to interpret the data obtained from the diagnostic sensors and instrumentation in order to adjust/actuate/switch the current lead so as to optimize its configuration to respond to requirements of an electrical load that changes with time. There are many applications that the intelligent current lead can be used in conjunction with including but not limited to: superconducting magnets, transformers, power cables, energy storage, motors, generators, fault current limiters, circuit breakers, fusion magnets, accelerator magnets, MRI magnets, NMR magnets, induction heaters, magnetic separators, among other applications.

41 Claims, 18 Drawing Sheets

(51) Int. Cl.
*H02J 3/14* (2006.01)
*H01B 5/00* (2006.01)

(58) Field of Classification Search
USPC .......................................... 174/15.4; 324/318
See application file for complete search history.

(56) References Cited

U.S. PATENT DOCUMENTS

| | | | |
|---|---|---|---|
| 2007/0164615 A1* | 7/2007 | Lewis ...................... | H02K 9/22 310/12.18 |
| 2014/0028316 A1* | 1/2014 | Mine .................. | G01R 33/3815 324/318 |
| 2016/0211081 A1* | 7/2016 | Chacko ................ | H01G 9/0425 |

* cited by examiner

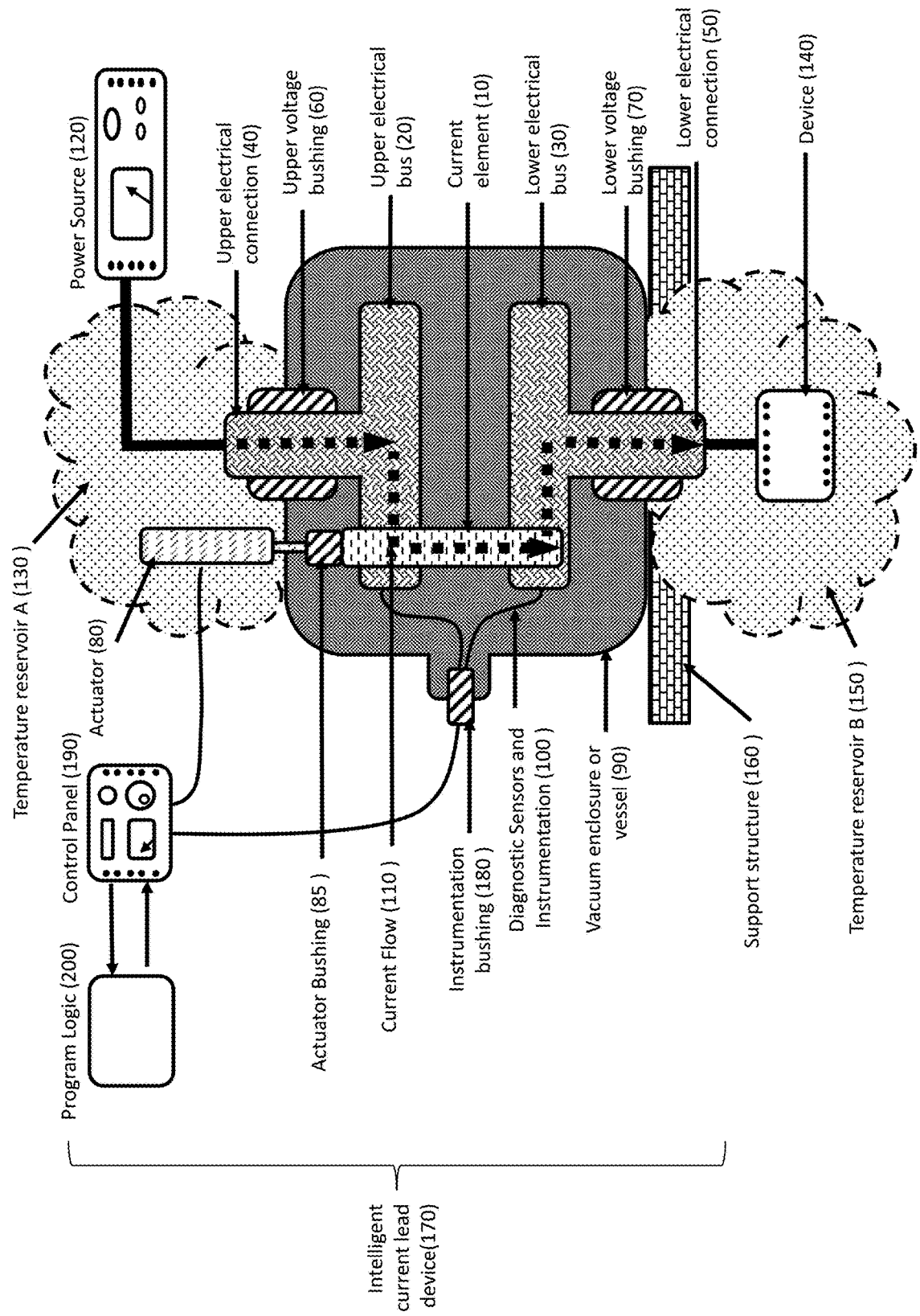
Figure 1 - Overview

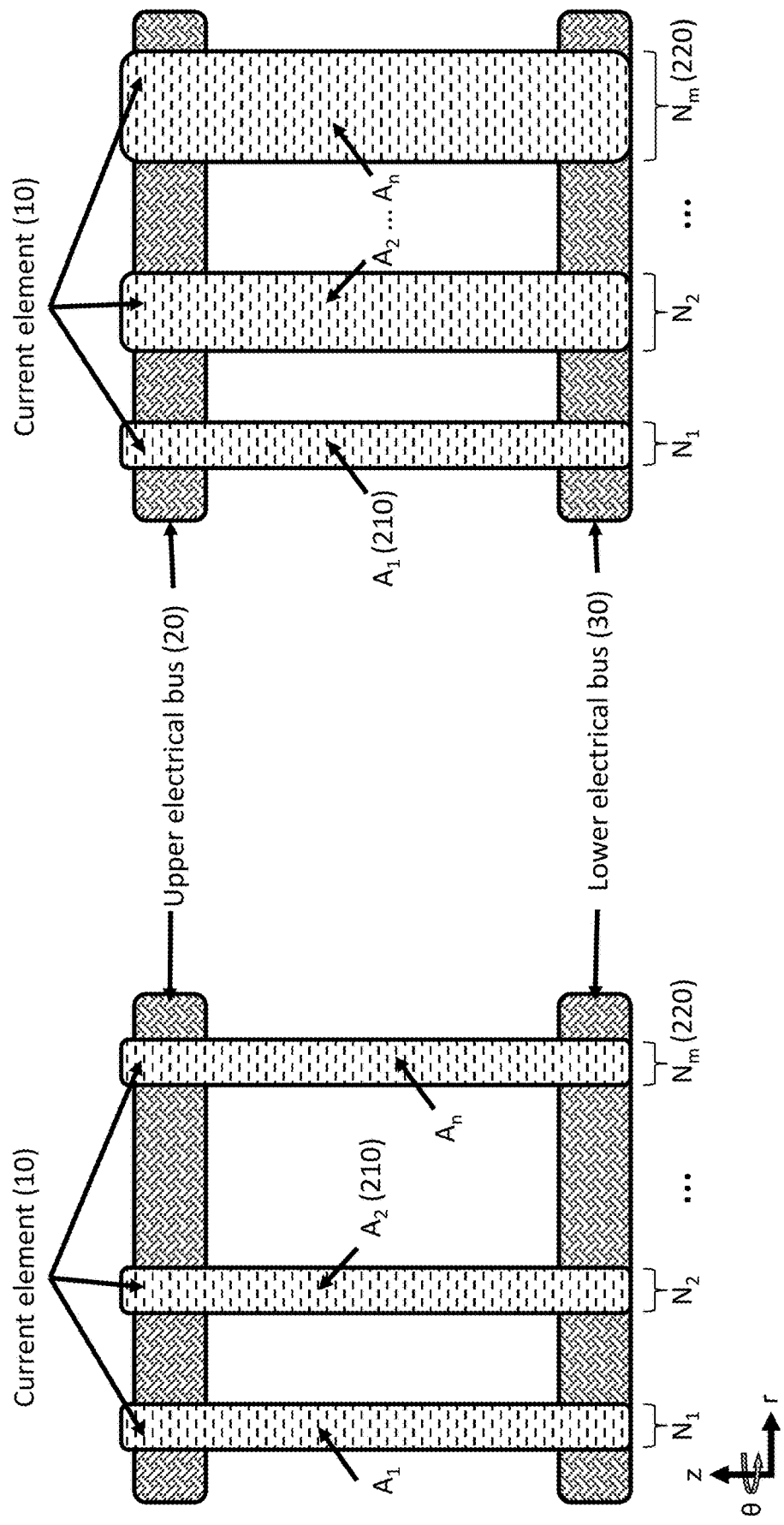
Figure 2 – Adjusting Area (210) – Discrete Current Elements (10) in parallel

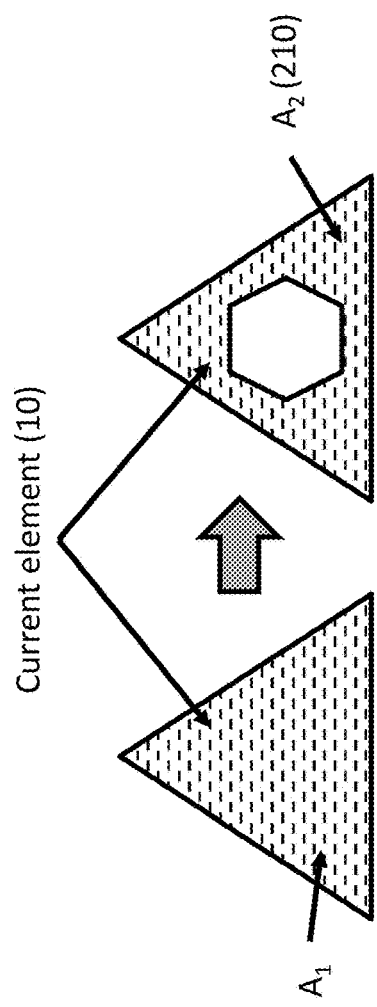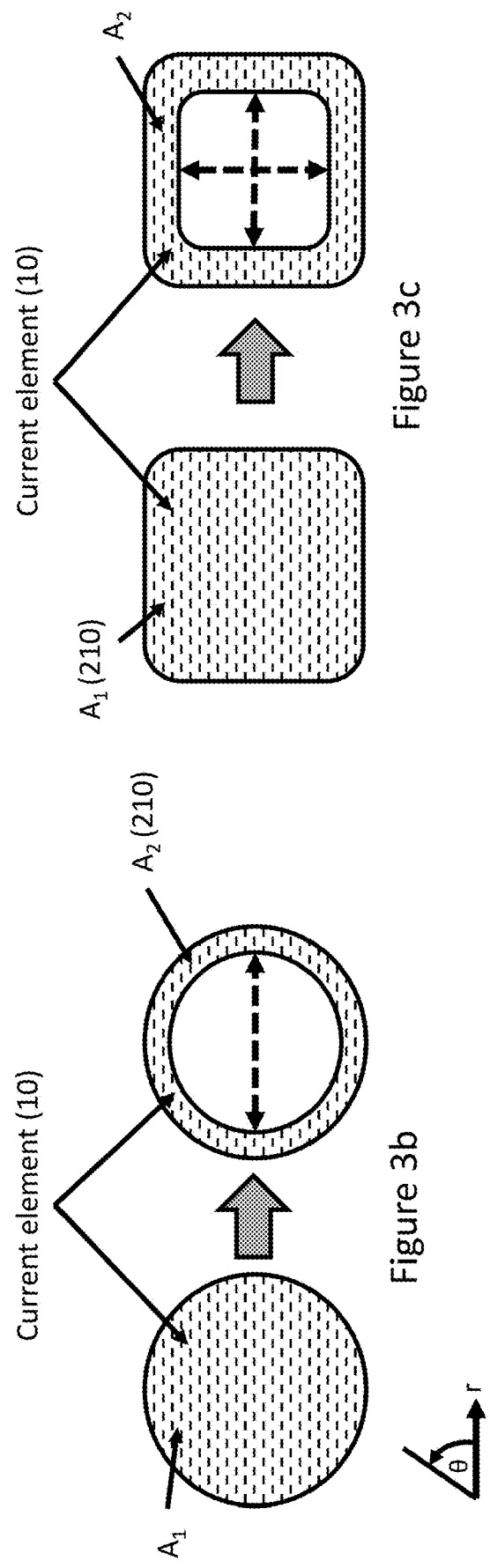
Figure 3 – Adjusting Area (210) – Within Current Element (10)

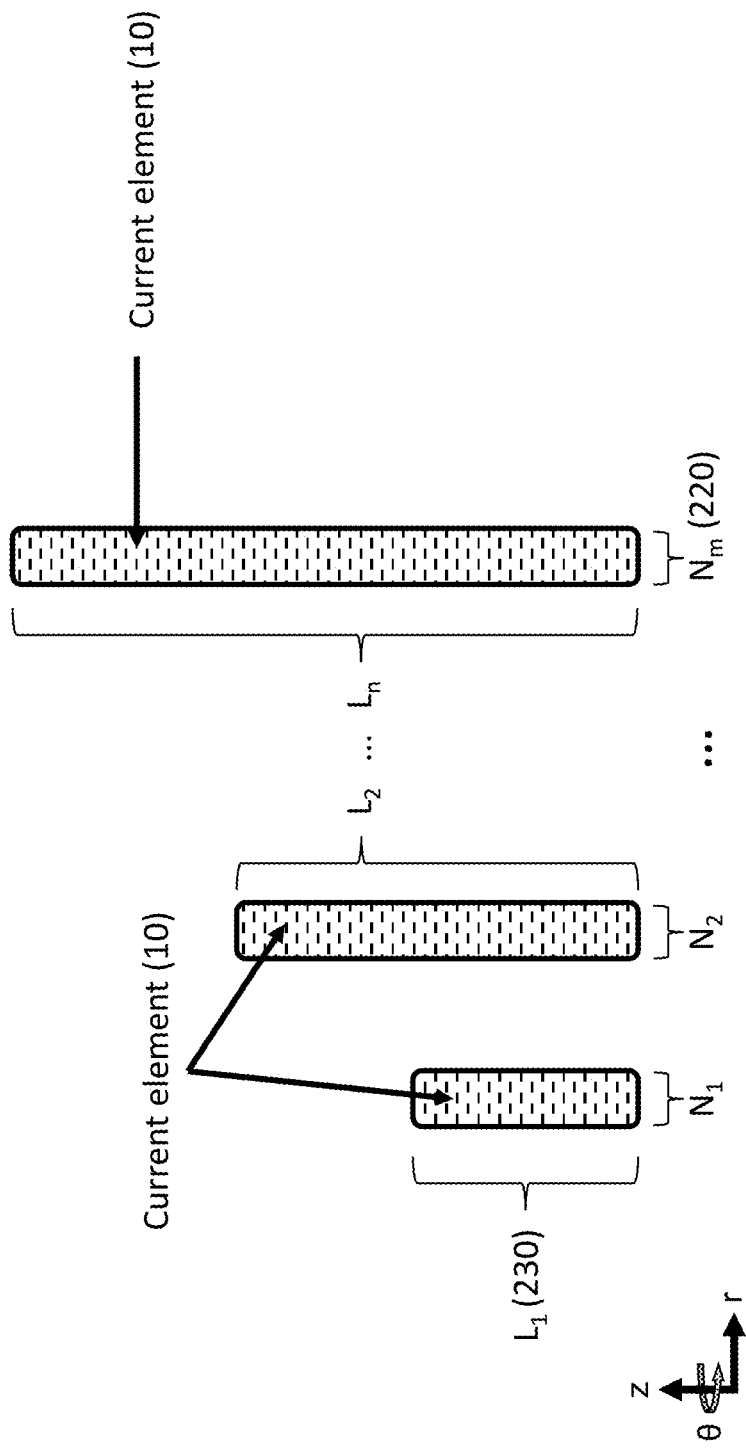
Figure 4 – Adjusting Length (230) – Discrete Current Elements (10), Same Material, in Parallel

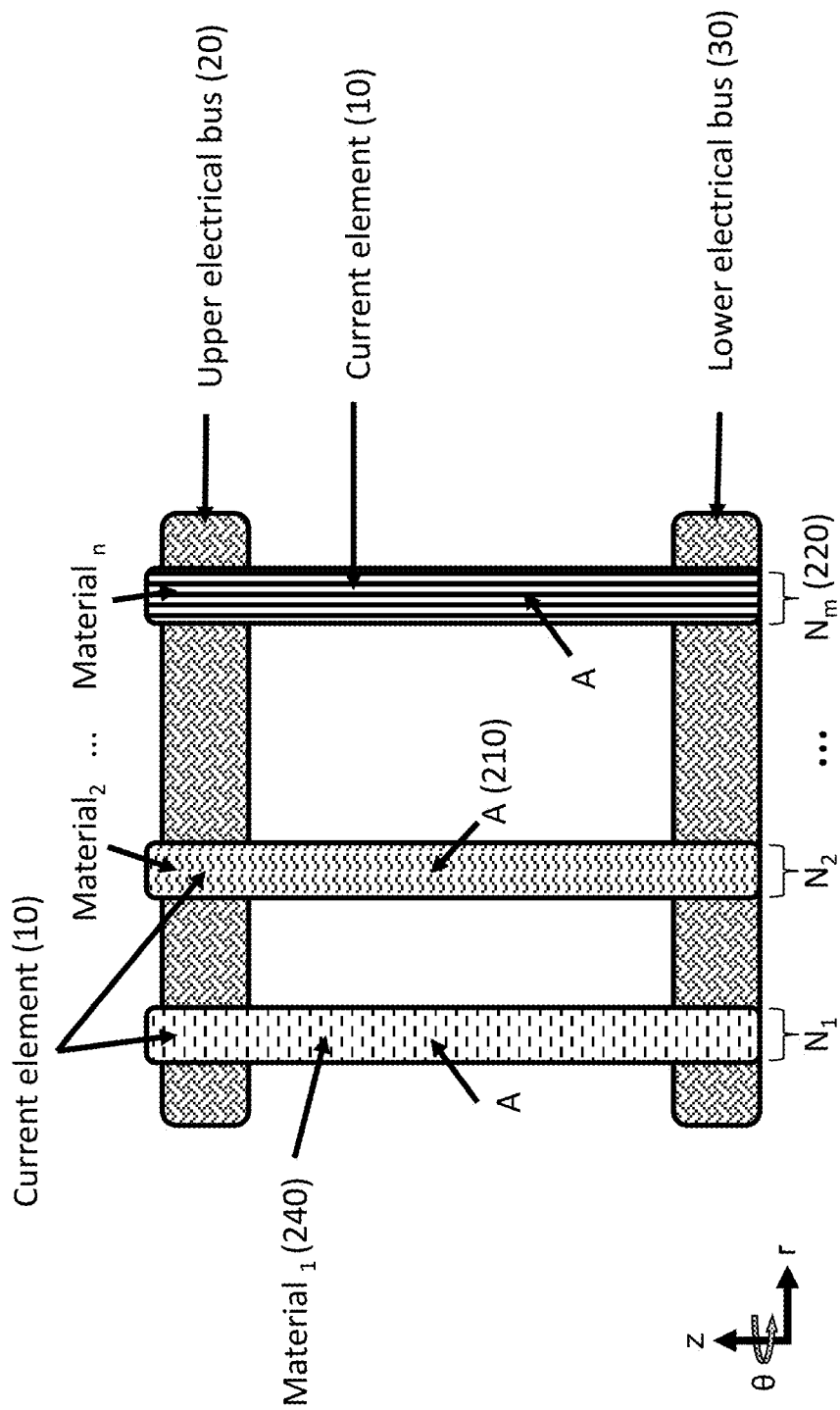
Figure 5 – Adjusting Material (240) – Discrete Current Elements (10) in parallel

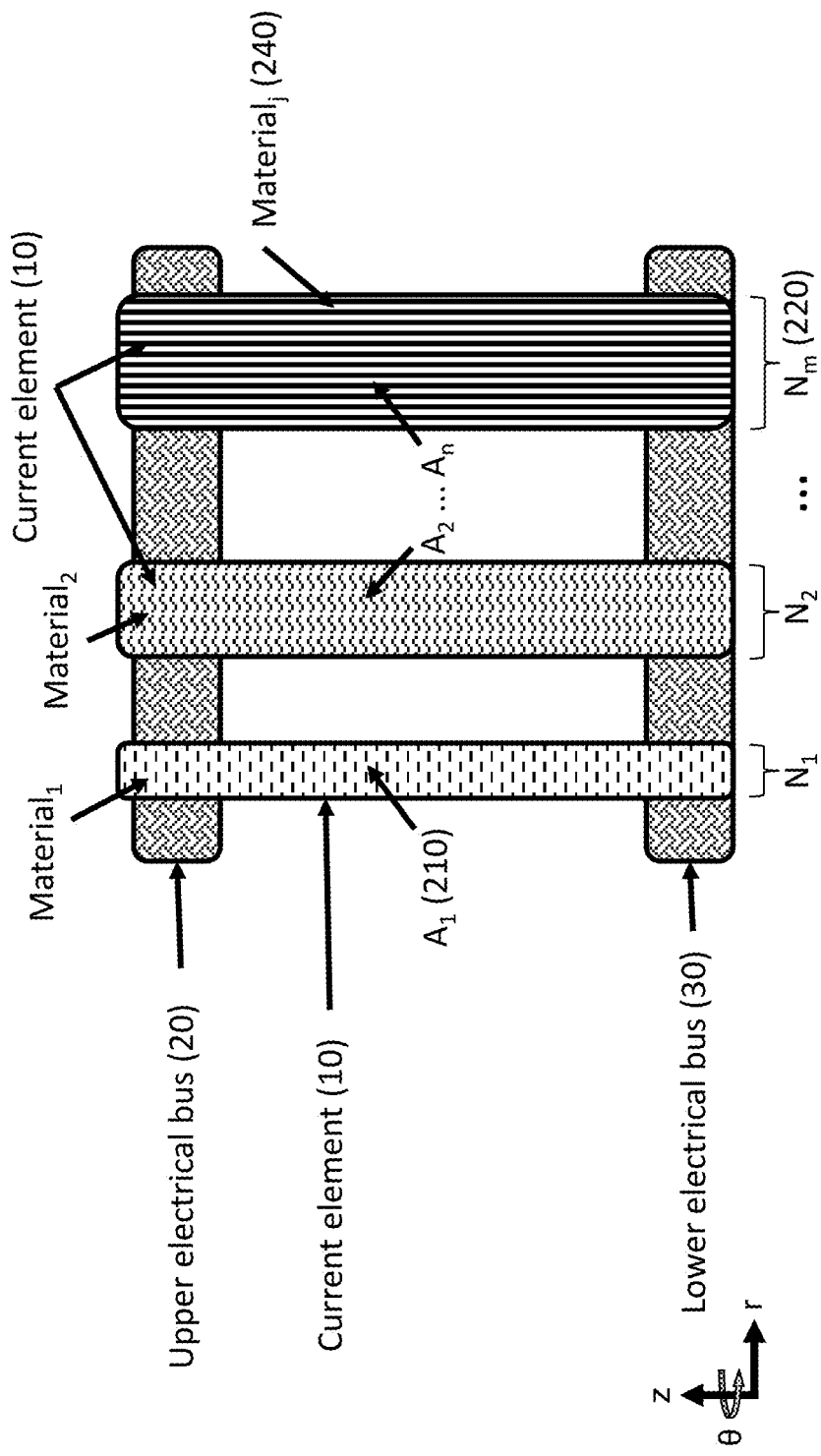
Figure 6 – Adjusting Combination Material (240) and Area (210) – Discrete Current Elements (10) in parallel

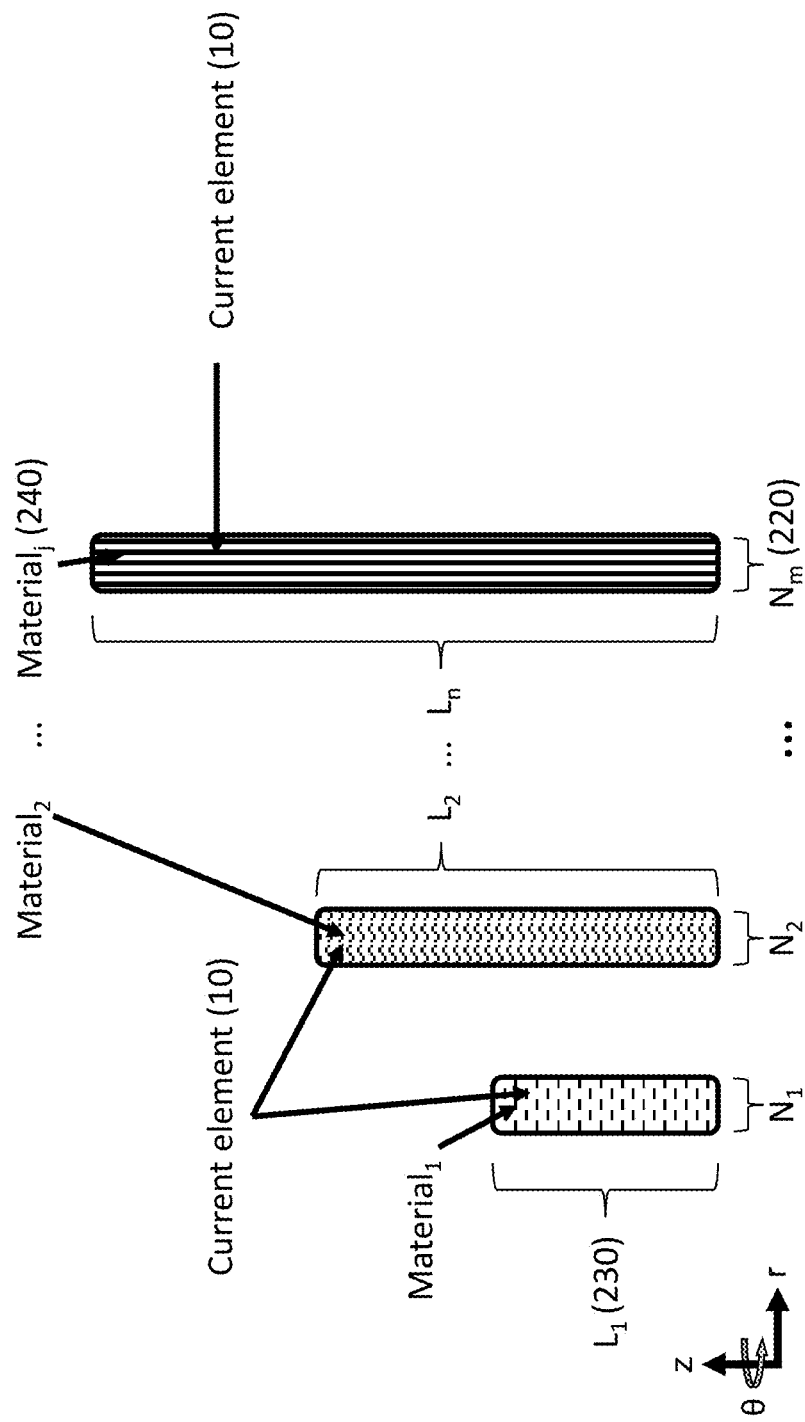
Figure 7 – Adjusting Combination Material (240) and Length (230) – Discrete Current Elements (10) in parallel

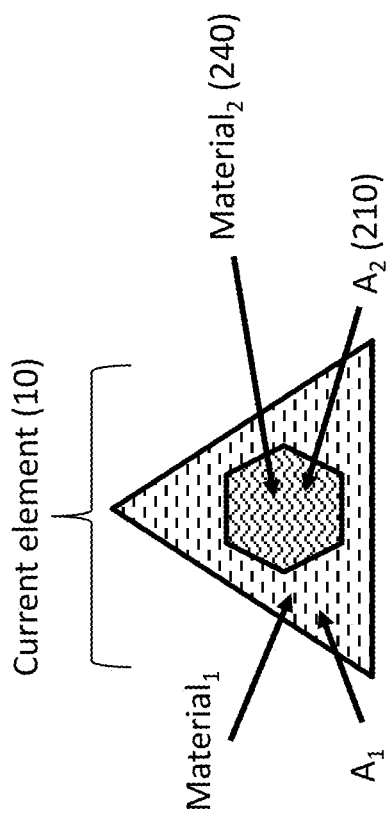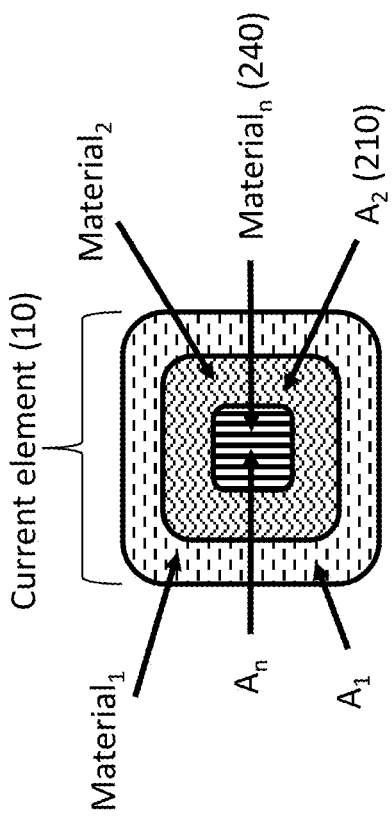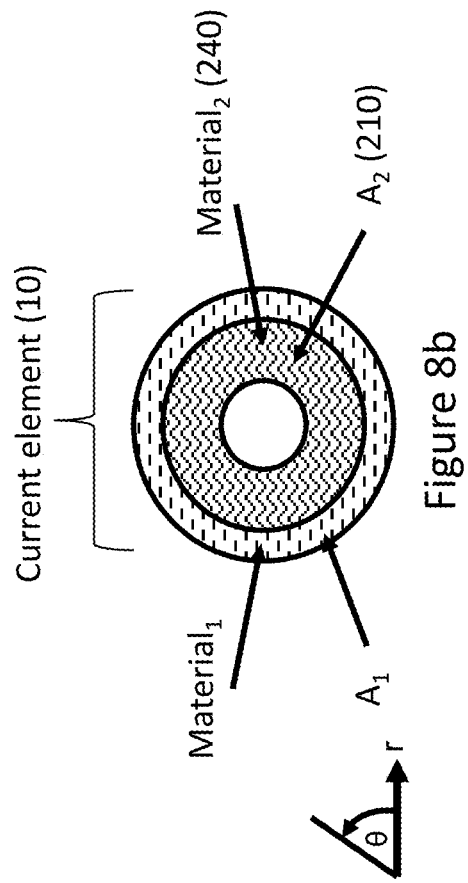
Figure 8 – Adjusting Combination Material (240) and Area (210) – Within the Current Element (10)

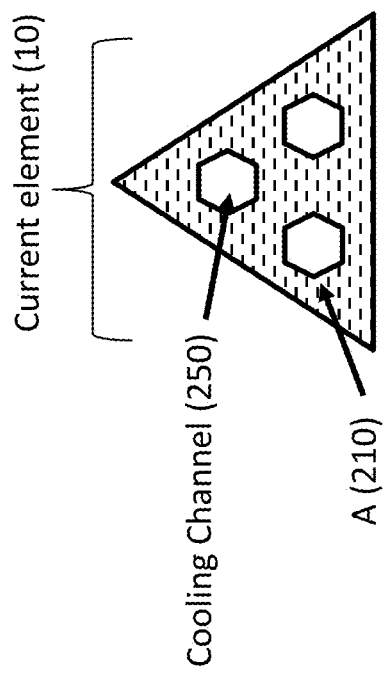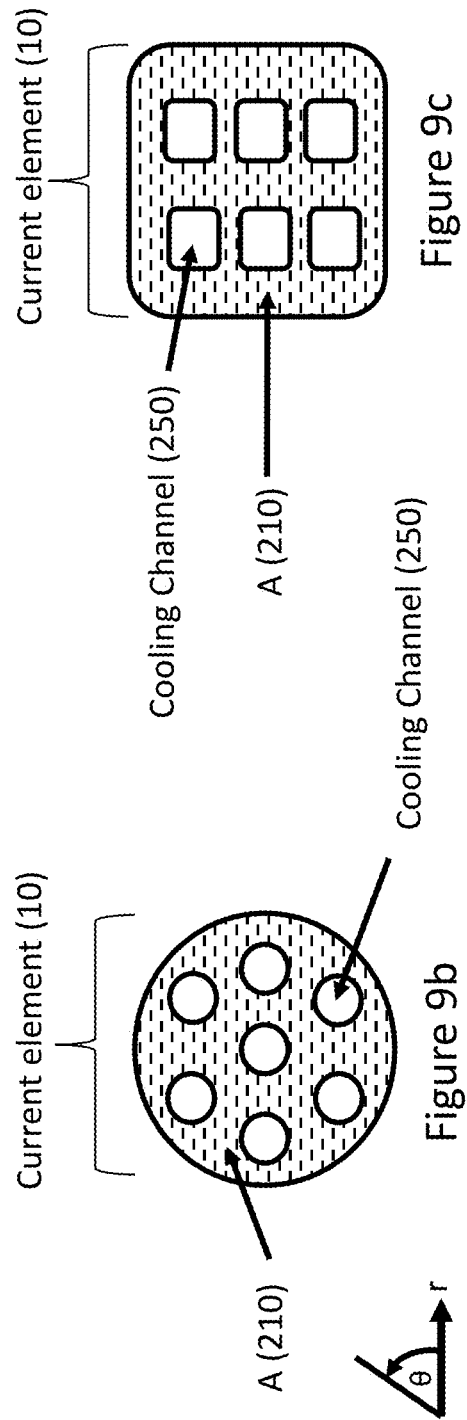
Figure 9 – Convectively Cooled Current Element (10)

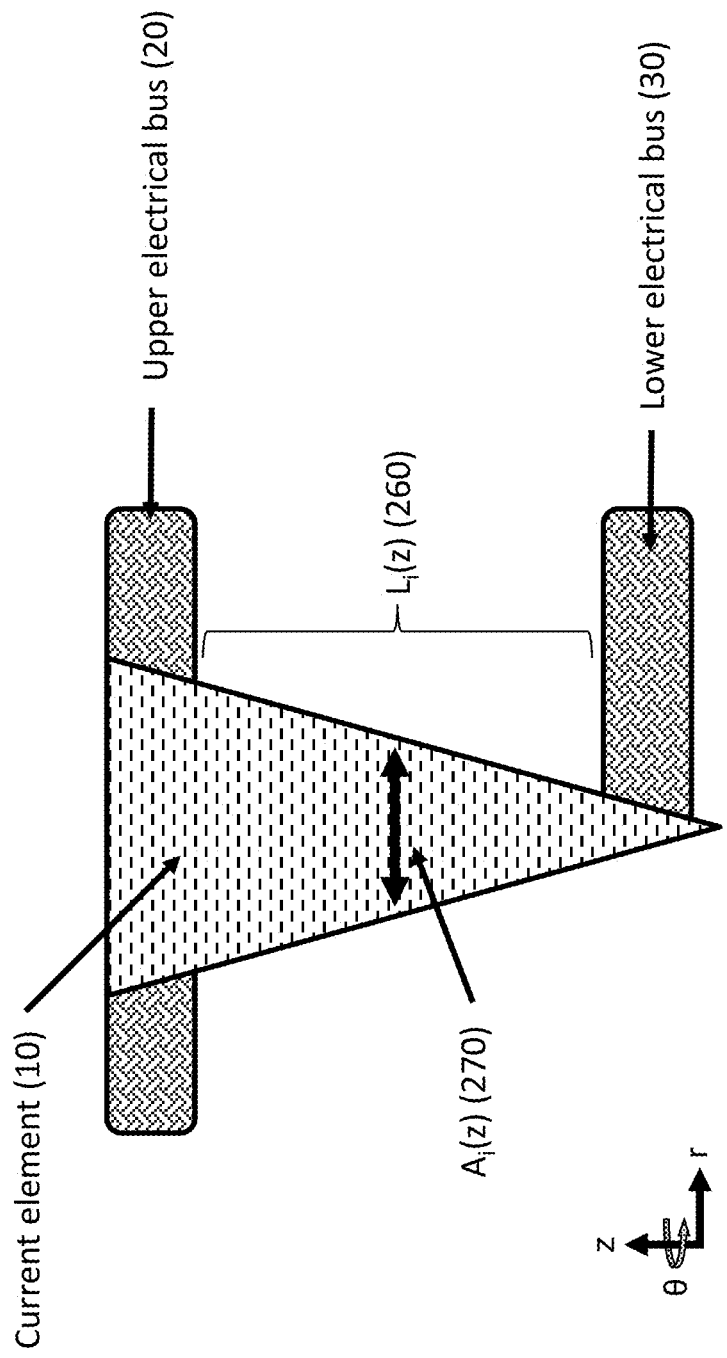
Figure 10 – Adjusting Length(z) (260) and Area(z) (270) – Continuous Current Element (10)

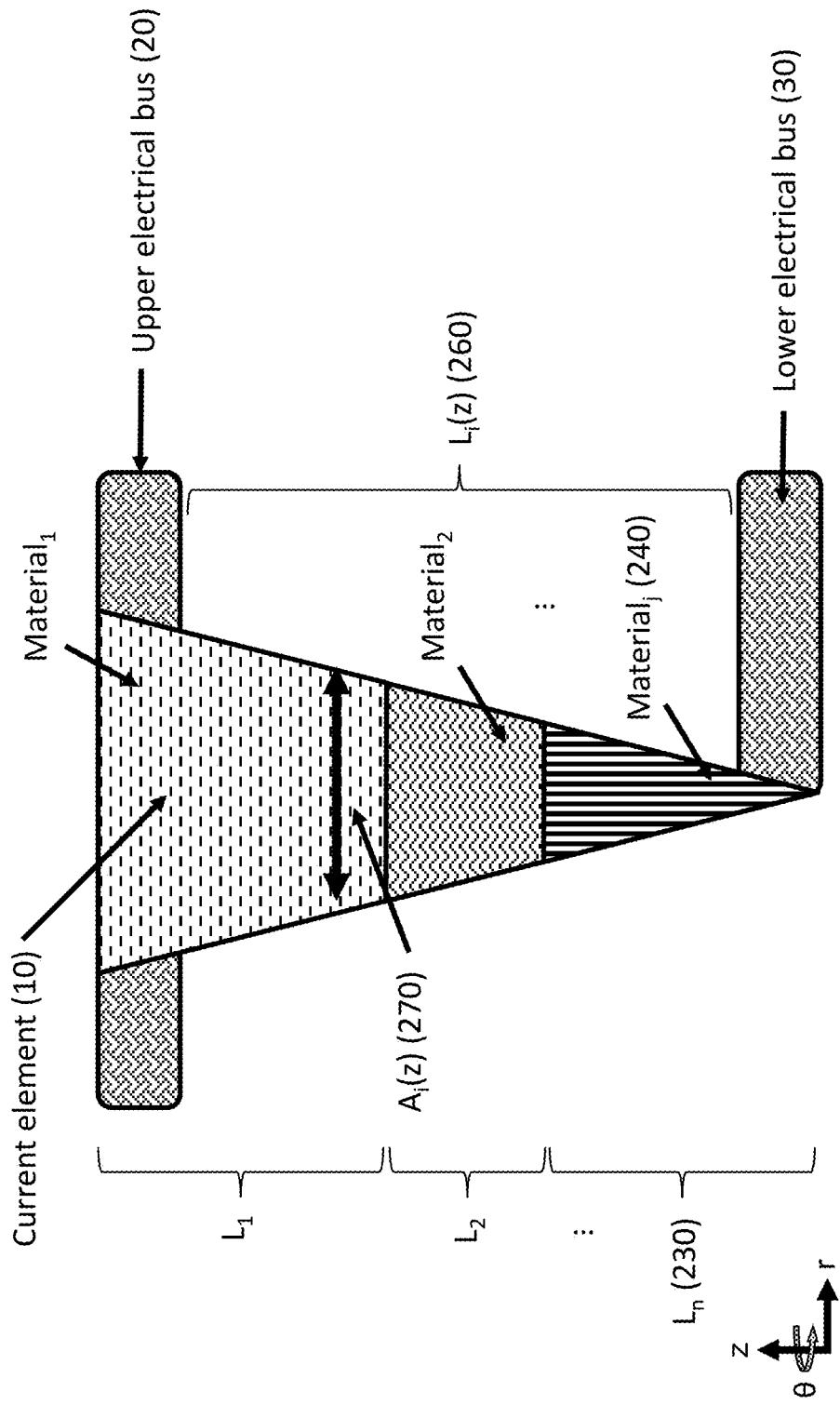
Figure 11 – Adjusting Material (240), Length (230), Length(z) (260), and Area(z) (270) – Continuous Current Element (10)

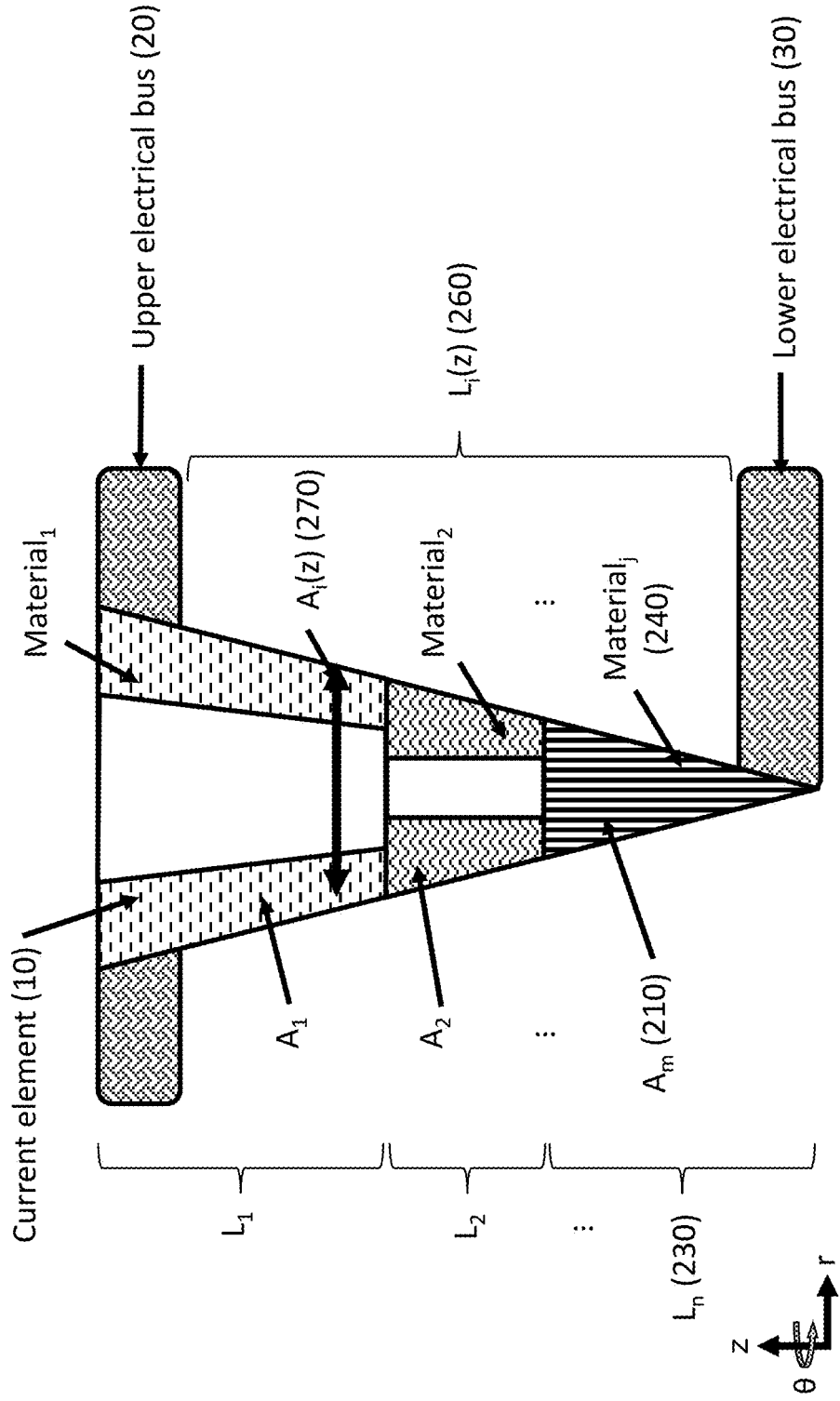
Figure 12 – Adjusting Material (240), Length (230), Length(z) (260), Area (210), and Area(z) (270) – Continuous Current Element (10)

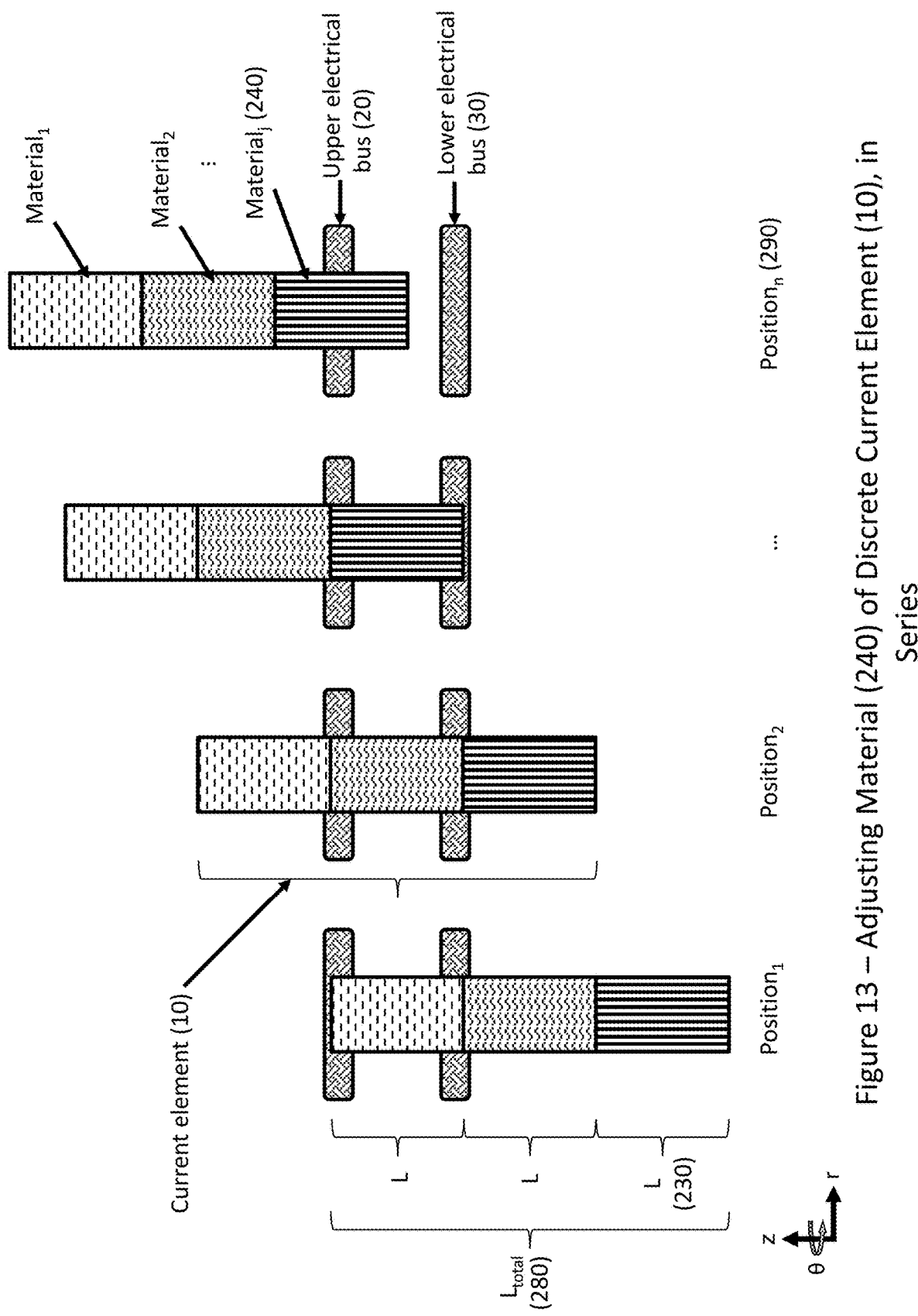
Figure 13 – Adjusting Material (240) of Discrete Current Element (10), in Series

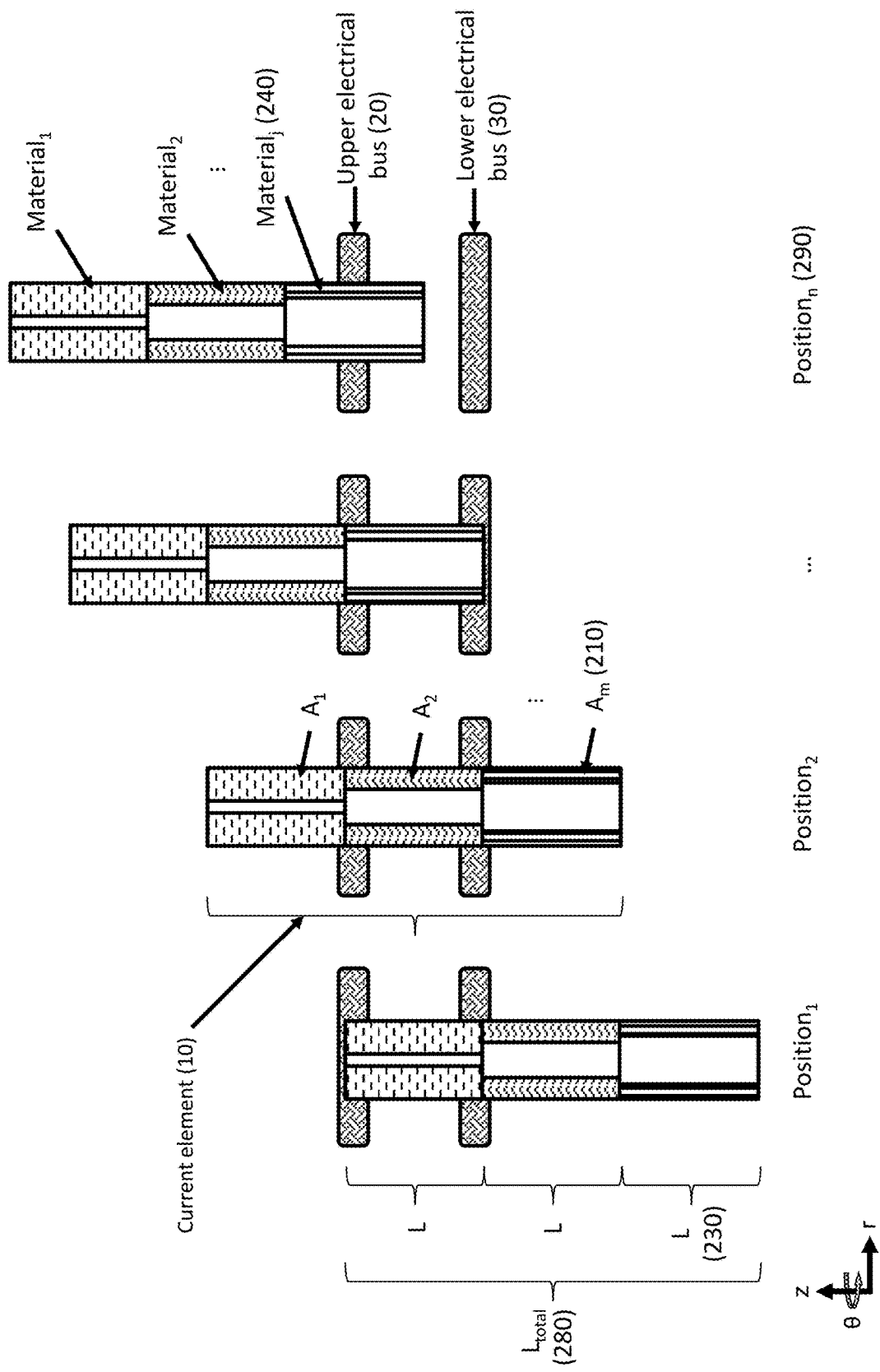
Figure 14 – Adjusting Material (240) and Area (210) of Discrete Current Element (10), in Series

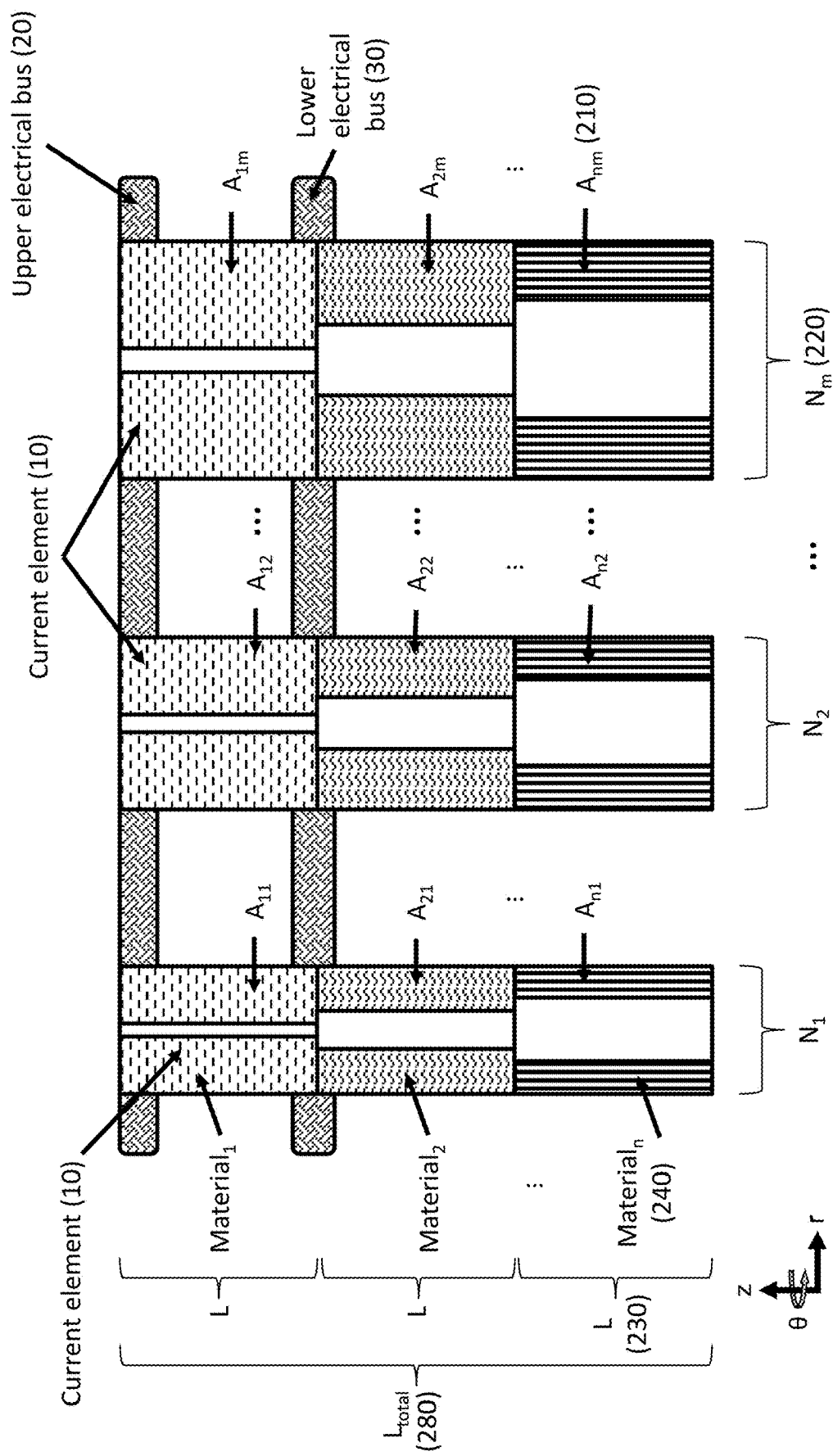
Figure 15 – Adjusting Material (240) and Area (210) of Discrete Current Element (10), in Series

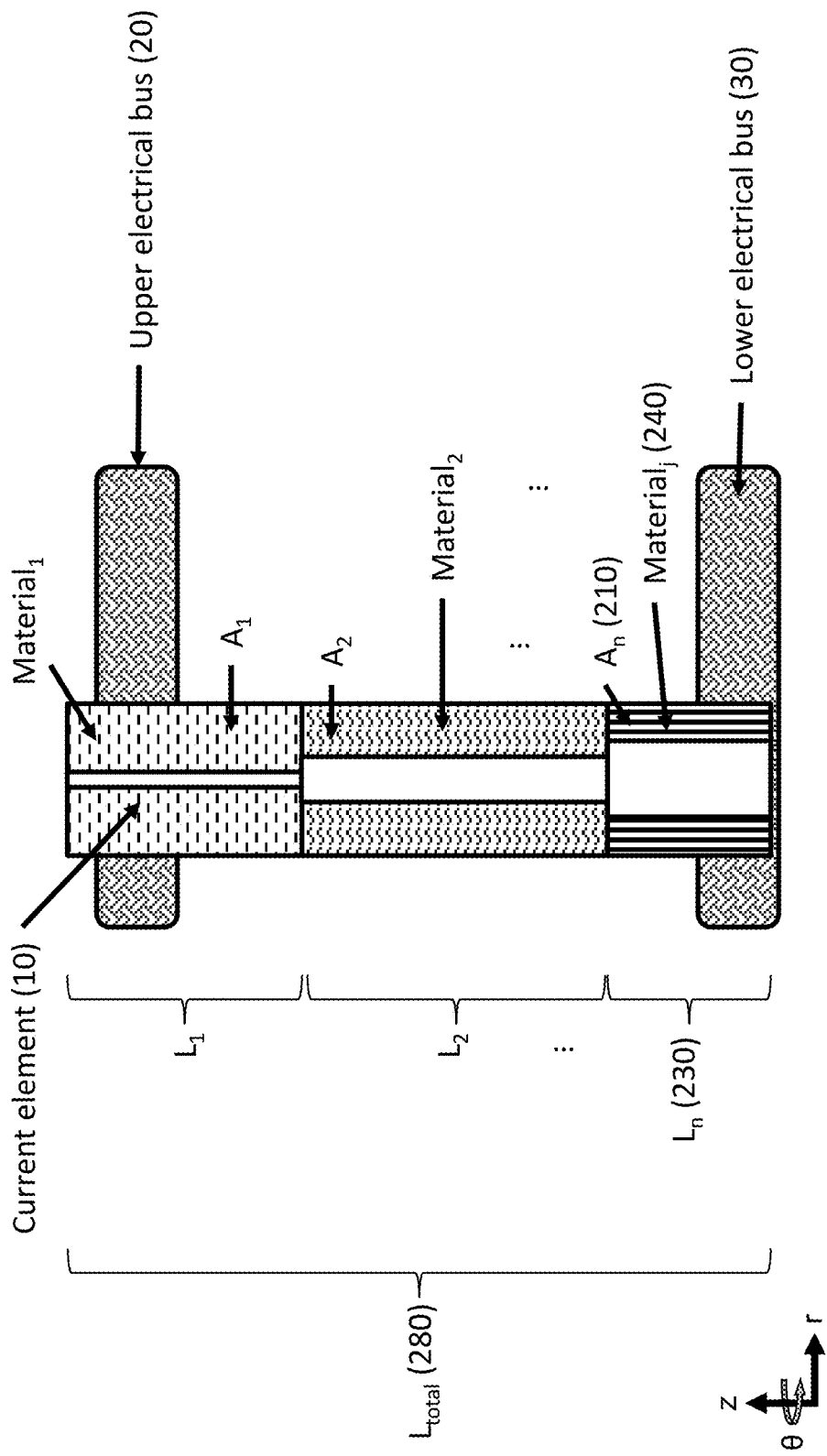
Figure 16 – Adjusting Material (240), Area (210), and Length (230) of Discrete Current Element (10), in Series

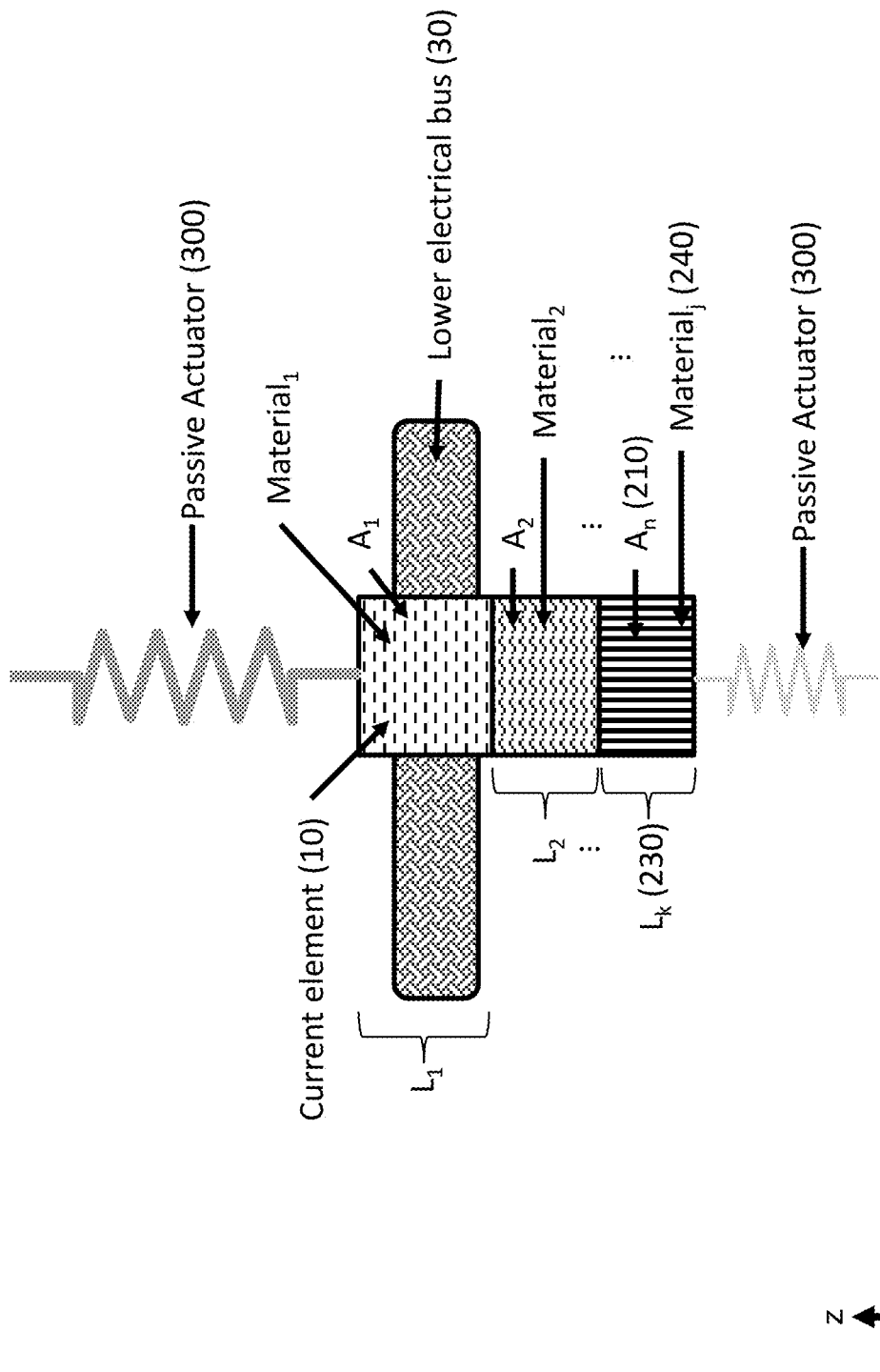
Figure 17 – Passive Design

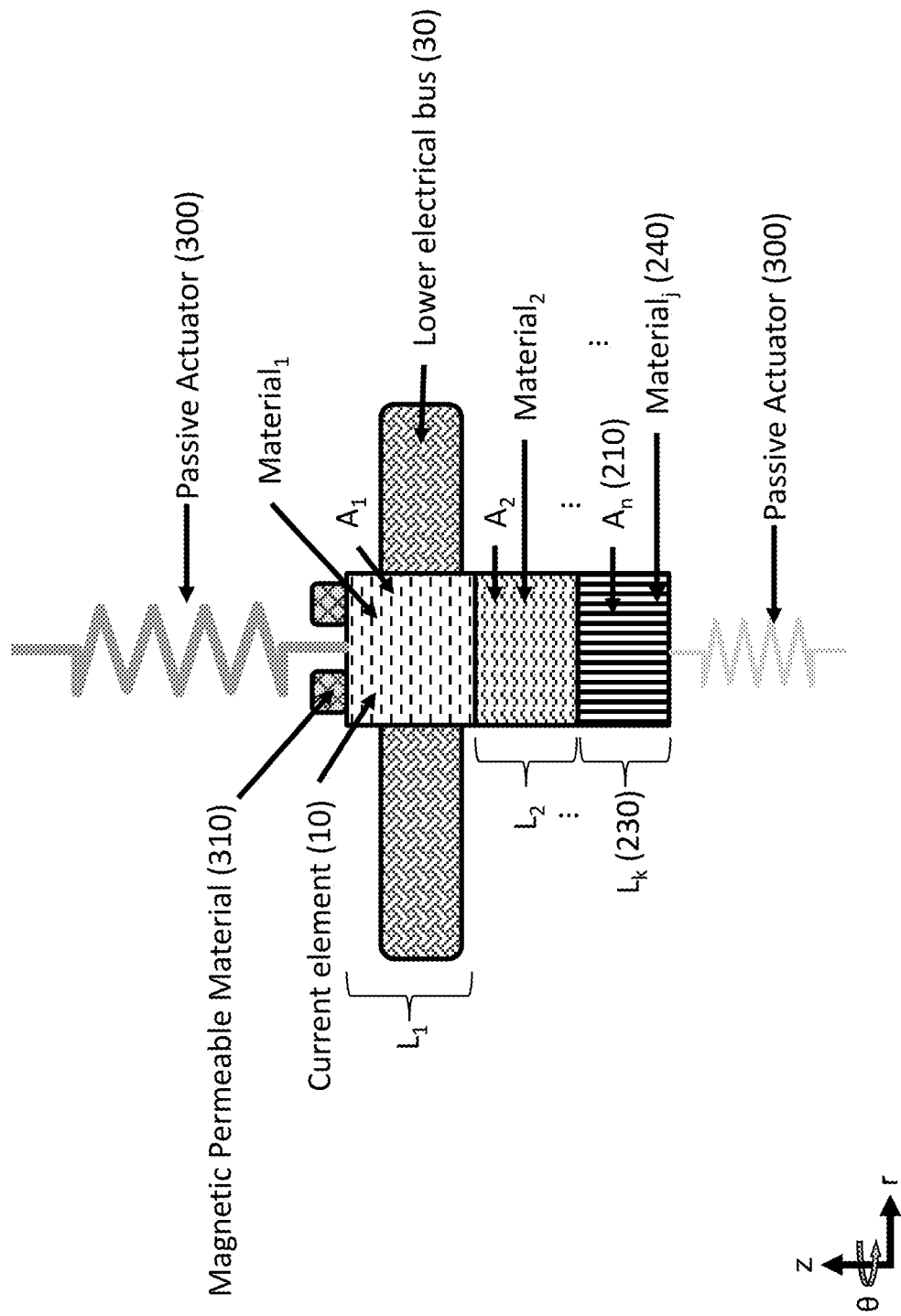
Figure 18 – Passive Design with Magnetic Permeable Material (310)

INTELLIGENT CURRENT LEAD DEVICE AND OPERATIONAL METHODS THEROF

STATEMENT REGARDING FEDERALLY SPONSORED RESEARCH OR DEVELOPMENT

Work for this invention was funded by NAVY STTR Contract N00014-11-C-0442

REFERENCES CITED

1. R. McFee, "Optimum Input Leads for Cryogenic Apparatus," *Rev Scientific Instr.*, 30 (1959.
2. Wesche and A. M. Fuchs, "Design of Superconducting Current Leads," *Cryogenics*, vol. 34, pp. 145-154, February 1994.
3. M. Wilson, *Superconducting Magnets*, Clarendon Press: Oxford, (1983).
4. Y. Iwasa, *Case Studies in Superconducting Magnets*, Plenum press: New York, (1996).
5. W. Ekin, *Experimental Techniques in Low Temperature Measurements*, Oxford Press: New York, (2006)
6. *Superconductors in the Electric Grid*, ed. By C. Rey, Elsevier, ISBN: 978178242093, (2015).
7. M. Nayfeh and M. Brussel, *Electricity and Magnetism*, John Wiley, New York: (1985).

PATENTS

| Patents No. | Issue/Publication date | Author |
| --- | --- | --- |
| 8,993,335 | Jan. 13, 2015 | Citver et al. |
| 8,340,737 | Dec. 25, 2012 | Arndt el at. |
| 7,928,321 | Apr. 19, 2011 | Corsaro et al. |
| 7,531,750 | May 12, 2009 | Kellers et al. |
| 7,359,165 | Apr. 15, 2008 | H. Kubota |
| 7,345,858 | Mar. 18, 2008 | Lee et al. |
| 6,664,875 | Dec. 16, 2003 | Yuan et al. |
| 6,153,825 | Nov. 28, 2000 | Ando et. Al. |
| 6,034,324 | Mar. 7, 2000 | Dixon et al. |
| 5,991,647 | Nov. 23, 1999 | Brockenborough et al. |
| 5,726,848 | Mar. 10, 1998 | H. Boneig |
| 5,324,891 | Jun. 28, 1994 | Huang et al. |
| 5,432,297 | Jul. 11, 1995 | Dederer et al. |
| 5,166,776 | Nov. 24, 1992 | Dederer et al. |
| 5,057,645 | Oct. 15, 1991 | M. Hilal |
| 5,015,620 | May 1991 | Ekin et al. |
| 5,146,686 | Sep. 22, 1992 | Ekin et al. |
| 4,845,831 | Jan. 23, 1990 | Laskaris et al. |
| 4,369,636 | Jan. 25, 1983 | Purcell et al. |
| 4,209,657 | Jun. 24, 1980 | Inai et al. |
| 3,695,057 | Oct. 31, 1972 | F. Maisson |

PATENT APPLICATIONS

| Patent Applications No. | Issue/Publication date | Author |
| --- | --- | --- |
| 20140028316 | Jan. 30, 2014 | Mine et al. |
| 20120309631 | Dec. 6, 2012 | Arndt et al. |

STATEMENT REGARDING NEW MATTER

This substitute specification contains no new matter.

STATEMENT REGARDING PRIOR DISCLOSURES BY THE INVENTOR

Provisional Patent No. 62/147,661.

BACKGROUND OF THE INVENTION

Several methods for making warm-to-cold current lead connections are described in related art (see Reference 2). One of the most common types of current leads is that of a normal (non-superconducting) metal conductor making the connection from a room temperature reservoir to a lower temperature reservoir in which the primary method of heat transfer is via thermal conduction from the warm reservoir to the cold reservoir and in which (Joule) heat is generated by ohmic conduction caused by current flow in an electrical conductor. The optimum ratio of length (L) to cross sectional area (A) of the current lead (L/A) is found by minimizing the sum of the ohmic heating and heat conduction terms for a given material. The resulting design is a function only of the cold and warm end temperatures, lead material, and current. More information regarding this topic can be found in R. McFee, "*Optimum Input Leads for Cryogenic Apparatus,*" *Rev Scientific Instr.*, 30 (1959), which is incorporated by reference in its entirety for the purposes of enablement.

A more energy efficient current lead design uses forced flow gas, vapor, or liquid cooling along the length of the lead which from the warmer temperature reservoir to the lower temperature reservoir. A common type of current lead is a so-called "cryogenic vapor cooled lead" in which the vapor evolved from an evaporating liquid cryogen bath (e.g. helium, hydrogen, neon, air, nitrogen, etc.) due to heat influx at the bottom of the current lead flow upwards, exchanges heat with the current lead, and cools the remaining portions of the current lead. A gas or vapor cooled current lead is said to be "optimized" when two boundary conditions are met. First, the gas exiting the current lead is at the same temperature as the temperature reservoir where it is exiting. For example, if the gas is exiting to a room temperature source, then one of the boundary conditions is such that exit gas effluent is also at room temperature. A second boundary condition in an optimize gas cooled current lead is met when the temperature gradient (dT/dx) on one of the ends of the current lead is zero such that there is no net heat flux into the current lead.

A so-called binary vapor cooled current lead is one comprising two different sections. One section is comprised of a normal non-superconducting part and the other part/section is comprised of a superconducting material operating below its superconducting transition temperature $T_c$. The so-called binary vapor cooled current lead yields a greater reduction in room temperature electrical cooling power than a non-binary vapor cooled lead by replacing the cold end (i.e. $T<T_c$) current path with superconductors to eliminate ohmic heating. Multistage heat exchangers to intercept heat at the warm end (i.e. $T>T_c$) can yield still further reductions in cooling power by intercepting heat at higher temperatures, where the Carnot efficiency is higher. If too many heat exchanger intercepts are employed, such systems can become too complex to be practical. A simpler and more efficient concept for cooling current leads is to consider a gas or vapor cooled current lead. This concept is a binary current lead composed of a high temperature superconducting section operating at $T<T_c$ and normal non-superconducting section operating at $T>T_c$. The normal non-superconducting section/portion of the current lead is cooled through forced convection by a gas cooling fluid (e.g. helium, hydrogen, nitrogen, etc.). There will be a negligible heat flux into the high temperature superconductor as long as the inlet temperature of the cooling fluid is below that of the cold end junction temperature. An earlier design study by R. Wesche and A. M. Fuchs, *"Design of Superconducting Current Leads,"* Cryogenics, vol. 34, pp. 145-154, February 1994. which is incorporated by reference in its entirety for the purposes of enablement, shows that the option requiring the lowest cooling power is comprised of an HTS section at the cold end (T<$T_c$) and a gas flow cooled section at the warm end T>$T_c$ (see Reference 2).

Definitions

These definitions are provided for clarity and for purposes of enablement.

Active Control: Control of the current lead device is said to be "active" if an external power source is required to engage, disengage, or adjust one or more of the current elements.

Actuator: a singular actuator or multiple actuators. The term actuator is used synonymously with the terms switch, motor, piston, or cylinder. An actuator can be comprised of an electric switch, magnetic switch, piezo-electric switch, magneto-strictive switch, electric motor, magnetic motor, pneumatic motor, pneumatic piston or cylinder, hydraulic motor, hydraulic piston or cylinder, solenoid, linear electric motor, wax motor, gear drive, belt drive, screw drive, linkage system, combination of motor types, among other types of actuators.

Actuate: The verb "to actuate" is used synonymously with the verbs "to switch" or "to adjust" throughout this disclosure. The verb to actuate, to adjust, or to switch could refer to a single actuator/switch or a plurality of actuators/switches.

Cable: a single cable or multiple cables.

Coil: a single coil or multiple coils.

Conductor: a single round wire or multiple round wires or a single flat tape or multiple flat tapes, among other electrically conducting objects.

Cooling fluid: The term "cooling fluid" is used throughout this disclosure to mean many possible physical states of a fluid including: single phase gas, single liquid, single phase solid, two-phase gas and liquid phase, two-phase liquid and solid, super-critical fluid, among other possible states of matter.

Current lead/Voltage Bushing/Feed-through/Termination: Terms used synonymously to mean a device that connects an electrical power source operating at one temperature reservoir to any device that operates at a different temperature reservoir.

Current element: a single current element or a plurality of current elements. The current element (10) is the component that electrically and thermally connects the electrical device, machine, or component operating at one temperature reservoir to the electrical power source operating at another temperature reservoir. The heat transferred along the current elements can be via conduction, gas convection, radiation, or a combination of these.

Cylindrical coordinate system: Unless stated explicitly, a cylindrical coordinate system is used throughout this disclosure in which the radial direction is given by r, the azimuthal direction is given by theta θ, and the axial direction is given by z.

FCL: Fault-Current Limiter

Heat Leak or Heat Load: The terms heat leak and heat load are used synonymously in this disclosure to mean the heat in watts (or equivalent unit) transmitted from the higher temperature reservoir to the lower temperature reservoir.

HTS: High Temperature Superconducting or High Temperature Superconductors. Common types of high temperature superconductor include but are not limited to: La—Ba—Cu—O, Re—Ba—Cu—O, Bi—Sr—Ca—Cu—O, Bi—Pb—Ca—Cu—O, Tl—Ba—Ca—Cu—O, Tl—Pb—Ca—Cu—O, Hg—Ba—Ca—Cu—O, iron-pnitictides, iron-chalcogenides, among other types of high temperature superconductors LTS: Low Temperature Superconducting or Low Temperature Superconductors. Common types of low temperature superconductors include but are not limited to: Nb, Pb, Sn, Va, Nb—Ti, Nb—Sn. Nb—N, Nb—Al, Nb—Ge, Mg—B, among other types of low temperature superconductors.

m-dot: the mass flow rate of the gas in a gas cooled lead given by the time rate of change of mass flow or dm/dt.

MRI: Magnetic Resonance Imaging

NMR: Nuclear magnetic Resonance

Passive Control: Control of the current lead is said to be "passive" if no external power source is required to engage or disengage one or more of the current elements. A common type of passive actuator is an inductor which acts as a spring proving a force of either contraction or expansion.

Power Source: Examples of power sources include: single-phase AC power, three-phase AC power, DC power, or combinations thereof.

Re: Rare-Earth

Smart Switch: The term "smart switch" and "intelligent current lead" are used interchangeably throughout this disclosure.

Smart Switching: The term "Smart Switching" as used in this disclosure generally refers to the actuators or switches (80) engagement and/or disengagement of one or more current elements (10) with the upper/lower electrical buses (20 and 30), and the associated program logic control or passive switching for the operational modes and methods thereof.

$T_c$: Superconducting transition temperature in zero magnetic field at zero current.

$T_{cs}$: The current sharing temperature. The current sharing temperature is the critical superconducting temperature when the superconductor is carrying current and/or in an applied magnetic field, where $T_{cs}<T_c$.

RELATED ART

Prior to the discovery of High Temperature Superconductors (HTS) in 1986 by Bednorz and Muelller, methods for reducing heat leak into cryostats for the purpose of power superconducting magnets was described in the related art of Purcell et al. in U.S. Pat. No. 4,369,636, Inai et al. in U.S. Pat. No. 4,209,657, and F. Maisson in U.S. Pat. No. 3,695,057.

Current leads employing HTS materials for powering cryogenic devices from room temperature sources have been described in the related art. For example, Laskaris et al. (U.S. Pat. No. 4,845,831) and Dederer et al. (U.S. Pat. No. 5,432,297) describe the use of a current lead fabricated using a ceramic HTS material to power superconducting magnets. Current leads fabricated with a superconducting portion and a non-superconducting portion have been described by M. Hilal in U.S. Pat. No. 5,057,645. Hybrid current leads fabricated with an HTS section and a vapor cooled section has been described by Dederer et al. in U.S. Pat. No. 5,166,776. In U.S. Pat. No. 5,324,891, Huang et al.

described the use of a thermal plug with high thermal conductivity in the radial direction but low thermal conductivity in the axial direction using alternate laminae of highly conducing and poorly conducting materials. In U.S. Pat. No. 5,991,647, Brockenborough et al., describes the use of a thermal shield to reduce the radiation heat load on a superconducting current lead. In U.S. Pat. No. 6,034,324, Dixon et al. describes the use of a modular current lead fabricated with sections of a normal non-superconducting portion, an HTS portion, and a safety lead that is electrically in parallel with the HTS portion of the current lead. In U.S. Pat. No. 6,153,825 Ando et al, describes a superconducting current lead that is comprised of a plurality of superconducting tapes to enhance its current carrying capacity. In U.S. Pat. No. 7,928,321 Corsaro et al., describes the use of a superconducting current lead in a coaxial and bi-polar arrangements. In the related art of Arndt et al. (U.S. Pat. No. 8,340,737), Kellers et al. (U.S. Pat. No. 7,531,750), and Arndt et al. (US 20120309631), the method of connecting a power source to a superconducting device is described.

In the related art of Citver et al, a method for reducing heat load into cryostats specific for AC electrical loads is described. In related art, actuators have been described in the application of Mine et al. US 20140028316 to engage and disengage current leads in order to reduce heat loads to superconducting devices when no current flow is required in the superconducting magnet.

BRIEF SUMMARY OF THE INVENTION

This disclosure relates to an intelligent current down lead device or simply a "current lead" that is used to electrically and/or thermally connect one or more components, machines or devices operating at one temperature reservoir to one or more electrical power sources or loads operating at the same temperature reservoir or a different temperature reservoir and the various operational modes and methods thereof. A common type of current lead device is one that electrically connects a room temperature power source to a device operating at cryogenic temperatures. Common types of devices that current leads connect to electrical power sources include but are not limited to: power cables, high and low field magnets, fusion magnets, accelerator magnets, Magnetic Resonance Imaging (MRI) magnets, Nuclear Magnetic Resonance (NMR) magnets, motors, generators, transformers, fault-current-limiters (FCL's), energy storage devices, induction heaters, magnetic separation devices, among other devices.

BRIEF DESCRIPTION OF FIGURES

FIG. 1—A 2-dimensional cross-sectional view of the overall schematic of the intelligent current lead device (170).

FIG. 2a—A simplified schematic of a 2-dimensional cross-sectional view of the intelligent current lead (170) in which the cross-sectional area (210) is adjusted by changing the number of discrete current elements (10) that are electrically connected in parallel.

FIG. 2b—A simplified schematic of a 2-dimensional cross-sectional view of the intelligent current lead (170) in which the cross-sectional area (210) is adjusted by changing both the number of discrete current elements (10) and their individual cross-sectional area (210). The discrete current elements (10) are electrically connected in parallel.

FIG. 3a—A 2-dimensional cross-sectional view of a discrete current element (10) with a triangular shaped cross-sectional area (210).

FIG. 3b—A 2-dimensional cross-sectional view of a discrete current element (10) with a circular shaped cross-sectional area (210).

FIG. 3c—A 2-dimensional cross-sectional view of a discrete current element (10) with a square shaped cross-sectional area (210).

FIG. 4—A 2-dimensional cross-sectional view of the discrete current elements (10) in which both the number of elements (220) and their length (230) are adjustable parameters.

FIG. 5—A simplified schematic of a 2-dimensional cross-sectional view of the intelligent current lead (170) in which both the number of elements (220) and the material (240) comprising the discrete current elements (10) are adjustable parameters. The discrete current elements (10) are electrically connected in parallel.

FIG. 6—A simplified schematic of a 2-dimensional cross-sectional view of the intelligent current lead (170) in which a combination of the number of elements (220), the cross-sectional area (210, and the material (240) comprising, the discrete current elements (10) are adjustable parameters. The discrete current elements (10) are electrically connected in parallel.

FIG. 7—A 2-dimensional cross-sectional view of the discrete current elements (10) in which the number of elements (220), their length (230), and material (240) comprising the discrete current elements (10) are adjustable parameters.

FIG. 8a—A 2-dimensional cross-sectional view of a discrete current element (10) with a triangular shaped cross-sectional area (210). The discrete current element (10) is comprised of multiple materials (240) and the cross-sectional area (210) of each material is an adjustable parameter.

FIG. 8b—A 2-dimensional cross-sectional view of a discrete current element (10) with a circular shaped cross-sectional area (210). The discrete current element (10) is comprised of multiple materials (240) and the cross-sectional area (210) of each material is an adjustable parameter.

FIG. 8c—A 2-dimensional cross-sectional view of a discrete current element (10) with a square shaped cross-sectional area (210). The discrete current element (10) is comprised of multiple materials (240) and the cross-sectional area (210) of each material is an adjustable parameter.

FIG. 9a—A 2-dimensional cross-sectional view of a discrete current element (10) with a triangular shaped cross-sectional area (210) and multiple cooling channels (250) for convective cooling and heat exchange.

FIG. 9b—A 2-dimensional cross-sectional view of a discrete current element (10) with a circular shaped cross-sectional area (210) and multiple cooling channels (250) for convective cooling and heat exchange.

FIG. 9c—A 2-dimensional cross-sectional view of a discrete current element (10) with a square shaped cross-sectional area (210) and multiple cooling channels (250) for convective cooling and heat exchange.

FIG. 10—A simplified schematic of a 2-dimensional cross-sectional view of the intelligent current lead device (170) comprised of a continuous current element (10) in which the axial length (260) and cross-sectional area (270) are adjustable parameters. The continuous current element (10) in this figure is comprised of a single homogeneous material (240).

FIG. 11—A simplified schematic of a 2-dimensional cross-sectional view of the intelligent current lead device (170) comprised of a continuous current element (10) in which the axial length (260) and cross-sectional area (270) are adjustable parameters. The continuous current element

(10) in this figure is comprised of multiple materials (240), where the length (230) of each material is an adjustable parameter.

FIG. 12—A simplified schematic of a 2-dimensional cross-sectional view of the intelligent current lead device (170) comprised of a continuous current element (10) in which the axial length (260) and cross-sectional area (270) are adjustable parameters. The continuous current element (10) in this figure is comprised of multiple materials (240), where the length (230) and cross-sectional area (210) of each material is an adjustable parameter.

FIG. 13—A simplified schematic of a 2-dimensional cross-sectional view of the intelligent current lead device (170) showing multiple positions (290) of a discrete current element (10) which is comprised of multiple materials (240).

FIG. 14—A simplified schematic of a 2-dimensional cross-sectional view of the intelligent current lead device (170) showing multiple positions (290) of a discrete current element (10) which is comprised of multiple materials (240) with varying cross-sectional areas (210).

FIG. 15—A simplified schematic of a 2-dimensional cross-sectional view of the intelligent current lead device (170) where the number of elements (220), the cross-sectional area (210), and the material (240) comprising the discrete current element (10) are adjustable parameters.

FIG. 16—A simplified schematic of a 2-dimensional cross-sectional view of the intelligent current lead device (170) where the length (230), the cross-sectional area (210), and the material (240) comprising the discrete current element (10) are adjustable parameters.

FIG. 17—A simplified schematic of a 2-dimensional cross-sectional view of the intelligent current lead device (170) where the discrete current element (10) is actuated by a passive actuator (300). In this figure, the cross-sectional area (210), the length (230), and the material (240) comprising the discrete current element (10) are adjustable parameters.

FIG. 18—A simplified schematic of a 2-dimensional cross-sectional view of the intelligent current lead device (170) where the discrete current element (10) is actuated by a passive actuator (300) and includes magnetic permeable material (310) to facilitate actuation. In this figure, the cross-sectional area (210), and the length (230), and the material (240) comprising the discrete current element (10) are adjustable parameters.

DETAILED DESCRIPTION OF THE INVENTION

1. Thermodynamic Considerations

Current down lead devices are required for connecting one or more electrical devices operating at one temperature reservoir to one or more power sources operating at a different temperature reservoir. A common type of current lead device is one that electrically connects a room temperature electrical power source to a device operating at cryogenic temperatures. From the second law of thermodynamics, heat will always flow from the higher temperature reservoir to the lower temperature reservoir. Thus, it is often desirable to reduce the amount of heat flow from the higher temperature reservoir to the lower temperature reservoir. Another desirable outcome of current lead design is to lower the overall (net) equivalent room temperature electrical power needed to cool both the current lead and the desired electrical power device. Current down leads have many different names and are sometimes referred to as voltage bushings, terminations, power feed-through, current down leads, current leads or simply "leads." To facilitate clarity in this disclosure, the simple term "current lead" will be used in many descriptions in this disclosure. Furthermore, as stated previously, a current lead device is used to electrically connect a device operating at one temperature reservoir with an electrical power source operating at a different temperature reservoir. A common type of current lead device is one that electrically connects a device operating at cold cryogenic temperature to a room temperature electrical power source, although other configurations are possible. This common temperature differential configuration will be used here on in throughout this disclosure, unless explicitly stated otherwise.

In describing a current lead that transmits electrical power from a room temperature power source to a device operating in cold reservoir, there are several different relevant parameters related to the heat load. These relevant heat related parameters can quickly become confusing when trying to compare the advantages of one current lead configuration to the next or likewise when comparing one cooling configuration over the other. Two heat related parameters that are commonly referred to in current lead design and operation are: a) the heat leak or heat load deposited to cold temperature reservoir ($Q_{heat\_leak}$) typically measured and reported in watts (W) and b) the equivalent room temperature electrical power load ($P_{eq\_RT}$), which is also typically measured and reported in watts. When comparing different current lead configurations with different operating temperature differentials (dT), in order to keep the comparisons equivalent, the comparison should typically refer to the equivalent room temperature electrical power load $P_{eq\_RT}$. By comparing the equivalent room temperature electrical power load, a direct comparison between current lead configurations, different cooling techniques, and cryogenic cooling fluids can be made. The reader is specifically cautioned not to directly compare the heat deposited in the cold reservoir $Q_{heat\_leak}$ between current lead configurations operating with differing temperature differentials in comparing the overall energy efficiency of one current lead configuration to another. The heat load ($Q_H$) at high temperature reservoir ($T_H$) can be translated to the heat load ($Q_c$) at the lower temperature reservoir ($T_c$) via the Carnot efficiency which is given by:

$$Q_H = Q_c \left( \frac{T_H - T_c}{T_c} \right) \tag{1}$$

This disclosure relates to the use of an exemplary current lead that utilizes an intelligent control algorithm or logic control to adjust/actuate/switch itself to present the most optimal configuration such as: low heat leak, voltage isolation, current interruption, ground fault interruption, high impedance for fault-current-limiting (FCL) operation, combinations thereof, among other possible current lead configurations. In general, the control of the intelligent current lead is said to be so-called "Active" an external power source is required to engage and disengage the current elements. A common type of active control can be derived from digital logic. Active control is advantageous by having greater system flexibility, is better able to incorporate future design changes and modifications, and more seamless integrates with other systems. However, active control is typically slower than passive control due to the time delay encountered between actual electrical load change, measurement and interpretation of data, and eventual implementation of the adjustment of the current lead. The intelligent current lead is said to be so-called "Passive" control if no external power source is required to engage and disengage one or more of the current elements. A common type of passive control can be derived from analog logic working in conjunction with analog components. Passive control is advantageous in terms of faster response time, simplicity, and cost. A combination of both "Active" and "Passive" control may be utilized for operating the intelligent current lead described in this disclosure. There are many ways that the current lead described in this disclosure can adjust/actuate/switch itself to meet the requirements of a desired function, e.g. minimum heat leak. For example, if minimum heat load ($Q_{heat\_leak}$) is the desired configuration, then in a conduction cooled current lead with no current flow (i.e. no ohmic/Joule heat generation), the integrated heat ($Q_{heat\_leak}$) conducted down the current lead is given by:

$$Q_{heat\_leak} = \frac{A}{L} \int_{T_{cold}}^{T_{ambient}} \lambda(T) dT \qquad (2)$$

where $\lambda(T)$ is the temperature dependent thermal conductivity of the lead, A is the leads cross sectional area, dT is the temperature difference (dT) between the ambient temperature ($T_{ambient}$) reservoir and the cold temperature reservoir ($T_{ambient}-T_{cold}$), and L is the total length of the current lead, see for example, Y. Iwasa, *Case Studies in Superconducting Magnets*, Plenum Press: New York, (1996), which is incorporated by reference in its entirety for the purposes of enablement. Therefore, the adjustable parameters in the (conduction cooled) current lead at zero current flow are A, L, $\lambda(T)$, and dT. Similarly, in a gas/vapor cooled lead in which both convective and conductive heat transfer play a role, an optimized normal metal current lead of uniform cross section (A) and temperature dependent thermal conductivity $\lambda(T)$ and electrical resistivity $\rho(T)$, carrying a uniform current (I), the differential equation describing the 1-d heat flow is given by:

$$\frac{d}{dx}\lambda(T)A\frac{dT}{dx} + \frac{I^2\rho(T)}{A} - f\dot{m}C(T)_p\frac{dT}{dx} = 0 \qquad (3)$$

where $C_p$ (T) is the temperature dependent heat capacity of the coolant gas at constant pressure, f is the numerical efficiency of the gas heat transfer, and dm/dt (referred to as m-dot in this disclosure) is the mass flow rate of the gas flowing within the current lead, see for example, M. Wilson, *Superconducting Magnets*, Clarendon Press: Oxford, (1983), which is incorporated by reference in its entirety for the purposes of enablement. Thus, in a (gas/vapor cooled) current lead carrying a uniform current (I), in addition to the adjustable parameters A, L, $\lambda(T)$, $\rho(T)$ and dT, there is also the heat capacity of the lead $C_p(T)$, the mass flow rate of the gas/vapor m-dot and the efficiency of heat transfer f, which can be adjusted to optimize the current lead and reduce the overall heat load $Q_{heat\_leak}$ to the cold environment and minimize the equivalent room temperature electrical power $P_{eq\_RT}$. For the special case of a conduction cooled current lead in which there is no mass flow eq. [3], but includes ohmic/Joule heat generation from current flowing within the device this reduces to:

$$\frac{d}{dx}\lambda(T)A\frac{dT}{dx} + \frac{I^2\rho(T)}{A} = 0 \qquad (4)$$

An important feature of this disclosure is the ability of the intelligent current lead device (operating in the "active" mode) to measure relevant conditions affecting the current lead operation, analyze and interpret data, and then adjust/actuate/switch itself to provide the most advantageous configuration to meet the ever changing conditions of the power load. Typical types of relevant measurements of diagnostic sensors and instrumentation that the current lead may monitor include but are not limited to: voltage drop, electrical load current, temperature profile and distribution throughout the lead, gas/fluid mass flow rate, ambient pressure, ambient vacuum pressure, among other types of measurements. Similarly, the intelligent current lead device described in this disclosure operating in the "passive" mode can adjust/actuate/switch itself to provide the most advantageous configuration to meet changing conditions in electrical load. As stated previously combinations of both "active" and "passive" control may be utilized. There are many types of conditions that the current lead device will encounter and experience during operations. Some common types of electrical loading conditions that the current lead will experience are: a) zero electrical power load, b) partial electrical power load (i.e. below its maximum design rating, c) full electrical power load (i.e. at maximum design rating), and d) over-current or fault-current loading conditions, among other possible electrical loading conditions. The multiple advantages of the current lead described in this disclosure over current leads in related art is the ability of this current lead to adjust/actuate/switch itself in multiple configurations to provide the most advantageous response to a particular electrical loading requirement or operating condition. The types of adjustments the current lead described in this disclosure to the various types of electrical loading it will encounter can include but is not limited to adjustments in: the number of current elements ($N_i$), cross sectional area of the current element (A), current element length (L), current element thermal conductivity $\lambda(T)$ and electrical resistivity $\rho(T)$ via changes in materials, mass flow rate (m-dot), heat capacity ($C_p$) of both the cooling fluid and current element, a combination of these parameters, among other adjustable parameters. Even though the various diagnostic sensors and instrumentation can be monitored in real time, there is typically a time delay or time lag between the diagnostic measurement and the response of the current lead device. The delay time between the diagnostic measurement and the current lead device can be adjust/actuate/switched as required to optimize the performance as well. In some instances, it is beneficial to delay the response of the current lead device to avoid excessive adjustment and premature wear, among other reasons and in other applications such as fault current limiting, it is important to minimize the time delay.

2. Overview of the Embodiments

The intelligent current lead described in this disclosure is a device that electrically connects one or more electrical power sources operating at one (or more) temperature reservoir to one or more components, machines, or devices (e.g. magnet, motor, generator, transformer, power cable, FCL, RF cavity, etc.) that operates at a different temperature reservoir. There are many possible embodiments of the intelligent current lead described in this disclosure.

In one embodiment, the intelligent current lead device is one that electrically connects one or more room temperature electrical power sources to one or more devices operating at a lower temperature.

In another embodiment, although less common, the intelligent current lead described in this disclosure connects one or more electrical power sources operating above room temperature (i.e. warm/hot power source) to one or more devices operating at room temperature.

In another embodiment, although less common, the intelligent current lead described in this disclosure connects one or more devices operating above room temperature (i.e. warm/hot device) to one or more power sources operating at room temperature.

In yet another embodiment, although less common, the intelligent current lead described in this disclosure connects connect a warm/hot temperature reservoir to a cold cryogenic reservoir.

Combinations of the various embodiments of the intelligent current lead device are also possible.

To simplify and abbreviate the descriptions throughout this disclosure, the more common type of current lead that connects a single room temperature power source to a single device operating at a lower temperature reservoir will be used unless otherwise stated explicitly. However, it is obvious to one skilled in the art that the intelligent current lead described in this disclosure is also applicable to the less common applications mentioned above, with multiple power sources and multiple devices, among other types of applications.

There are many individual parts and components that can comprise a current lead. These many components that can comprise a current lead device will be described in more detail throughout this disclosure; however, it will facilitate clarity and comprehension if some major components are initially identified. Some of the more typical components that can comprise a current lead can be seen in FIG. 1 and will be referred to often throughout this disclosure. These more typical components include but not limited to: (10) one or more current elements, (20) upper electrical bus, (30) lower electrical bus, (40) upper electrical connection, (50) lower electrical connection, (60) upper voltage bushing, (70) lower voltage bushing, (80) actuator and actuator bushing (85), (90) vacuum enclosure or vacuum vessel, and (100) diagnostic sensors and instrumentation, which include measurements of: voltage drop, current flow, temperature, vacuum pressure, ambient pressure, mass flow rate, among other measurements. Thus, for the current lead device electrically connecting a room temperature power source to a cold temperature reservoir operating under normal electrical load conditions, the current flows (110) in from the power source (120) operating at higher temperature reservoir A (130) to the upper electrical connection (40), along the upper electrical bus (20), through the current element (10), along the lower electrical bus (30), through the lower electrical connection (50), and to the device (140), operating at the low temperature reservoir B (150). The top part of the current element (10) is electrically isolated from the grounded vacuum enclosure (90) via the upper voltage bushing (60) and the bottom part of the current element (10) is electrical isolated from the mechanical support structure (160) and the vacuum enclosure (90) via the lower voltage bushing (70). The vacuum enclosure (90) is used to hermetically seal a portion of the overall intelligent current lead device (170). A high quality vacuum typical <$1 \times 10^{-4}$ mbar or better within the vacuum enclosure (90) has two positive benefits. First, it helps reduce parasitic heat load via convective heat transfer to the device (140) operating at the low temperature reservoir (150). This also minimizes the required room temperature electrical power (120). Second, a high quality vacuum within the vacuum enclosure (90), ensures high voltage insulation integrity for current leads (170) operating at higher voltages.

Various diagnostic sensors and instrumentation (100) are used to monitor the real time status of the current lead (170) and electrical loading conditions being experienced by the current lead (170). The diagnostic wires are fed through the vacuum enclosure (90) via a hermetically sealed instrumentation feed-through or bushing (180), where the signals fed into software/hardware control panel (190). The software/hardware control panel (190) houses the various types of equipment and its corresponding program logic control software/and algorithms (200) that read, analyze, interpret, and then respond to the various signals from the diagnostic sensors and instrumentation (100) that monitor the current lead (170).

As a simple example of typical operation of the intelligent current lead (170) operating with active control, a diagnostic sensor (100) such as a current transducer or voltage tap may detect either an increase or decrease in electrical load. The information from the various sensors are analyzed and interpreted by the control logic (200). The logic control may command one or more of the actuators (80) to either engage or disengage one or more of the current elements (10) that connects the upper current lead bus (20) to the lower current lead bus (30). The engagement or disengagement of the current elements (10) via the actuator (80) allow the electrical current (110) to either flow or stop flowing through the individual current element (10). If desired, all of the current elements (10) can be disengaged via the actuators (80) to minimize heat flow. There are many types of adjustments that the intelligent current lead (170) can perform to provide the most advantageous response to the changing electrical load conditions. Several more common types of adjustments that the intelligent current device (170) can perform are described in the latter parts of this disclosure, however, it is not possible to described all possible combinations and permutations within this disclosure and it is understood to one skilled in the art that many possible combinations and permutations of the current leads adjustable parameters are possible.

3. Advantages of the Various Embodiments

There are many advantages of the current lead device (170) described in this disclosure over related art. These advantages include but are not limited to: a) minimal heat leak and minimal room temperature electrical power at zero current flow (110), b) reduced heat leak and reduced room temperature electrical power at currents (110) below the maximum design rating, c) voltage isolation of the device (130) from the power source (120) when the actuator or switch (80) is disengaged, d) FCL capabilities, e) ground fault interruption, and combinations thereof, among other advantages. A brief explanation of these advantages is provided below, although to one skilled in the art other advantages of the intelligent current lead described in this disclosure will be obvious.

One of the many advantages of the embodiments described in this disclosure over related art is the ability of the intelligent current lead (170) to disengage one or more of the current elements (10) from the lower and/or upper electrical buses (20 and 30) at zero current flow (110). When the actuator or switch (80) disengages one or more of the current elements (10) from either the upper electrical bus (20) or the lower electrical bus (30) or both, not only is the electrical path broken but so too is the conductive thermal path through the current element (10). This substantially lowers both the heat load and the room temperature electrical power from the power source (120) to the device (140). Thus at zero current, the only remaining heat loads are the parasitic heat loads from thermal conduction of the current lead support structure (160), residual gas conduction within the vacuum enclosure (90), and radiation heat loads. The parasitic heat load through the support structure (160) can be minimized by careful selection of low thermal conductivity materials (e.g. stainless steel, titanium alloys, fiber reinforced plastics, composites, glasses, ceramics, etc.) that are very strong so as to minimize the required cross sectional area of the support structure (160). The parasitic heat load from residual gas conduction can be minimized by lowering the vacuum pressure within the vacuum vessel (90) to lower than $10^{-4}$ mbar. The parasitic heat load from radiation can be minimized through the use of multiple layers of highly reflective (i.e. low emissivity) materials and highly polished surfaces.

Another of the many advantages of the embodiments described in this disclosure is the reduction in heat load and room temperature electrical power at not just zero current flow but also at reduced current levels (110) below the maximum design rating. There are several methods that the intelligent current lead can employ to adjust/actuate/switch itself in order to reduce the heat load at currents lower than the maximum design rated current. One method of several to accomplish this is by reducing the net cross sectional area of the current elements (10) that are electrically connected in parallel to match the incoming electrical load as measured by the diagnostic sensors (100) such as the current transducer or voltage drop across the elements (10) or both. This feature of this embodiment has an enormous advantage over related art such as that described in US application 20140028316 by Mine et al. that possess fixed and constant cross sectional area current elements rated at maximum current but operated for significant periods of time at currents lower than the maximum rated current. Another method that the intelligent current lead (170) can adjust/actuate/switch itself to reduce the heat load to the device (130) and reduced the room temperature electrical power load from the source (140) is to extend the thermal path length of the current element (10) by using multi-position actuator (80) with and adjustable axial stroke length. Yet another method that the intelligent current lead (170) can adjust/actuate/switch itself to reduce the heat load to the device (130) and reduced the room temperature electrical power load from the source (140) is to use a combination of an actuator with an adjustable axial stroke length and a current element with either a variable cross sectional area along its length or a current element (10) comprised of multiple materials with different thermal conductivities e.g. Cu, Al, brass, bronze, monel, stainless steel, etc. It is obvious to one skilled in the art that any combination of these adjustable parameters can be used to accomplish these goals.

Another advantage of the embodiments described in this disclosure is the ability of the current lead (170) to electrically isolate the device (130) from the power source (120) by disengaging the current elements (10) via the actuators (80) from either the upper electrical bus (20) or the lower electrical bus (30) or both. The electrical isolation to a desired voltage rating of the current lead (170) is provided by the upper voltage bushing (60) or the lower voltage bushing (70), or both. Thus if a fault condition is detected via the diagnostic sensors and instrumentation (100), the program logic can send the commands to the actuators or switches (80) to disengage and re-engage the current elements (10) as necessary. The current lead in this disclosure can therefore act as a primary circuit breaker or similarly as a back-up to the more traditional circuit breaker. For AC electrical power sources, it is important to build into the logic in the intelligent control system to have the actuator (80) disengage the current element (10) at points where the AC current crosses zero, thereby reducing arcing and potential damage to the electrical contacts of the device. In DC circuits, a similar effect can be realized by having the current element (10) rapidly increase its impedance prior to the actuator (80) disengaging the current element (10). In a fixed voltage DC network, a rapid increase in the impedance will lower the fault current thereby facilitating the breaking of the electrical circuit. A more detailed description of this can be found in sections 16 and 17 regarding fault-current limiting capabilities of the current lead described in this disclosure.

Another advantage of the embodiments described in this disclosure is the ability of the current lead (170) to provide fault current limiting (FCL) capability in a system with fixed drive voltage ($V_{max-drive}$) There are numerous ways the FCL capability could be included in the various embodiments described in this disclosure. In order to have FCL capability in the current lead device (170) in a fixed drive voltage electrical system, the current lead (170) must be able to rapidly adjust/actuate/switch (and increase) its impedance so that the fault current is limited in magnitude by the increasing impedance within the current lead device (170) and then quickly return to its low impedance configuration once the fault current or multiple faults have cleared. The response time of the current lead to initially increase its impedance and then subsequently decrease its impedance must be very quick. For AC power systems (e.g. 60 Hz), this typically means within ½ to 1 power line cycle or 8-16.67 ms response time, and for DC systems even faster response times <10 ms may be necessary in order to avoid damage from fault currents. One of the variables that determine the type of actuator or switch used to engage and disengage the current carrying elements will depend upon the required speed for engagement and disengagement of the current elements. The faster the required switching times, the faster the type of actuator or switch. For example, for very rapid switch activation times a piezo-electric switch/actuator may be employed. In a normal current lead of fixed impedance ($Z_{fixed}$) connected to a fixed drive voltage ($V_{max-drive}$) electrical grid, the maximum potential fault current ($I_{fault}$) the system could experience is given by $V_{max\_drive}/Z_{fixed}$. The advantage of the current lead (170) described in this disclosure is its ability to rapidly adjust/actuate/switch (i.e. initially increase and subsequently decrease) its impedance by injecting/removing electrical resistance ($R_{inject}$) or reactive impedance ($Z_{inject}$), so that fault current is "limited" to $I_{fault}=V_{max\_drive}/(Z_{fixed}+Z_{inject})$. Thus, an ideal FCL is one in which $Z_{fixed} \ll Z_{inject}$, provided the response time of the FCL is fast enough. A few methods to inject additional impedance to help limit the magnitude of fault currents will be described later in this disclosure, although many more methods will be obvious to one skilled in the art.

4. Smart Switch Types

Multiple designs for the "smart switch" or intelligent current lead (170) are described in this disclosure. The term "smart switching" as used in this disclosure generally refers to the actuators (80) engagement and/or disengagement of one or more current elements (10) with the upper/lower electrical buses (20 and 30), and the associated program logic control and operational modes and methods thereof. Thus, depending upon the values measured by one or more of the diagnostic sensors (100), one or more of the actuators (80) can engage, disengage, or adjust the current elements (10) of the intelligent current lead device (170). As discussed earlier, the control logic can be embedded within the device through active control or via analogs elements such as inductors and capacitors using passive control. Depending upon the type of switch design, the thermal and electrical resistive path from the power source (120) to the device or load (140) is selected. For the intelligent current lead (170) described in this disclosure, there are two general categories of current elements (10): a) discrete current elements and b) continuous current elements. The discrete or continuous current elements (10) may be electrically connected in a parallel arrangement or a series arrangement. Some of the possible smart switch arrangements include but are not limited to: a) one or more discrete current elements electrically connected in a parallel configuration (10) as shown in FIGS. 2a, 2b, 4, 5, 6, 7, b) discrete current elements (10) electrically connected in a series configuration, as shown in FIGS. 13, 14, 15, 16, c) continuous currents elements (10) where the current elements (10) do not have a uniform cross sectional area (A) but instead possess a variable cross sectional area ($A_i$) and are comprised of a single homogeneous material (e.g. Cu, Al, Ag, Au, Sn, Ni, brass, bronze, stainless steel, mixtures or alloys thereof, etc.), as shown in FIG. 10, d) continuous current elements (10) possessing a variable cross sectional ($A_i$) and are comprised of multiple different materials each possessing different thermal conductivities (e.g. Cu, Al, Ag, Au, Sn, Ni, brass, bronze, stainless steels, mixtures or alloys thereof, etc.) that are electrically connected in as series configuration, as shown in FIGS. 11, 12. A brief explanation of some the various embodiments for the intelligent current lead (170) is provided below.

In one embodiment, one or more discrete current elements (10) are electrically configured in a parallel arrangement (see FIGS. 2a and 2b). In this embodiment, it is possible to individually power each current element (10) separately from a multiple power sources; however, the current lead design is greatly simplified when the current elements (10) electrically connect and disconnect to a common bus (20) or (30). The one or more discrete current elements (10) may be all comprised of the same homogenous material, with the same size, shape, and same cross sectional area, or the current elements (10) may be comprised of different cross sectional areas, shapes, and materials, or any combination thereof. In this embodiment, the current elements (10) are typically arranged and configured so that they act independently of one another and are electrically connected in a parallel arrangement. To simplify the design and fabrication, the current elements (10) electrically connect and disconnect to a single electrical bus either at the upper (20) or lower (30) ends of the device or both (20 and 30). The current elements (10) that comprise this embodiment can be configured to transfer heat by thermal conduction, convection (liquid, gas, vapor, etc.), or a combination thereof.

In another embodiment, one or more discrete current elements are electrically connected in a series configuration (see FIGS. 13-16). The one or more discrete current elements (10) may be all comprised of the same homogenous material, with the same shape, and same cross sectional area, or the discrete current elements (10) may be comprised of different cross sectional areas, different shapes, and different materials, or any combination thereof. The current elements that comprise this embodiment can be configured to transfer heat by thermal conduction, convection (liquid, gas, vapor, etc.), or a combination thereof.

In another embodiment, the current lead device (170) is comprised of one or more continuous type current elements (10). In this embodiment, the continuous type current element (10) can have a variety of geometry and configurations. Three configurations are shown for clarity in FIGS. 10, 11, and 12, although other geometries and configurations are possible. Shown in FIG. 10 is a continuous type current element (10) comprised of a single homogenous material, axial length $L_i(z)$ (260), and variable cross sectional area $A_i(z)$ (270). Shown in FIG. 11 is a continuous type current element (10) comprised of a plurality of different lengths $L_n$ (230) and a plurality of different materials (240). In this embodiment, the continuous type current element (10) shown in FIGS. 10 and 11 has a cross sectional area that can vary along its axial length given by $A_i(z)$ (270). Sections of the current element (10) that are comprised of larger cross sectional areas are designed to carry higher currents, while the portions of the continuous current element (10) with smaller cross sectional area are designed to carry smaller currents. In this embodiment, the actuator (80) can adjust/actuate/switch either the position/location of the continuous current element relative to the fixed electrical buses (20 and 30) or similarly the position of the electrical buses relative to a fixed continuous current element (10) can be adjusted, or a combination thereof can be used (see FIGS. 10, 11, and 12). In this embodiment, the continuous current element (10) can be comprised of a single homogenous material (see FIG. 10) or with multiple different materials (240) with different thermal and electrical conductivities (see FIG. 11). Shown in FIG. 12 is a continuous type current element (10) in which a portion of the cross section area has been removed from its interior section leaving a finite wall thickness of cross sectional area $A_m$ (210). The continuous current elements (10) that comprise this embodiment can be configured to transfer heat by thermal conduction, convection (liquid, gas, vapor, etc.), or a combination thereof.

Many other embodiments of the intelligent current lead device are possible using the numerous combinations and permutations of the adjustable parameters.

5. Smart Switch Logic, Diagnostics, and Measurements

The intelligent current lead device (170) described in this disclosure is a so-called "Smart" current lead or "Smart Switch" in that the current lead may have some associated program logic control that governs its behavior, settings, and corresponding adjustable settings. The intelligent current lead device (170) described in this disclosure may be designed to be "actively" controlled or "passively" controlled, or a combination of both active and passive control. Passive control is described in section 20 of this disclosure. For an actively controlled device, an example is provided that describes one of the many possible methods of how the intelligent current lead (170) operating with "active" control operates and functions. The intelligent current lead (170) is typically fitted with various types of diagnostic sensors and instrumentation (100) such as current transducers, voltage taps, temperature sensors, gas flow meters, pressure gauges, vacuum gauges, etc. When using active control logic, the intelligent current lead (170) monitors these various diagnostic sensors (100) and sends the information about their status to the control panel (190). Based upon the particular application and the information gained from the diagnostic sensors (100), the program logic (200) selects how the intelligent current lead device (170) should respond/adjust itself to optimize its settings and physical configuration. There are a plethora of possible methods of how this instrumentation monitoring and control may occur. To illustrate by example one such method is described to illustrate its basic operational principle, however, the description of this one example is in no way meant to limit the many different methods the intelligent current lead may operate. This simple example may be used by one skilled in the art to design and program alternate methods and program logic to optimize for a particular application.

As discussed previously, one of the advantages of the current lead described in this embodiment over related art is the current leads ability to adjust/actuate/switch its cross sectional area to minimize the heat load to the lower temperature reservoir or to minimize the total refrigerated power or both. For example, in the embodiment with discrete current elements (10) electrically configured in a parallel, based upon the measurement of the amount of current flowing from the power source (120), the intelligent current lead (170) could engage one or more current elements (10) or dis-engage one or more current elements (10) depending upon the magnitude of the measured current. Similarly, the intelligent current lead (170) could engage a current element (10) comprised of a higher conductivity such as copper or aluminum for higher currents, brass/bronze for medium currents, or stainless steel for lower currents. There are many possible combinations and permutations that can be adjusted/actuated/switched in the current lead device (170) to optimize the desired output.

In one embodiment, so-called "current control" is used to set and adjust/actuate/switch the appropriate setting on the intelligent current lead (170). In this embodiment, the current flowing through the upper electrical connection (40) or the lower electrical connection (50), or both is measured with an ammeter or a flux transformer or equivalent. Based upon the measured value of current, the intelligent current lead (170) adjusts/actuates/switches its cross sectional area to best match the amount of current flowing through the current lead. For example, if the current elements (10) connecting the upper electrical bus (20) to the lower electrical bus (30) are discrete elements, then the maximum number of elements are engaged for the highest current ratings and the minimum number are engaged at the lowest settings. For example, at zero current flow (110), the program logic may be set such that all current elements (10) are dis-engaged resulting in zero cross sectional area to carry current. In this state, the heat leak from the higher temperature reservoir to the lower temperature reservoir is minimal and in addition the upper voltage bushing (60) is electrically isolated from the lower voltage bushing (70). Current control of the current lead has the advantage of accuracy and repeatability. It has the disadvantage of being more costly than voltage control.

In another embodiment, so-called "voltage control" is used to set and adjust the parameters of the current lead device. In this embodiment, a measurement of the voltage drop across the current elements is used to determine the appropriate settings of the intelligent current lead. Voltage control has the advantages of being fast and low cost, but has the disadvantage of measurement accuracy when compared to current control.

In another embodiment, so-called "temperature control" is used to set and adjust/actuate/switch the parameters of the intelligent current lead device. In this embodiment, for the embodiment of conduction cooled current lead, the temperature profile along the current elements is used to determine the appropriate settings. For the case of gas cooled leads the temperature measurement of the gas exiting the device can be used to control and adjust/actuate/switch the current lead settings. Temperature control has the disadvantage of having a relatively slow response time which can lead to premature burn-out of the lead in certain conditions.

In another embodiment, so-called "gas flow" or "mass flow" control is used to set and adjust/actuate/switch the parameters of the intelligent current lead device. In this embodiment, a combination of the mass flow and temperature of gas exiting the current lead are used to control and adjust/actuate/switch the parameters of the lead. This type of gas flow control only pertains to the gas cooled embodiment of this disclosure and not to the conduction cooled embodiment.

In another embodiment, combinations of measurements of the diagnostic instrumentation (190) e.g. current, voltage, temperature gas flow, etc. are used to set and adjust/actuate/switch the parameters of the intelligent current lead (170).

6. Power Source types

The intelligent current lead device (170) described in this disclosure electrically connects or disconnects a power source (120) operating at one temperature reservoir (130) to a device (140) operating at a different temperature reservoir (150). There are many types of power sources (120) that the intelligent current can connect. In one embodiment, the power source is a Direct Current (DC) source. With a DC power source (120), common current lead configurations are co-axial current leads or bi-polar current leads possessing a positive terminal (+) and a negative terminal (−).

In another embodiment, the power source (120) is a single phase Alternating Current (AC) source. With a single-phase AC power source (120) two common current lead configurations are a co-axial current lead comprising a central core conductor and a return shield concentrically wrapped or surrounding the central core or a bi-polar current lead possessing a positive terminal (+) and a negative terminal (−) in which the AC current sinusoidal alternates back and forth.

In another embodiment, the power source (120), is a three-phase power source with each of the three phases separated 120° apart in its sinusoidal AC excitation. For a three-phase AC power source (12), there are many common current lead configurations including: a) a tri-axial configuration with all three phases wrapped or surrounding a central axis, b) a triad configuration with three separate phases arranged in a triangular shape, and c) three separate individual single phase co-axial current leads, among other type of three-phase configurations.

7. Current Lead types

The intelligent current lead (170) described in this disclosure is designed to connect a power source (120) operating at one temperature reservoir (130) with a device (140) operating at a different temperature reservoir (150). A temperature gradient (dT/dx) between the two temperature reservoirs exists along the axial length (L) of the current elements (10). There are many ways that heat can transfer between the two temperature reservoirs such as radiation, thermal conduction, and gas convection. The most common ways that heat can be transferred in the current lead are thermal conduction or gas convection, or a combination of both thermal conduction and gas convection. Although radiation can be used to transfer heat, it tends to be impractical because the heat transfer rate is too slow. If thermal conduction is used to transfer heat, typical materials used in this process are Cu, Al, brass, bronze, stainless steel, Sn, carbon fiber, Al2O3, diamond, among other highly thermal conducting materials. If gas convection is used to transfer heat, this is typically performed by flowing gas (e.g. He, N2, air, H2, Ar, Ne, mixtures thereof, etc.) of known and metered mass flow rate (m-dot) which is typically measured in volume per unit time (e.g. liter/s or equivalent) or mass per unit time (e.g. grams/s or equivalent).

8. Adjustable Parameters of the Current Lead

One of the many advantages of the intelligent current lead device (170) described in this disclosure over related art is that the device is comprised with multiple diagnostic sensors (100) (temperature, voltage, current, pressure, mass flow, vacuum, etc.) that monitor the health and status of the device (170) and that program logic control is then used to adjust/actuate/switch the current lead device (170) so as to optimize the device for a targeted function. There are many ways in which the device can be optimized depending upon the desired outcome. One skilled in the art would define the appropriate sensors combined with the required program logic control around a desired outcome or multiple desired outcomes. For example, one such desired outcome may be to minimize the heat that is transferred through the current elements (10) that connect one temperature reservoir (130) to the other temperature reservoir (140). Another example of a desired outcome may be to maximize the electrical impedance of the current elements so as to limit a fault current propagating through the device. Yet another example how the current lead device (170) may adjust/actuate/switch itself for a desired outcome may be to disconnect (i.e. open circuit) the current elements (10) from either the upper electrical bus (40) or the lower electrical bus (30) or both, in the event that a ground fault is detected in the device.

To describe and illustrate how the current lead device (170) may adjust/actuate/switch itself to optimize for a desired outcome, the minimal heat transfer is selected as an example, although other optimization logic may be utilized to meet other requirements and functions. To understand how the current lead may adjust/actuate/switch itself, the simplest example of a conduction cooled current lead is selected. A conduction cooled current lead is one in which the heat from one temperature reservoir (130) is thermally conducted via the current elements (10) to a second temperature reservoir (150), where the conducted heat is governed by eq. [2] and the Joule heat generation associated with the resistive current flow is governed by eq. [4]. Thus, to adjust/actuate/switch the magnitude of heat conducted through one or more of the current elements (10), the primary adjustable parameters are: a) the length of the current elements (L), 2) the cross sectional area (A) of the current elements, 3) the electrical conductivity ($\sigma$) and thermal conductivity (k or $\lambda$) of the current elements (10), and 4) the number of current elements ($N_m$) (220). Given the number of adjustable parameters, it not is impossible to describe in this disclosure all of the combinations and permutations in which the current lead device (170) can adjust/actuate/switch itself to minimize the heat transfer through the current elements (10), however several operational methods are presented to illustrate how one skilled in the art may design and operate the intelligent current lead device (170).

In one embodiment, the net cross sectional area $A_n$ (210) of the current elements (10) is adjusted by engaging/disengaging current elements (10) of similar cross section comprised of similar homogenous material, and similar lengths (see FIG. 2a). In this embodiment, a larger number of current elements (10) are engaged to carry larger currents and less current elements (10) are engaged to carry smaller currents. In another embodiment, the net cross sectional area of the current elements (10) is adjusted by engaging/disengaging current elements (10) comprised of different cross sectional areas but comprised of similar homogenous materials and similar lengths (see FIG. 2b). In this embodiment, the current elements (10) with larger cross sectional areas are used to carry higher currents and current elements (10) with smaller cross sections are used to carry smaller currents. In yet another embodiment (see FIG. 3a-3c), the net cross sectional area of the current elements (10) is adjusted by engaging/disengaging current elements (10) comprised of similar homogenous materials, similar lengths, and similar outer dimension but differing inner dimension (i.e. different wall thickness—see FIGS. 3a-3c). In this embodiment, the currents elements (10) with thicker walls are designed to carry more current than the current elements with thinner walls. There are numerous others means to adjust/actuate/switch the cross sectional area of the current elements that have not been described in this embodiment.

Similar to adjusting the cross sectional area $A_n$ (210) of the current elements, the currents elements lengths $L_n$ (230) can be adjusted to change the magnitude of the heat conducted and the Joule heat generated. In one embodiment, currents elements of differing length ($L_i$) but comprising the similar homogenous material and similar cross sectional area are engaged/disengaged to adjust/actuate/switch the heat conducted/generated from the lower electrical bus (30) to the upper electrical bus (40). In this embodiment, the current elements (10) of longer length (230) are used for smaller currents and current elements shorter in length (230) are used for larger currents (see FIG. 4). In this embodiment, the current elements (10) are comprised of similar homogenous material and similar cross sectional area (210).

Similar to adjusting the heat conducted/generated via the current elements (10) by either adjusting the length $L_n$ (230) of the current element (10) or its cross sectional area A (210), the thermal conductivity (240) of the current element (10) can be adjusted by selecting from different elements (e.g. Cu, Al, Ag, Au, Sn, Ni, etc.), alloys (e.g. brass, bronze, Cu—Ag, Cu—Be, stainless steel, hastelloy, etc.) or electrically conducting composites. (e.g. carbon fiber, carbon nano-tube, SiC, etc.). In one embodiment, one or more of the current elements (10) are comprised of different materials (240) each possessing a different thermal conductivity (k) and electrical conductivity ($\sigma$), but are comprised of similar cross sectional area (A) and similar length (L→see FIGS. 8a-8c).

In another embodiment, one or more of the current elements may be comprised of low temperature superconductors, high temperature superconductors, or combinations of both low and high temperature superconductors. Some common types of low temperature superconductors are: NbTi, Nb—Sn, Nb—N, Nb—Al, Mg—B, among other types of LTS. Some common types of high temperature superconductors are Re—B—Cu—O, Bi—Sr—Ca—Cu—O, Tl—Sr—Ca—Cu—O, Hg—Sr—Ca—Cu—O, among other types of HTS. In another embodiment, one or more of the current elements (10) are comprised of LTS, HTS, or combinations and mixtures thereof.

For one skilled in the art, it is also possible to use a combination of settings and parameters to adjust/actuate/switch the intelligent current lead's (170) heat that is transferred/generated through the current elements (10) by using a combination of these adjustable parameters. For example, in one embodiment, multiple current elements $N_i$ (220) can be comprised of multiple different materials (240) with multiple different thermal ($k_i$ or $\lambda_i$) and electrical conductivities ($\sigma_i$) with multiple different cross sectional areas $A_i$ (210). One skilled in the art would design the current lead device (170) along with the program logic (200) and appropriate diagnostic sensors (100) to match a variety of current load conditions and have the current elements (10) engage/disengage the appropriate number of current elements (220) to minimize the heat transferred between temperature reservoirs.

In another embodiment, the current elements (10) are gas or vapor cooled. Convectively cooled current elements (10)

add an additional adjustable parameter of mass flow (m-dot) in which to control the current lead device (170). The number of possible permutations and combinations of adjustable parameters become too large to illustrate in this disclosure.

9. Current Element Cross-Sectional Shapes

The current elements (10) that transfer the current from upper electrical bus (20) to the lower electrical bus (30) can come in a variety of cross sectional shapes and sizes (see for example FIGS. 3, 8, and 9). A common cross sectional shape for a current element (10) is circular, although other cross sectional shapes are possible including but not limited to: square, rectangle, hexagonal, elliptical, multi-sided polygonal, among other cross sectional shapes.

The current elements (10) can be either formed from a solid piece comprising a single homogenous material or multiple materials (240). The current elements (10) can also be comprised of a hollow tube of finite wall thickness (see for example FIGS. 3, 8, 9, and 12). For example, if the current elements (10) are circular in shape the current elements (10) can have an outer diameter, and inner diameter, and a wall thickness. The wall thickness can be varied as needed to optimize the current flow and minimize the heat transfer from one temperature reservoir (130) to the other temperature reservoir (140).

10. Switch Location

The current elements (10) and electrically and thermally connect and disconnect the upper electrical bus (20) and the lower electrical bus (30) are designed to either be engaged or disengaged depending upon the operational settings of the current lead device. The location of the connection (or disconnection) between the current element (10) can be made between either the upper electrical bus (20) or the lower electrical bus (30), or a combination of both. There are benefits of locating this connection/disconnection point on either side. For example, if the connection/disconnection point is located on the side closest to the lower temperature reservoir, the contact resistance between the current element and the electrical bus is typically lower at lower temperatures. However, there are several disadvantages of locating the connection/disconnection location on the lower temperature reservoir side including: a) larger thermodynamic penalty based upon Carnot efficiency, b) fewer lubricants are available that are effective at low enough temperatures which do not solidify and harden, c) design must account for differences between thermal contraction of various components, etc. If the connection/disconnection location is on both the lower and higher temperature reservoir, if properly designed this can lead to a greater voltage isolation and hence power handling of the intelligent current lead device (170).

In one embodiment, the thermal and electrical connection/disconnection location is on the higher temperature reservoir side. In another embodiment, the thermal and electric connection/disconnection point location is on the lower temperature reservoir side. In yet another embodiment, the thermal and electrical connection/disconnection location is on both the lower and higher temperature reservoir side.

11. Actuator Drive Types

The actuators (80) described in this disclosure are used to engage and disengage the current elements (10) from either the upper electrical bus (20), lower electrical bus (30), or both. Likewise the actuators (80) can also be used for a variety of other functions including but not limited to: translation from a region of larger cross sectional area (210) to a region of smaller cross section area (210) and vice versa, to regions from higher to lower electrical and thermal conductivity and vice versa, to regions magnetically permeable material to regions of magnetically non-permeable material and vice versa, from regions of an electrically conducting material to regions comprising an electrically non-conducting (i.e. semi-conducting or insulating) material and vice versa, etc. In this disclosure, the term actuator is used synonymously with other terms including but not limited to: switch, motor, cylinder, piston, drive, drive mechanism, etc. The actuators (80) can be designed so that the current flow (110) from the power source (120) flows through the actuator itself or the actuators can be electrically isolated to a rated voltage by an electrically insulating actuator bushing (85). There are many types of actuators that can be configured to use with the intelligent current lead device (170) described in this disclosure. The types of actuators include but are not limited to: electric switches, magnetic switches, piezo-electric switches, magneto-strictive switches, electric actuators, magnetic actuators, pneumatic actuators, hydraulic actuators, thermal actuators, phase-change actuator, combinations thereof, among other types of actuators. One skilled in the art would select the type of actuator best suited for the desired application. Parameters to be considered in the type of actuator selection include but are not limited to: cost, size/footprint, weight, displacement, response time, maintenance, reliability, operating temperature, among other considerations. Mine et al., describes the use of actuators to retract and engage current leads to power a superconducting magnet is the application US20140028316. However, these retractable current leads are single on/off switches with limited functionality as those described in the embodiments of this disclosure. The actuators in Mine et al are not capable of reducing the heat load for varying current values as described in section 12, fault current limiting as described in section 17, nor are they tied to any type of either active or passive "smart" program logic control as described in section 17.

12. High Voltage Isolation

The intelligent current lead device (170) connects a power source (120) operating at one temperature reservoir (130) to a device (140) operating at a different temperature reservoir (150). To carry power, the current lead device (170) must be able to carry both current at rated voltage level, where Power=Current×Voltage. The current lead device (170) can be electrically isolated from ground by either the upper voltage bushing (60) or the lower voltage bushing (70) or a combination of both. One skilled in the art designs the voltage bushings (60 and 70) to a rated voltage level based upon industry standards and design criteria. For current leads enclosed in vacuum enclosures (90) it is important to maintain as low as pressure (less than $10^{-5}$ mbar) as possible or high pressure (e.g. 1-10 atm) in order to avoid unwanted partial discharges known as Paschen breakdown. Partial pressures of gas (e.g. $1\text{-}10^{-3}$ mbar) within the vacuum enclosure (90) are undesirable conditions and should be avoided to the extent possible. The magnitude of the Paschen discharge (i.e. voltage breakdown) is determined by the product of the pressure (P) of the gas (or gas density) multiplied by the distance (d) or spacing between the electrodes. For a fixed distance (d) between electrodes, since the Paschen discharge curve of a gas passes through a minimum critical value of P*d, it is important to either make the gas Pressure very small (e.g. high vacuum conditions less than $10^{-5}$ mbar) or high pressure (e.g. 1-10 atm) to avoid breakdown. Different gases can be used to either increase or decrease the voltage breakdown strength. Helium gas for example has a very low voltage breakdown compared to nitrogen gas at the equivalent gas density, so consideration should be given to this when designing the current lead. It is also important to avoid sharp edges, points, inclusions, indentations, non-smooth surfaces, etc. on conducting electrodes as they have the ability cause enhanced concentrations in the localized electric fields which can lead to premature voltage failure when compared to homogenous uniform electric fields. One skilled in the art should perform electric field calculations to locate if any surfaces or geometries with electric field concentrations so that efforts can be to eliminate or diminish these unwanted effects.

13. Heat Leak

For the intelligent current lead (170) described in this disclosure, consideration must also be given to minimizing the unwanted parasitic heat transfer between the two temperature reservoirs. There are many ways in which unwanted heat transfer between the two temperature reservoirs can occur depending upon the particular design and application including but not limited to: poor vacuum quality in the vacuum enclosure (90); heat conduction via the mechanical support structure (160); radiation heat transfer from the warmer temperature reservoir to the colder temperature reservoir; contact resistance at the interface between the current elements (10) with both the upper electrical bus (20) and the lower electrical bus (30); Joule heating along the upper electrical bus (20) and lower electrical bus (30); among other heat sources. One skilled in the art of current lead design and fabrication spends considerable amount of time and care to minimize these unwanted sources of heat, see for example, J. W. Ekin, *Experimental Techniques in Low Temperature Measurements*, Oxford press: New York, (2006), which is incorporated in its entirety for the purposes of enablement.

In one embodiment, the vacuum enclosure that contains the various components of the intelligent current lead (170) such as the current elements (10), upper and lower electrical buses (20 and 30), actuator bushings (85), diagnostic sensors and instrumentation (180), etc. is maintained at a very low vacuum level. Typical vacuum levels are <$10^{-4}$ mbar with optimal vacuum levels <$10^{-6}$ mbar. Having a high level of vacuum (i.e. low gas pressure) has two major advantages. First it reduces convective heat transfer via gas conduction between the two temperature reservoirs. Second, it ensures a high level of voltage standoff and avoids the particular troublesome Paschen breakdown in partial gas pressure environments.

In another embodiment, the physical structure (160) that mechanically supports the components of the intelligent current lead device (170) can transfer unwanted heat via conduction between the two temperature reservoirs as well as outside the vacuum enclosure (90) to components located inside the vacuum enclosure. To reduce and minimize this conductive heat transfer via the mechanical support structure (90), it is important to fabricate these components with materials that have low thermal conductivity. Some common metals for support structures are stainless steel, Ti, Ti alloys, low carbon steels, among other low thermal conductivity metals. The mechanical support structure can also be comprised on non-metals such as composites including but not limited to: fiber re-enforced plastics sold under the trade names G-10, G-11, etc., thermoset plastics sold by General Electric Corporation under the trade name Ultem™, glass fiber reinforced plastics commonly referred to as s-glass or e-glass, etc. Various types of ceramics and glasses can also be used but should be designed so as primarily handle compressive loads and avoid tensile loads as much as possible.

In another embodiment, unwanted parasitic heat load from radiation is reduced by wrapping or applying highly reflective (i.e. shiny) materials with very high emissivity coefficients (6) close to unity. Common materials and methods to reduce radiative heat transfer are to employ highly polished surfaces such as polished Al, Cu, Ag and Au plated surfaces, aluminized mylar commonly referred to as multi-layer insulation or MLI, among other high emissivity materials.

In another embodiment, either one or both of the electrical buses (20 and 30) is operating at temperatures below the superconducting conducting temperature $T_c$ of some materials. Some common types of practical superconducting materials and their corresponding superconducting transition temperature include but not limited to are: Hg—Ba—Ca—Cu—O ($T_c$<140 K), Tl-ba-Ca—Cu—O ($T_c$<120 K), Bi—Sr—Ca—Cu—O ($T_c$<108 K), Re—Ba—Cu—O ($T_c$<93 K), Mg—B ($T_c$<39 K), Nb—Sn ($T_c$<18 K), Nb—Ti ($T_c$<9 K), among other superconducting materials. In this embodiment, unwanted Joule heat generated as electrical current is transferred with the electrical bus can be reduced by including superconducting materials, typically in the form of wires, cable, and filaments within the electrical buses if and only if the operating temperature of the electrical bus is below the superconducting transition temperature of the selected superconductor. For example, in a cryogenic current lead application, it may be advantageous to have the lower electrical bus comprised of both normal metal and superconducting material. Thus, the current flowing in the lower electrical bus (30) will flow in the zero resistance superconductor and the normal non-superconducting metal (e.g. Cu, Al, Ag, Au, Ni, Sn, brass, bronze, stainless steel, etc.) can act as the thermal and electric stabilizer for the bus. In the event of failure or burnout of the superconductor the normal non-superconducting metal can act as a safety lead, see for example Dixon et al. (U.S. Pat. No. 6,034,324). Similarly, the upper electrical bus (20) can be comprised of both normal non-superconducting materials (i.e. Cu, Al, Ag, Au, Ni, Sn, brass, bronze, etc.) and superconducting materials (Re—Ba—Cu—O, Bi—Sr—Ca—Cu—O, Tl—Ba—Ca—Cu—O, Hg—Ba-ca-Cu—O, etc.). The electrical current can pass through the superconducting material for the portion/section/segment of the electrical bus that is below the current sharing temperature $T_{cs}$ and then transfer to the portion/section/segment that is above the $T_{cs}$ of the bus.

In another embodiment, the unwanted parasitic heat load caused by electrical contact resistance between the current elements (10) and the upper and lower electrical buses (20 and 30) is minimized by electrically plating the current elements (10) or the electrical buses (20 and 30) or both with soft malleable materials that tend to oxide more slowly. Common materials used to electrical plate these components include but are not limited to: Au, Ag, Sn, In, Ni, alloys and mixtures, thereof, among other plating materials.

14. Switch Time Issues

For the intelligent current lead (170) described in this disclosure, consideration must also be given to time dependent transient conditions. The current lead design must account for the time lag between the changing electrical load and the corresponding response time for the current lead adjust/actuate/switch itself to meet the challenges of the electrical load. One of the factors that help determine which type of actuator or switch that is used to engage and disengage the current elements is the response time of the switch itself. As faster switch times are required faster actuators/switches are employed. When extremely fast engagement of current carrying elements is necessary, piezo-electric type actuators/switches may be employed. The advantages of these types of piezo-electric actuators/switches is their fast response time, while their disadvantage is their minimal stroke length, lower current carrying capacity of the current elements, and higher losses during steady state operation. If slower response times tens of ms are acceptable, pneumatic actuators/switches may be employed. The advantage of pneumatic actuators is their relatively low cost and ease of operation. If even slower, response times are acceptable, gear driven actuators/switches may be employed. The advantaged of gear driven actuators/switches is their long stroke length. The type or combination of types of actuators/switches comprising the current lead described in this disclosure is determined by the requirements of the application.

In one embodiment, the intelligent current lead device (170) is conduction cooled current lead comprised of multiple discrete current elements (10) comprised of similar homogenous materials, similar cross sectional area (A), and similar length (L), carrying a time dependent electrical load current $I_{load}(t)$. If the intelligent current lead (170) is configured to minimize heat transfer between the two temperature reservoirs and the electrical demand load ($I_{load}$) is small requiring only minimal current flowing through its current elements, then only a select number of current elements will be engaged to carry the load current, while other current elements remain disengaged. However, at some later time the demand load current may change to higher value (e.g. $2*I_{load}$). The diagnostic load sensors and instrumentation (180) will sense the change in load current and send this information to the control panel (200), where the program logic controller will adjust/actuate/switch the current lead device by engaging more current elements to handle the increase in electrical load current. There exists, however, a time lag or time delay ($t_d$) between the actual change in load current and the time that it takes for the current lead to adjust/actuate/switch to the new condition. The current elements must be designed so as to be able to carry the additional load current for time delay between actual load changes and the response time of the device. Each of the current elements of the device must be able to handle this time dependent load current to change without excessive heating to the point of failure. Under worst case adiabatic conditions (i.e. no heat transfer), the time dependent equation that determines this is sometime referred to as the Action Integral or "Hot Spot" equation and is given by:

$$\int_0^{t_d} I(t)^2 \, dt = A^2 \int_{T_i}^{T_f} \frac{C_p(T)}{\rho(T)} \, dT \quad [5]$$

There $t_d$ is the delay time, I(t) is the time dependent current flowing in the current element, A is the cross sectional area of current element, $C_p(T)$ is the temperature dependent heat capacity of the material over is two-dimensional cross section, $\rho(T)$ is the temperature dependent electrical resistivity of the material, $T_i$ is the initial temperature of the current element at the start time t=0, and $T_f$ is the final temperature that the current element can reach before damage or degradation to the element can occur. In eq. [5], the material properties of the current element are entered in on the right-hand-side, and the properties involving the operation of the current lead are entered in on the left-hand-side. For one skilled in the art, the typical manner in which eq. [5] is implemented is the material properties for the current element are entered in on the right-hand-side, and the know operational properties are entered in on the left hand side. Either the time delay ($t_d$) is solved for a maximum value $T_f$, or vice versa a time delay $t_d$ is entered to determine the maximum $T_f$. If the maximum temperature value $T_f$ is too high for a given time delay $t_d$, more cross section area A must be added to the current element to lower the final temperature $T_f$ to a safe value. Adding more cross sectional area A provides two benefits. First, it lowers the electrical resistance of the current element thereby reducing the Joule heat per cross section and second it provides more material and hence more heat capacity thereby lowering $T_f$ for a given heat generation.

The example given above on how the current elements must handle the transient condition under changing electrical load was for the simple conduction cooled current lead. For a gas cooled lead with adjustable mass flow, it is also possible to either increase or decrease the mass flow to handle the changes in electrical load. For example, if the electrical load were to suddenly increase to a higher value, the diagnostic sensors and instrumentation (180) would detect the load change and send the information to the control panel (200), where the program logic controller could increase the mass flow of the coolant gas. This would remove the additional Joule heat experienced by the current element during the transient load change. The temperature sensors would monitor the temperature of the current elements ensuring that the increased mass flow was enough to offset the additional Joule heat generation. The mass flow could then be slowly reduced to its prior normal levels once the transient increase in electrical load current was removed.

15. Multiple Materials Comprising the Current Element

One of the many advantages of the intelligent current lead (170) described in this disclosure is the use of multiple different materials comprising the current elements (10). Different materials have different electrical and thermal conductivities, which can be used to enhance the functionality of the embodiment. For example, materials such as Cu and Ag tend to have higher electrical and thermal conductivities than alloys such as brass and bronze, while still other materials have even lower electrical and thermal conductivities such as stainless steel. Thus, when higher currents are desired, higher electrical and thermal conductivity materials may be employed, while lower currents may employ materials with lower electrical and thermal conductivities. In some cases such as fault current limiting or high voltage cases it may also be advantageous to have a portion of the current elements comprises of electrically semi-conducting material such as SiC or carbon, or electrically insulating material such as a thermoplastic, or glass fiber re-enforced plastic, ceramic, etc. In still further cases it may be advantageous to include LTS or HTS materials in combination with non-superconducting materials.

For a select group of metals that roughly obey the so called Wiedemann-Franz law given by $\lambda/\sigma = L*T$, where L is the Lorentz number equal to $2.44 \times 10^{-8}$ W$\Omega$/K$^2$ and T is the temperature, the minimum heat load per unit current ($Q_{heat\_leak}/I$) transmitted via thermal and electrical conduction given by Eq. [4] is a roughly constant amount independent of the material. This implies that the same minimum heat load per current is obtained for a given length (L) divided by its cross section area (A) or so-called L/A ratio. Current elements (10) comprised of materials with lower electrical/thermal conductivities tend to provide shorter more compact designs than current elements comprised of materials with higher electrical/thermal conductivities. Various embodiments described in this disclosure take advantage of this valuable characteristic, see for example FIGS. 5, 6, 7, 11, 12, 13, 14, 15, 16. There are many methods and means in which multiple materials may be used to comprise the current elements. For example, each current element (10) may be comprised of the same homogenous material but each of the current elements is comprised of a different material or each current element may be comprised of different materials. If a single current element is comprised of multiple different materials, these different materials may be arranged in a series configuration or a parallel configuration or a combination of series and parallel.

The use of multiple materials comprising a single current element electrically connected in a parallel arrangement (see FIG. 8) may also be beneficial for time dependent applications and safety considerations. Take for example a simple conduction cooled current element with a circular cross section made of Cu which is known to obey the Wiedemann-Franz law (see FIG. 3b-left). Since the heat load per unit current (Q/I) is constant for a given L/A ratio, the current element may be shortened (i.e. made more compact) by decreasing the Cu's electrical and thermal conductivity. One method to accomplish this is to add Zn to the Cu to form a brass alloy or Sn to form bronze alloy. A similar method to lower the current elements electrical/thermal conductivity is to remove material from its core (see for example FIG. 3b-right). In doing so, the Cu current element L/A ratio may be effectively reduced thus making for a more compact (i.e. shorter) current element design. However, Eq. [4] is a steady state (time independent) design and does not account for the time dependence of the problem, see Eq. 5. In removing Cu material from the central core of the current element (FIG. 3b-right), there is now less mass per unit length, making the current element more susceptible to burnout under loss of coolant conditions. In one embodiment, one or more current elements is comprised of one or more materials electrically connected in a parallel arrangement (see FIG. 8). If the hollow core shown in FIG. 3b-right is replaced with a low electrical/thermal conductivity material such as stainless steel, then under steady state conductions when current is flowing in the current element, the current will primarily restrict its current flow to the higher conductivity Cu outer shell region with only marginal amount of current flowing in the higher electrical conductivity stainless steel core region. At low currents or zero current, inner stainless steel core thermally conducts only a small additional amount of parasitic heat leak $Q_{heat-leak}$. The advantage of this current element embodiment is during transient fault conditions such as the loss of coolant. The hollow core shown in FIG. 3b-right has been replaced with high heat capacity stainless steel (see Eq. [5]), providing additional time and protection against burnout with minimal additional heat leak during steady state conditions.

In one embodiment, one or more of the current elements described in this disclosure are electrically connected in a parallel arrangement and comprised on one or more materials (see for example FIGS. 5, 6 and 7).

In another embodiment, a single current element is comprised of one or more materials that are electrically connected in a series arrangement see for example 11, 12, 13, 14, 16.

In another embodiment, one or more current elements electrically connected in a parallel arrangement are comprised of one or more materials that are electrically connected in a series arrangement see for example 15.

In another embodiment, one or more current elements are comprised of one or more materials that are electrically connected in a parallel arrangement (see FIG. 8).

16. Contact Resistance Types

For the intelligent current lead (170) described in this disclosure, the current elements can be engaged and disengaged many thousands of times over the design life of the device. It is important that the contact resistance be kept as small as practical over the life of the device, with typical value less than $10^{-6}$ ohms-cm$^2$. There are many methods that the current elements can electrically and thermally connect the upper electrical bus (40) with the lower electrical bus (30). These types of connections include but are not limited to multi-lamination contacts, pressed contacts, screw contacts, slide contacts, liquid metal contacts, soldered contacts, among other types of contacts. Low contact resistance to a ceramic superconductor has been described in the prior art of Ekin et al. (U.S. Pat. Nos. 5,015,620 and 5,149,686), which is incorporated by reference in its entirety for the purpose of enablement. The advantage of the multi-lamination contact is that it can be engaged and disengaged tens of thousands of times with little degradation in the contact resistance from its original value.

17. Durability/Fatigue Issues

For the intelligent current lead (170) described in this disclosure, the current elements can be engaged and disengaged many thousands of times over the design life of the device. For mechanical to mechanical contacts, it is important to minimize the frictional wear between the two contacting surfaces. It is typically beneficial to use a lubricant between the mechanical surfaces to minimize wear which can degrade the electrical connection. There are many types of lubricants that can be used depending upon the particular application such as greases, waxes, metallic powders (e.g. Ag, Au, Cu, Al, etc.), other powders (e.g. graphite, $MoS_2$, Boron nitride, PTFE, etc.), dry lubricants, mixtures thereof, among other types of lubricants. It is important to select a lubricant that also maintains the low electrical contact between the current element and the contacting surface. For applications where at least one of the temperature reservoirs is below room temperature, it is important to select a lubricant that will not freeze at the temperature of operation. Dry lubricants such as $MoS_2$ are also possible to use in certain types of applications for the current lead.

18. Fault Current Limiting

One of the many advantages of the intelligent current lead (170) described in this disclosure is its potential for fault-current-limiting (FCL), if this feature is desired. Many types of superconducting fault current limiters have been described in related art, see for example U.S. Pat. No. 7,345,858 by Lee et al, U.S. Pat. No. 6,664,875 by Yuan et al., and U.S. Pat. No. 5,726,848 H. Boneig. Fault currents are time dependent transient currents typically of short duration and whose magnitude is much larger than the normal steady state design rating. Fault currents can be quite detrimental electrical networks and limiting their magnitude can be beneficial to the network. Fault currents can rapidly propagate through an electrical network causing damage or complete failure of electrical devices connected to the network. Fault currents can occur for a variety of reasons such as an accidental short to ground of a circuit within the electrical network, among other reasons. It is advantageous if the magnitude of these fault currents can be "limited" by rapidly injecting electrical resistance [$R_{injected}(t)$] in DC networks or rapidly injecting impedance [$Z_{injected}(t)$] in AC networks. The time dependent nature of $R_{injected}(t)$ and $Z_{injected}(t)$ reflects that the injected resistance and/or impedance does not typically happen instantaneously and can change in magnitude with time. A classic example of an FCL is a superconductor carrying current in a DC electrical network. Under normal operating steady state conditions, the superconductor, with its zero DC resistance, carries the electrical current without any voltage drop and hence no losses. When a transient fault current enters the electrical network, which is larger than the critical current of the superconductor, the superconductor transitions from its lossless superconducting state to its resistive normal state nearly instantaneously. In a fixed voltage DC network, this rapid rise in electrical resistance limits the magnitude of the fault current, see for example, C. Rey and A. P. Malozemoff, *Superconductors in the Electric Grid*, Ch. 5, Elsevier, ISBN: 978178242093, (2015), which is incorporated by reference in its entirety for the purposes of enablement.

Thus, when a fault current begins to propagate in an electrical network, the faster the resistance or impedance or both, can be injected into the network, the better to limit damage to the network. Relevant time scales in AC networks can vary but are typically on the first quarter of the first AC line cycle which is ~4 ms for a 60 Hz network, on the third to fifth power line cycles which is ~50-80 ms for a 60 Hz network, and ~the tenth to twelfth power line cycles which is ~160-200 ms for a 60 Hz network. For DC networks relevant time scales typically vary between 0.5 ms and about 100 ms. For example, in a fault condition such as a short to ground of one of the lines, by rapidly injecting resistance in a fixed voltage DC network, the potential fault current can be limited from its "prospective" value of $I_{prospective}=V_{network}/R_{ground\_short}$ to its actual "limited" value $I_{limited}(t)=V_{network}/[R_{ground\_short}+R_{injected}(t)]$. The time dependent nature of $I_{limited}(t)$ is reflective that $R_{injected}(t)$ typically does not occur instantaneously and/or its magnitude may change with time once it has been injected into the network. If the injected resistance is temperature dependent (e.g. a metal), heating for example, may cause the injected resistance $R_{injected}(t)$ to vary with time once inserted into the network.

There are many ways and means for the intelligent current lead described in this disclosure to rapidly inject resistance or impedance or a combination of both into AC and DC networks in order to limit fault currents. Several embodiments will be described in this disclosure but it is recognized that not all can be described and one with ordinary skill in the art would recognize other means by adjusting the parameters of the current lead device.

In one embodiment, the fault current in a fixed voltage network could be limited by the current lead (170) described in this disclosure by simply retracting all but one the discrete current elements (10) electrically connected in parallel. This would rapidly decrease the net effective cross sectional area of the current elements (10) in parallel and hence increase the net electrical resistance of the current path, see for example the superconducting current limiting element described by H. Kubota in U.S. Pat. No. 7,359,165. In the simplest example, suppose two identical current elements (10) were comprised of the same homogenous material with bulk intrinsic electrical resistivity ($\rho$) and these two identical current elements (10) were electrically connected in parallel to a common bus (20 and 30). The net electrical resistance of this simple two current element network is then given by $R_1=\rho L/A_T$, where $A_T$ is the total cross sectional area of the two current elements $A_T=A_1+A_2$. Assuming that the bulk intrinsic resistance of the current elements (10) is much larger than the combined contact resistances to the electrical bus (40 and 50) and hence the contact resistance can be neglected, disconnecting one of the current elements (10) in parallel would reduce the cross sectional area by ½ and thus the new electrical resistance would be twice the value of the original two current element parallel network and is given by: $R_2=\rho L/(A/2)$ or $=2R_1$. Similarly, if three current elements (10) were electrically connected in parallel with all current elements (10) were comprised of identical bulk intrinsic resistance, retraction of two of the three current elements would result three times the value $R_3=\rho L/(A/3)=3R_1$, and so on for more current elements. Therefore, if a fault current were detected in the electrical network, one of the current elements (10) could be retracted and hence change increase the net electrical resistance by a factor of two and thereby limiting the magnitude of the fault current, assuming the current element (10) could be retracted fast enough to be beneficial.

In another embodiment, the fault current could be further limited by having current elements (10) of different bulk intrinsic electrical resistance. Take for example the simple two current element network described in the previous embodiment with identical current elements (10) of the same overall length (L) and cross sectional area (A). In this example, however, one current element could be comprised of high conductivity copper and the other current element could be comprised of high electrical resistance stainless steel or even higher electrically resistive silicon carbide (SiC), Carbon, graphene, among other types of highly resistive materials. Suppose in this example, the bulk intrinsic resistivity of Cu ($\rho_{Cu}$) is twenty (20) times smaller than the bulk intrinsic resistivity of stainless steel or $20*\rho_{cu}=\rho_{ss}$. In normal steady state with both current elements electrically connected in parallel, the Cu current element is carrying the majority (20⁄21) of the current while the stainless steel current element carries only a tiny fraction of current (1⁄21). If a fault current were detected in the electrical network, the Cu current element could be rapidly retracted leaving only the stainless steel current element with its 20 times larger electrical resistance, thus further limiting the magnitude of the fault current. Since fault currents by their nature are short duration transients, to limit excessive heating in the remaining stainless steel current element beyond what is necessary, the high conductivity Cu current element would be rapidly reengaged by the actuator once the transient fault current had cleared. The high conductivity Cu current element would then carry the bulk of the normal steady state current allowing for the stainless steel current element to cool down and recover. If the current lead were a gas cooled current lead, additional coolant gas could be provided to the stainless steel current element to help speed cool down and recovery to normal operating condition. Once the stainless steel current element had cooled down and recovered, the mass flow rate of the gas coolant could be reduced to its normal steady state value. In this embodiment, a combination of multiple high conductivity and low conductivity current elements electrically connected in parallel could be added to adjust/actuate/switch the steady state current carrying capacity and fault current resistance as required.

In another embodiment, the fault current could be further limited by using a combination of different bulk intrinsic resistances ($\rho$), varying lengths (L), and varying cross sectional areas (A). To illustrate by simple example, we once again turn to our simple two current elements electrically connected in parallel in a fixed voltage DC network. One current element is comprised of high conductivity material (e.g. Cu) and the other current element is comprised of high resistivity material (e.g. stainless steel). Both current elements are comprised of the same overall length (L) and same outer cross sectional dimension ($A_{od}$). In this embodiment, however, the stainless steel current element is a hollow shell of wall thickness (d). Now the bulk intrinsic resistance of the stainless steel current element is much higher than in the previous embodiment where the stainless steel current element was a solid homogenous material of cross sectional area. To illustrate by example, in this embodiment that the net cross sectional area of the hollow stainless steel current element of wall thickness d was 10 times less than the equivalent solid homogenous current element. The bulks resistance of the hollow stainless steel current element is then given by $R_{ss}=\rho_{ss}*(L/A_{ss\_shell})$. Substituting in that $\rho_{ss}=20*\rho_{cu}$ and $A_{ss\_shell}=A_{ss\_solid}/10$, $R_{ss}=200*\rho_{Cu}*(L/A_{Cu})$.

If a fault current were detected in the electrical network, the Cu current element could be rapidly retracted leaving only the hollow stainless steel current element with its 200 times larger electrical resistance, thus further limiting the magnitude of the fault current. To limit the temperature rise in the hollow stainless steel current element, the core of the stainless steel shell could be filled with high heat capacity material (electrically isolated from the stainless steel shell) that could help absorb the Joule heat and limit overheating. Since fault currents by their nature are short duration transients, to limit excessive heating in the stainless steel current element beyond what is necessary, the high conductivity Cu current element would be rapidly reengaged by the actuator once the transient fault current had cleared. The high conductivity Cu current element would then carry the bulk of the normal steady state current allowing for the stainless steel current element to cool down and recover. If the current lead were a gas cooled current lead, additional coolant gas could be provided to the stainless steel current element to help speed cool down and recovery to normal operating condition. Once the stainless steel current element had cooled down and recovered, the mass flow rate of the gas coolant could be reduced to its normal steady state value. In this embodiment, a combination of multiple high conductivity and low conductivity current elements electrically connected in parallel could be added to adjust/actuate/switch the steady state current carrying capacity and fault current resistance as required.

In another embodiment, the fault current could be further limited by using a combination of different bulk intrinsic resistances ($\rho$), varying lengths (L), and varying cross sectional areas (A).

To illustrate by simple example, we once again turn to our simple two current elements electrically connected in parallel in a fixed voltage DC network. One current element is comprised of high conductivity Cu and the other current element is comprised of high resistivity stainless steel. Both current elements are comprised of the same overall cross sectional area (A) but of different length (L). if for example, The Length of the stainless steel current element were twice as long as the Cu current element, then the bulk intrinsic resistance of the stainless steel current element is given by $R_{ss}=\rho_{ss}*(L/A_{ss\_solid})$, then by substituting in that $\rho_{ss}=20*\rho_{cu}$ and $L_{ss}=2L_{Cu}$, $R_{ss}=40*\rho_{Cu}*(L_{Cu}/A_{Cu})$.

In yet another embodiment, a combination of materials of varying bulk intrinsic resistances, varying overall lengths, and varying cross sectional areas is optimized for maximum fault current limiting, while minimizing temperature rise in the current elements. In this embodiment, it may be advantageous to include one or more semi-conducting type materials such as SiC, Carbon, graphite, graphene, chemically doped materials, among other type of semi-conducting materials. An advantage of using semi-conducting material is to further increase the resistance per unit length over traditional metal alloys such as stainless steel or equivalent, thus making or a more compact overall FCL device.

19. Fault Current Limiting in an AC Networks

Fault current limiting in an AC network or a transient DC network is quite similar to that of a DC network described above. In a fixed voltage AC network or a transient DC network, the rapid injection of circuit impedance is required for limiting fault currents. Relevant time scales for the rapid injection of circuit impedance have been given in the previous section. In one embodiment, the multiple current elements (10) provide the dominant circuit impedance. The impedance of the i(th) current element is given by: $Z_{element\_i}=[R_{element\_i}^2+(\omega L_i)^2-(1/\omega C_i)^2]^{1/2}$, where $L_i$ and $C_i$ are the inductance and capacitance of the i(th) current element (10). One simple method to rapidly increase/decrease circuit inductance (L) is through the inclusion of magnetic permeable material such as iron, nickel, cobalt, steels, alloys thereof, among other permeable materials.

In one embodiment, the current elements (10) are electrically connected to inductor coils (300) and comprised of high conductivity materials including, Cu, Al, Ag, Au, Ni, Sn, alloys and mixtures, thereof among other high conductivity materials. The coils have an electrical resistance ($R_{coil\_i}$) and inductance ($L_{coil\_i}$), so that the impedance of the i(th) current element/coil is $Z_{element\_i}=[R_{coil\_i}^2+L_{coil\_i}^2]^{1/2}$. In the event of a fault current, by rapidly engaging or disengaging the current elements (10), which are wound into coils, via the passive actuators (300), electrical impedance can be rapidly injected into the AC network thereby limiting the magnitude of the fault current in the fixed voltage network.

In another embodiment, the current elements (10) are comprised of magnetic permeable materials (310) of electrical resistance and inductance.

In yet another embodiment, the current elements (10) are electrically connected to inductor coils (300) that are wrapped around cores comprising magnetic permeable materials (310). The inductance of the current element coil and hence its corresponding electrical impedance is significantly enhanced by the magnetic permeable material (310). In the event of a fault current, by rapidly engaging or disengaging the current elements (10), which are wound into coils around magnetic permeable cores, via the passive actuators (300), electrical impedance can be rapidly injected into the AC network thereby limiting the magnitude of the fault current in the fixed voltage network 20. Current Distribution and Current Balancing As described in previous sections, one method among several of reducing the heat load to the low temperature reservoir (150) is to have multiple discrete current elements (10) electrically connected in parallel and to only engage those current elements (10) necessary to match the required incoming power load as measured by the diagnostics (100). When multiple discrete current elements (10) are connected electrically in parallel to adjust/actuate/switch the current carrying capacity of the current lead (170), however, it is important to design the discrete current elements (10) and the upper (20) and lower (30) electrical bus so that there is equal current flow (110) among the multiple current elements (10). If unequal current flows among the multiple elements in parallel, then it is possible that one or more current elements (10) may heat preferentially over the other, which could be undesirable in normal operation of the current lead device (170). Note, in fault current conditions, unequal current flow may be desirable to limit the magnitude of fault currents, but that description is delayed to another section. Unequal current flow (110) among the discrete current elements (10) could be caused by numerous conditions, but a common issue causing unequal current flow (110) are variations within the contact resistance between the current elements (10) and either the upper electrical bus (20) or the lower electrical bus (30) or both. To remedy the situation of unequal current flow among the current elements (10) that are electrically connected in parallel caused by variations in contact resistance, it is possible to provide either resistive balancing or reactive (AC circuits only) balancing or a combination of both. Reactive balancing mostly pertains to AC circuits and not typically applicable to DC circuits except during transient conditions. To illustrate one of several methods to minimize unequal current flow caused by variations in the contact resistance of the multiple current elements (10) electrically connected in parallel a simple resistive balancing approach is described below.

If the total electrical resistance ($R_{i\_T}$) of the i(th) discrete current element ($10$—$R_{element\_i}$) electrically connected in parallel and its corresponding contact resistance ($R_{ci\_upper}$) to the upper electrical bus (20) and lower electrical bus ($30$—$R_{ci\_lower}$) is given by $R_{i\_T}=(R_{element\_i}+R_{ci\_upper}+R_{ci\_lower})$, then by Kickoff's laws, the current flowing through the i(th) current element in a fixed drive voltage system ($V_{max\_drive}$) is given $I_i=V_{max\_drive}/R_{i\_T}$. For simplification, it is assumed that $R_{ci}$ upper is approximately equal to $R_{ci}$ lower, so that $R_{i\_T}=R_{element\_i}+2R_{ci}$. In a system of current elements electrically connected in parallel, the equivalent parallel network resistance ($R_{eq}$) is given by $1/R_{eq}=\Sigma 1/R_{element\_i}$. For a further simplified two current element (10) parallel network, the equivalent parallel resistance reduces to $R_{eq}=R_{1\_T}*R_{2\_T}/(R_{2\_T}+R_{1\_T})$. If by design $R_{element\_i}$ is selected so that $R_{element\_i}>>R_{ci}$, then the equivalent two current element (10) parallel network electrical resistance reduces to $R_{eq}=R_{element\_1}*R_{element\_2}/(R_{element\_2}+R_{element\_1})$. Thus, the key to providing equal current flow (110) among the current elements (10) using a resistive balancing technique is to design the appropriate current element resistance so that $R_{element\_i}>>R_{ci}$. In this manner, it is the more precise, predictable, and repeatable $R_{element\_i}$ that determines the current flow through the circuit and not the less repeatable and more variable $R_{ci}$. A similar technique can be used in AC circuits by using inductive balancing techniques. Similarly, the key to providing equal current flow (110) among the discrete current elements (10) using a reactive balancing technique is to design the appropriate current element reactive impedance so that $Z_{element\_i}>>R_{ci}$, where $Z_{element\_i}=[R_{element\_i}^2+(\omega L_i)^2-(1/\omega C_i)^2]^{1/2}$, where $L_i$ and $C_i$ are the inductance and capacitance of the i(th) current element (10).

In one embodiment, resistive balancing is provided by providing a precise, uniform, and repeatable electrical resistance in series with the current element contact resistance so that the bulk resistance of the current element (10) exceeds the potential contact resistance. It is important not to select an excessively large series resistance in order to avoid excessive heating.

In another embodiment, reactive balancing is provided by providing a precise, uniform, and repeatable electrical impedance in series with the current element contact resistance, so that the bulk series impedance of the current element (10) exceeds the potential contact resistance. The impedance of the current element $[R_{element\_i}^2+(\omega L_i)^2-(1/\omega C_i)^2]^{1/2}$ at a specified frequency in an AC circuit can be adjusted by varying the current elements (10) resistance, capacitance, inductance, or a combination of all three. One such common method to easily adjust/actuate/switch the inductance of the current element (10) and hence its reactive impedance $\omega L$ (measured in ohms) is to include magnetic permeable material such as Fe, Ni, Co, alloys thereof, among other permeable materials in the current element (10). The inclusion of magnetic permeable materials in the current elements (10) can have large variations in the inductance and hence reactive impedance.

21. Electrical Bus

The design of both the upper electrical bus (20) and the lower electrical bus (30) is also important to insure equal current flow (110) among the current elements electrical connected in parallel. In one embodiment, the upper (20) and lower (30) electrical buses have a circular or cylindrical (in 3-d) geometry. By using a circular or cylindrical geometry for these components and assuming that buses' materials composition/homogeneity and geometrical tolerances are tightly controlled, equal current sharing among the current element (10) can be achieved since the current distribution is azimuthally (i.e. in θ direction) symmetric. In an azimuthally symmetric electrical bus design, there is equal resistance (DC circuits) and equal impedance (AC circuits) in all directions leading to uniform current flow throughout the bus. It should also be noted that in certain designs of the intelligent current lead device (170) an electrical bus (20) and 30) may not be necessary. An example of such a device is one using only a single current element (10) that is comprised of multiple different materials (240) along its axial length (230).

In another embodiment, a linear or rectangular shaped electrical bus is used for the upper electrical bus (20) or the lower electrical bus (30) or both. For a linear or rectangular shaped bus, it is more convenient to use a Cartesian coordinate system (x, y, z) to describe its design and dimensions. A linear or rectangular shaped electrical bus may be advantageous in tight geometrical places such as on board a ship or airplane, where there is more space available in a linear dimension than a circular/cylindrical shaped bus will allow. A linear bus with multiple discrete current elements lined up in a row, however, presents a challenge for equal current flow among current elements electrically connected in parallel. Suppose, for example, the electrical bus was comprised of a homogenous conductor (e.g. Cu, Al, brass, stainless steel, etc.) of total length ($L_{bus}$) and constant cross-sectional area ($A_{bus}$). Then the electrical resistance per unit length of that bus would be given by $R_{bus}(x)=\rho(x/A_{bus})$, where $\rho$ is the bulk intrinsic electrical resistivity of the material, typically measured/reported in ohm-m (Ω-m) or ohm-cm (Ω-cm). For example, the bulk resistivity of Cu and Al at room temperature is $\rho_{cu}\sim 1.6\times 10^{-6}$ Ω-cm and $\rho_{Al}\sim 2.7\times 10^{-6}$ Ω-cm, respectively. For a linear row of multiple current elements (10) and assuming all other parameters such as contact resistance $R_{ci}$ and current element resistance $R_{element\_i}$ were equal, the current flow (110) through each of the discrete current elements (10) electrically connected in parallel would depend upon the linear position of the current element in the row→increasing with increasing distance from the power source (140). In this scenario, the first current element in the row would carry more current than the i(th) current element (10) by an amount proportional to the linear distance between the current elements (10). This would cause the first current element to heat preferentially compared to its nearest neighbors. There are many ways to solve this unwanted current flow; however, two embodiments are described in this disclosure.

In one embodiment, the upper (20) and lower (30) bus are linear or rectangular shaped of constant homogenous material with intrinsic electrical resistivity $\rho$, total length $L_{bus}$ but variable (not constant) cross-sectional area ($A_i$), so that $R_{bus}(x,y,z)=\rho[x/(y_{bus}*z_{bus})$ were a constant. The cross-sectional area of the bus is varied (i.e. in the y and z directions)

along its linear length (x direction) so that the net electrical resistance as seen by current flow (110) is uniform. This will insure equal current flow (110) in all current elements (10) arranged in a linear row.

In another embodiment, the upper (20) and/or lower (30) bus are linear or rectangular shaped of constant homogenous material p, total length $L_{bus}$ and constant cross-sectional area ($A_{bus}$). In this embodiment, however, the electrical bus (either upper, lower, or both) is comprised of superconducting material where its intrinsic electrical resistance below its superconducting transition temperature $T_c$ is zero ($\rho$=0). When $\rho$=0, there is no voltage drop along the length of the electrical bus and hence it is an equipotential surface. With the electrical bus being an equipotential path for the current flow and assuming all other factors (e.g. $R_{ci}$, $R_{element\_i}$, $Z_{element\_i}$, etc.) are mostly equal, uniform current flow among the current elements (10) is achieved. Typical superconducting materials include but are not limited to: NbTi, Nb$_3$Sn, Nb$_3$Al, MgB$_2$, ReBaCuO, BiSrCaCuO, TlBaCaCuO, HgBaCaCuO, iron pnictides, iron chalcogenides, among other superconducting materials.

In another embodiment for the linear or rectangular shaped bus, a combination of variable cross sectional area is used on electrical bus operating at the higher temperature reservoir (130) and a superconducting material (e.g. NbTi, Nb$_3$Sn, ReBacuO, BiSrCaCuO, etc.) comprises the material for the electrical bus operating at the lower temperature reservoir (150) and the low temperature reservoir is operated at a temperature less than the $T_c$ of the superconducting bus.

In another embodiment, there is no upper (20) or lower electrical (30) bus at all. The current (110) from the power source (120) is carried directly through one or more of the actuators (80). The actuators are electrically isolated from ground via the upper and lower voltage bushings (60 and 70). Electrical connection from the one or more actuators (80) to the device (140) is made via the lower electrical connection (60).

22. Active and Passive Switching

Throughout the majority of this disclosure, a so called "active" switching method has been described in the operational modes and methods of the current lead. In an actively controlled "smart switch," the diagnostic sensors and instrumentation (100) are used to monitor the various parameters within the current lead device (i.e. current, voltage, temperature, pressure, mass flow, etc.). The information obtained from these diagnostic sensors is read, interpreted, and analyzed by the program logic control and algorithms which are used to send commands to the actuators for the current lead to adjust/actuate/switch itself in some manner to optimize the current lead to the particular condition. It is also possible to use a so-called "passive" switching method for the various operational modes and methods of the current lead. In a passively controlled "smart switch," the program logic control of the smart switch is bypassed in-part or in whole depending upon the design. In the passively controlled intelligent current lead (170), one or more passive actuators provide the means to engage and disengage one or more of the current elements (10). As described previously, a passive actuator as described in this disclosure is one that does require an external power source to engage and/or disengage one or more of the current elements. Current elements (10) are passively actuated/switched as a result of and/or in response to the magnitude of the current flowing (110) through the intelligent current lead (170). The higher the magnitude of the current flow (110) within the intelligent current lead (170), the higher the number of current elements (10—i.e. large cross sectional area A) that are engaged. Similarly, the smaller the magnitude of the current flow (110) within the intelligent current lead (170), the fewer the number (i.e. smaller cross sectional area) that are engaged. Passive actuators need not be limited to only changes in current but could also be designed to respond to changes in voltage (e.g. piezo-electric switches), temperature (e.g. bi-metallic switches), magnetic field (magneto-strictive), pressure, mass flow rate, or combinations thereof. Possible types of passive actuators include but are not limited to: inductors, capacitors, wax motors, piezo-electric switches, bi-metallic switches, magneto-strictive, among other types of passive actuators.

In one embodiment, the passive actuator (300) is an inductor which acts similar to a spring that contracts when the magnitude of the current flow (110) through the inductor/spring increases due to the increasing electromagnetic Lorentz force. The passive actuator (i.e. inductor/spring) then expands or re-expands when the magnitude of the current flow (110) decreases. The expansion and contraction of the passive actuator (i.e. inductor) engages and disengages the current element.

A means to enhance the electromagnetic force between the passive actuator (300) and the current element (10) is to include magnetic permeable material (310) on or near the current element (10). In this embodiment, as current flow (110) through the passive actuator (300) increases in magnitude, both the inductor/spring contracts due to the electromagnetic Lorentz force as well as the magnetic permeable material being magnetically attracted to the inductor. The magnetic force of attraction is given by:

$$F_{mag} = m \cdot \text{grad } B \qquad [6]$$

where m is the magnetic moment of the magnetic permeable material and grad B is the gradient of the magnetic field experienced by the magnetic permeable material. The magnetic field is created by the flow of current (110) through the passive actuator (i.e. inductor). For more information on the electromagnetic attractive force see also M. Nayfeh and M. Brussesl, *Electricity and Magnetism*, John Wiley: New York, 1985.

Similarly, as the magnitude of the current flow (110) decreases through the passive actuator, the inductor/spring relaxes (i.e. re-expands) due to the decrease in the electromagnetic force.

Various modifications to the Intelligent Low Heat Leak Current Lead and its corresponding Program Logic Control described herein should become apparent from the above description of the various embodiments. Although the Low Heat Leak Current Lead device and its corresponding Program Logic Control have been described in detail from the embodiments, it should be understood that this explanation is for clarity and illustration and the invention is not limited to these embodiments. Various types of intelligent Current Lead devices and their operation techniques will thus be apparent to those skilled in the art in view of this disclosure. Modifications are thus contemplated and may be made without departing from the spirit of the invention, which is defined by the claims.

23. Detailed Description of FIG. 1

Shown in FIG. 1 is a 2-dimensional cross-sectional view of the overall electrical schematic of the intelligent current lead device (170). The intelligent current lead device (170) is comprised of many parts and components; several of the major parts and components including but are not limited to are those identified in FIG. 1. The optimized current elements (10) electrically and thermally connect and/or disconnect the upper electrical bus (20) to the lower electrical bus (30). The upper electrical connection (40) connects the current lead to the power source (120) operating at temperature reservoir A (130). The lower electrical connection (50) electrically connects the current lead to the machine or device (140) operating at temperature reservoir B (150). The upper and lower voltage bushing (60 and 70) electrically isolates the current elements (10) that operate at voltage potential from the grounded components. The actuator (80) is used to engage and disengage the current elements (10) from the upper and lower electrical buses (20 and 30). The actuator bushing (85) electrically isolates the current elements (10) at potential from the grounded actuator. The vacuum enclosure (90) hermetically seals and thermally isolates the power source (120) from the machine or device (140). Diagnostic sensors and instrumentation (100) are used to monitor the operating conditions of the current lead and its various components. Current flows (110) from the power source (120) operating at temperature reservoir A (130) through the various components to the machine or device (140) operating at temperature reservoir B (150). A support structure (160) is used to mount the intelligent current lead device (170) where appropriate. Wiring for the diagnostic instrumentation (100) is fed through a hermetically sealed and electrically isolated instrumentation bushing (180) which is then fed into a control panel (190). The control panel contains the necessary instruments to monitor the operation of the intelligent current lead (170), which are controlled by the program logic (200).

24. Detailed Description of FIG. 2a

Shown in FIG. 2a on the left is a 2-dimensional cross-sectional view of a simplified schematic of the intelligent current lead (170) showing only the discrete current elements (10) and the upper and lower electrical buses (20 and 30). The other major components of the current lead device (170) have been omitted from this figure for clarity and presentation purposes only. In the embodiment shown in FIG. 2a on the left, there is a plurality of discrete current elements (10) ranging in number from $N_1, N_2 \ldots N_m$ (220) with each of the current elements (10) electrically connected in parallel. Each of the discrete current elements (10) are comprised of similar homogeneous material (e.g. Cu, Al, stainless steel, Sn, Ni, brass, bronze, carbon fiber, among other materials) with each discrete current element (10) having similar cross sectional area (A)-(210). Thus, the current carry capacity and heat transfer from the power source (120) operating at temperature reservoir A (130) to the machine or device (140) operating at temperature reservoir B (150) can be adjusted or varied by engaging one or more of the similar discrete current elements (10) via the one or more actuators (80—not shown). For example, if each of the similar discrete current elements (10) is capable of carrying 100 A, then when one current element (10) is engaged the current lead device (170) can carry an optimized 100 A, with two current elements engaged and electrically connected in parallel it can carry an optimized 200 A, three engaged and electrically connected in parallel 300 A, and so on. All of the discrete current elements (10) shown in this embodiment can be disconnected from either the upper or lower electrical buses (20 and 30) or both, to electrically and thermally isolate the power source (120) from the machine or device (140) if desired.

25. Detailed Description of FIG. 2b

Shown in FIG. 2b on the right is a 2-dimensional cross-sectional view of a simplified schematic of the intelligent current lead (170) showing only the discrete current elements (10) and the upper and lower electrical buses (20 and 30). The other major components of the current lead have been omitted from this figure for clarity and presentation purposes only. In the embodiment shown in FIG. 2b on the right, there is a plurality of discrete current elements (10) ranging in number from $N_1, N_2 \ldots N_m$ (220) with each of the current elements (10) electrically connected in parallel. Each of the discrete current elements (10) are comprised of similar homogeneous material (e.g. Cu, Al, stainless steel, Sn, Ni, brass, bronze, etc.) with similar lengths (L) each discrete current element having a different cross sectional area ranging from $A_1, A_2 \ldots A_n$ (210). Thus, the current carry capacity and heat transfer from the power source (120) operating at temperature reservoir A (130) to the device (140) operating at temperature reservoir B (150) can be adjust/actuate/switched or varied in two manners: a) by engaging one ($N_1$) or more ($N_m$) (220) of the discrete current elements (10) via the one or more actuators (80—not shown) and b) since each of the discrete current elements (10) is comprised of a different cross sectional area ($A_n$) (210), not only can the number ($N_m$)—(220) of discrete current elements be adjusted/actuated/switched, so too can the cross sectional area ($A_n$—210) of the desired current element. For example, if each of the different discrete current elements (10) is capable of carrying twice the current of the next smaller sized current element and the smallest sized current element is rated to carry an optimized 100 A, then when the smallest current element is engaged the current lead device can carry an optimized 100 A, with two current elements engaged and electrically connected in parallel it can carry an optimized 300 A (i.e. 100 A+2*(100)) A), three engaged and electrically connected in parallel 700 A (i.e. 100 A+2*(100 A)+2*(300 A), and so on. Any arbitrary current carrying capacity can be designed by one skilled in the art to meet a desired current level. All of the discrete current elements (10) shown in this embodiment can be disconnected from either the upper or lower electrical bus (20 and 30) or both, to electrically and thermally isolate the power source (120) from the machine or device (140) if desired.

26. Detailed Description of FIG. 3a

Shown in FIG. 3a on the top left is a 2-dimensional cross sectional view of a simplified current element (10) of triangular shape. The other major components of the current lead device (170) have been omitted from this figure for clarity and presentation purposes only. The current element (10) shown in FIG. 3a top left is comprised of a single solid homogenous material. Shown of the right side of FIG. 3a is a triangular shaped current element with a hollow core in which material has been removed from its interior. Material may be removed from the interior of the current element (10) to increase the electrical and thermal conductivity of the current element (10).

27. Detailed Description of FIG. 3b

Shown in FIG. 3b on the bottom left is a 2-dimensional cross sectional view of a simplified current element (10) of circular shape. The current element (10) shown in FIG. 3b bottom left is comprised of a single solid homogenous material of cross sectional area $A_1$-(210). Shown of the right side of FIG. 3b is a 2-dimensional circular shaped current element (10) with a hollow core in which material has been removed from the center having cross sectional area $A_2$-(210). The current element (10) has a tubular shell with inner radius $R_i$, outer radius $R_o$, and wall thickness $t=R_o-R_i$. Material may be removed from the interior of the current element (10) to increase the electrical and thermal resistivity of the material. The wall thickness of the tubular shell may be either increased or decreased as necessary to optimize the current element (10).

28. Detailed Description of FIG. 3c

Shown in FIG. 3c on the bottom right is a 2-dimensional cross sectional view of a simplified current element (10) of square shape. The current element shown in FIG. 3c bottom right is comprised of a single solid homogenous material of cross sectional area $A_1$ (210). Shown on the right side of FIG. 3c is a 2-dimensional square shaped current element (10) with a hollow core in which material has been removed from the center having cross sectional area $A_2$ (210). The current element (10) has a square shell has wall thickness t. To one skilled in the art, other cross sectional shapes are possible including but not limited to: rectangular, hexagonal, octagonal, among other shapes depending upon the needs of the application.

29. Detailed Description of FIG. 4

Shown in FIG. 4 is a 2-dimensional cross-sectional view of a simplified electrical schematic of the intelligent current lead (170) showing only the discrete current elements (10). The other major components of the current lead device (170) have been omitted from this figure for clarity and presentation purposes only. In the embodiment depicted in FIG. 4, there is a plurality of discrete current elements (10) ranging in number from $N_1, N_2 \ldots N_m$ (220) with each of the current elements (10) electrically connected in parallel. Each of the discrete current elements (10) are comprised of similar, solid, homogeneous material (e.g. Cu, Al, stainless steel, Sn, Ni, brass, bronze, carbon, SiC, Nb, NbTi, Nb—Sn, Nb—Al, Mg—B, Re—Ba—Cu—O, Bi—Sr—Ca—Cu—O, etc.) with each discrete current element (10) having similar cross sectional area (A)-(210), but with different axial lengths ranging from $L_1, L_2 \ldots L_n$-(230). Thus, in this embodiment the current carry capacity and heat transfer from the power source (120) operating at temperature reservoir A (130) to the device (140) operating at temperature reservoir B (150) can be adjusted/actuated/switched or varied by engaging one or more of the discrete current elements ($N_1 \ldots N_m$) (220) via the one or more actuators (80—not shown). All of the discrete current elements (10) shown in this embodiment can be disconnected from either the upper or lower electrical bus (20 and 30) or both, to electrically and thermally isolate the power source (120) from the device (140) if desired.

30. Detailed Description of FIG. 5

Shown in FIG. 5 is a 2-dimensional cross-sectional view of a simplified electrical schematic of the intelligent current lead (170) showing only the discrete current elements (10) and the upper and lower electrical buses (20 and 30). In the embodiment shown in FIG. 5, there is a plurality of discrete current elements (10) ranging in number from $N_1, N_2 \ldots N_m$ (220) with each of the current elements (10) electrically connected in parallel. Each of the discrete current elements (10) are comprised of different homogeneous material (e.g. Cu, Ag, Al, stainless steel, Sn, Ni, brass, bronze, SiC, carbon, Nb, NbTi, Nb—Sn, Nb—Al, Mg—B, Re—Ba—Cu—O, Bi—Sr—Ca—Cu—O, etc.) with each discrete current element (10) having similar cross sectional area (A)-(210) and length (L)-(230). Thus, in this embodiment the current carry capacity and heat transfer from the power source (120) operating at temperature reservoir A (130) to the device (140) operating at temperature reservoir B (150) can be adjust/actuate/switched or varied by engaging one or more of the different material discrete current elements ($N_1 \ldots N_m$) (220) via the one or more actuators (80—not shown). For example, if one of the discrete current elements (10) is comprised of a material with high electrical/thermal conductivity (e.g. Cu, Ag) and optimized to carry a nominal 100 A, the second current element may be comprised of a material with slightly lower electrical/thermal conductivity (e.g. Al) and optimized to carry a nominal 50 A, while a third discrete current element may be comprised of a still lower electrical/thermal conductivity (e.g. brass) and optimized to carry a nominal 25 A, and so on. Thus, with all three different current elements engaged and electrically connected in parallel the total optimized current carry capacity is 175 A=100 A+50 A+25 A, or any combination or permutation in between. Thus to one skilled in the art, there are many possible current carrying capacity permutations and combinations that are possible depending upon the electrical/thermal conductivity of the material comprising the current element (10). All of the discrete current elements (10) shown in this embodiment can be disconnected from either the upper or lower electrical bus or both, to electrically and thermally isolate the power source (120) from the device (140) if desired.

31. Detailed Description of FIG. 6

Shown in FIG. 6 is a 2-dimensional cross-sectional view of a simplified electrical schematic of the intelligent current lead (170) showing only the current elements (10) and the upper and lower electrical buses (20 and 30). The other major components of the current lead have been omitted from this figure for clarity and presentation purposes only. In the embodiment shown in FIG. 6, there is a plurality of discrete current elements (10) ranging in number from $N_1, N_2 \ldots N_m$ (220) with each of the current elements (10) electrically connected in parallel. Each of the discrete current elements (10) are comprised of a plurality of different homogeneous materials (e.g. Cu, Ag, Al, stainless steel, Sn, Ni, brass, bronze, SiC, carbon, Nb, NbTi, Nb—Sn, Nb—Al, Mg—B, Re—Ba—Cu—O, Bi—Sr—Ca—Cu—O, etc.) with each discrete current element (10) having different cross sectional area (A) (210) but all having similar axial length (L) (230). In this embodiment, the current carry capacity and heat transfer of the current elements (10) connecting the power source (120) operating at temperature reservoir A (130) to the device (140) operating at temperature reservoir B (150) can be adjusted/actuated/switched or varied in several manners: a) by engaging one or more of the different material discrete current elements ($N_1 \ldots N_m$) via the one or more actuators (80—not shown), b) by adjusting/actuating/switching the cross sectional area ($A_n$) (210) of the current element (10), and c) by adjust/actuate/switching the electrical/thermal conductivity of the material comprising the current element (10). All of the discrete current elements (10) shown in this embodiment can be disconnected from either the upper or lower electrical bus or both, to electrically and thermally isolate the power source (120) from the device (140) if desired.

32. Detailed Description of FIG. 7

Shown in FIG. 7 is a 2-dimensional cross-sectional view of a simplified electrical schematic of the intelligent current lead (170) showing only the current elements (10) and the upper and lower electrical buses (20 and 30). The other major components of the current lead device (170) have been omitted from this figure for clarity and presentation purposes only. In the embodiment shown in FIG. 7, there is a plurality of discrete current elements (10) ranging in number from $N_1, N_2 \ldots N_m$ with each of the current elements (10) electrically connected in parallel. Each of the discrete current elements (10) are comprised of different homogeneous material (e.g. Cu, Ag, Al, stainless steel, Sn, Ni, brass, bronze, SiC, carbon, etc.) with each discrete current element having similar cross sectional area (A) (210) but all having the different axial length ($L_1 \ldots L_n$) (230). Thus, in this embodiment the current carry capacity and heat transfer of the current elements (10) that electrically and thermally connect the power source (120) operating at temperature reservoir A (130) to the device (140) operating at temperature reservoir B (150) can be adjusted/actuated/switched or varied in several manners: a) by engaging one or more of the different material discrete current elements ($N_1 \ldots N_m$) via the one or more actuators (80—not shown), b) by adjusting/actuating/switching the axial length ($L_n$) 230) of the current element (10), and c) by adjusting/actuating/switching the electrical/thermal conductivity of the material comprising the current element (10). All of the discrete current elements (10) shown in this embodiment can be disconnected from either the upper or lower electrical bus or both, to electrically and thermally isolate the power source (120) from the device (140) if desired.

33. Detailed Description of FIG. 8a

Shown in FIG. 8a on the top is a 2-dimensional cross sectional view of a simplified current element (10) of triangular shape. The current element shown in FIG. 8a top is comprised of two different materials (material 1 and material 2) (240) with each of the two materials (240) possessing different electrical and thermal conductivities (e.g. Cu and stainless steel, Cu and brass, stainless and brass, etc.). Each of the two materials (240) has its own optimized cross sectional area $A_1$ (210) and $A_2$ (210). The current element (10) may be comprised of two or more materials (240). In this embodiment, $material_1$ and $material_2$ are electrically and/or thermally connected in parallel.

34. Detailed Description of FIG. 8b

Shown in FIG. 8b on the bottom left is a 2-dimensional cross sectional view of a simplified current element (10) of circular shape. The current element shown in FIG. 8b bottom left is comprised of two different materials (240). Each of the two materials comprising the current element (10) is designed to have different electrical/thermal conductivities (e.g. Cu and stainless steel, Cu and brass, stainless and brass, etc.) from the other. Each material (240) comprising the current element (10) has its own optimized cross sectional area $A_1$ (210) and $A_2$ (210). In this embodiment, the current elements (10) may be comprised of two or more materials (240). In this embodiment, $material_1$ and $material_2$ are electrically and/or thermally connected in parallel. $Material_1$ and $material_2$ may or may not be electrically isolated from one another depending upon the application.

35. Detailed Description of FIG. 8c

Shown in FIG. 8c on the bottom right is a 2-dimensional cross sectional view of a simplified current element (10) of square shape. The current element shown in FIG. 8c bottom right is comprised of a plurality of different materials (240). Each of the different materials comprising the current element (10) is designed to have different electrical/thermal conductivity (e.g. Cu/brass/stainless steel) from one another. Each of the materials (240) has an optimized cross sectional area $A_1, A_2, \ldots A_n$ (210). Depending upon the application, other cross sectional shaped current elements (10) are possible including but not limited to: rectangular, hexagonal, octagonal, among other cross sectional shapes. In this embodiment, $material_1$ and $material_2$ are electrically and/or thermally connected in parallel.

36. Detailed Description of FIG. 9a

Shown in FIG. 9a on the top is a 2-dimensional cross sectional view of a simplified gas cooled current element (10) of triangular shape. The current element shown in FIG. 9a top is a gas cooled current element (10) showing multiple cooling channels (250). The size, shape, number, location, etc. of cooling channels (250) comprising the current element (10), etc. is optimized for a particular application.

37. Detailed Description of FIG. 9b

Shown in FIG. 9b on the bottom left is a 2-dimensional cross sectional view of a simplified gas cooled variant of the current element (10) having a circular shape. The current element shown in FIG. 9b bottom left is a gas cooled current element (10) showing multiple cooling channels (250). The size, shape, number, location, etc. of cooling channels (250) comprising the current element (10) is optimized for a particular application.

38. Detailed Description of FIG. 9c

Shown in FIG. 9c on the bottom right is a 2-dimensional cross sectional view of another variant of a convectively cooled current element (10) having a square shape. The current element shown in FIG. 9c bottom right is a convectively cooled current element (10) showing multiple cooling channels (250). The size, shape, number, location, etc. of cooling channels (250), etc. are optimized for a particular application. Depending upon the application, other cross sectional shapes for gas cooled current elements (10) are possible including but not limited to: rectangular, hexagonal, octagonal, etc.

39. Detailed Description of FIG. 10

Shown in FIG. 10 is a 2-dimensional cross-sectional view of a simplified electrical schematic of the intelligent current lead device (170) showing a continuous type current element (10) and the upper and lower electrical bus (20 and 30). The other major components of the current lead have been omitted from this figure for clarity and presentation purposes only. The continuous type current element (10) shown in FIG. 10 has a cross sectional area (210) that varies along its axial length (230) given by $A_i(z)$ (270). The axial distance between the upper and lower electrical bus (20 and 30) varies as $L_i(z)$ (260) depending upon the desired cross sectional area $A_i$ to meet the electrical and thermal load. In this embodiment, either the current element (10), or the upper and/or lower bus (20 and 30), or a combination of both are adjusted/actuated/switched via the actuator (80—not shown) depending upon the magnitude of the current flow (110) as measured by the diagnostic instrumentation (100). The control logic (200) of the intelligent current lead (170) adjusts/actuates/switches the relative position of the continuous current element (10) to optimize the heat transfer and current carrying capacity. Multiple continuous current elements (10—not shown) may be used to satisfy the required operational conditions. In this embodiment, both the length $L_i(z)$-(260) and the cross section area $A_i(z)$-(270) can be adjusted/actuated/switched depending upon the desired heat transfer and current carrying capacity of the current elements (10) connecting the power source operating (120) at temperature reservoir A (130) and the machine or device (140) operating at temperature reservoir B (150). Higher current flows (110) require larger cross sectional area $A_i(z)$-(270), while smaller current flows (110) require smaller $A_i$(270). In the embodiment shown in FIG. 10, the continuous type current element (10) is comprised of a single solid homogenous material. Other variants of the continuous current element are possible.

40. Detailed Description of FIG. 11

Shown in FIG. 11 is a 2-dimensional cross-sectional view of a simplified electrical schematic of the intelligent current lead (170) showing a continuous type current element (10) and the upper and lower electrical buses (20 and 30). The other major components of the current lead have been omitted from this figure for clarity and presentation purposes only. The continuous type current element (10) shown in FIG. 11 has a cross sectional area (210) that varies along its axial length (230) as $A_i(z)$ (270). The axial distance between the upper and lower electrical bus (20 and 30) varies as $L_i(z)$ (260) depending upon the desired cross sectional area $A_i$. In this embodiment, the either the current element (10), or the upper and/or lower bus (20 and 30), or a combination of both are adjusted/actuated/switched via the actuator (80—not shown). In this embodiment, both the length $L_i$ (260) and the cross section area $A_i$ (210) can be adjusted/actuated/switched depending upon the desired heat transfer and current carrying capacity of the current elements (10) connecting the power source (120) operating at temperature reservoir A (130) and the machine or device (140) operating at temperature reservoir B (150). Multiple continuous current elements (10—not shown) may be used to satisfy the required operational conditions. In this embodiment, the continuous type current element (10) is comprised of a plurality of solid homogenous materials with each of the materials possessing a different electrical/thermal conductivity. The length $L_1, L_2 \ldots L_n$, (230), uniform cross sectional area $A_i$ (210) and materials (240) are optimized for a given application. An example, of such a continuous type current element (10) shown in this embodiment may be one in which the highest electrical/thermal conductivity and largest cross sectional area is comprised of Cu or Ag, while the middle section of the current element (10) is comprised of slightly lower electrical/thermal conductivity such as brass or bronze, and the smallest cross sectional area located at the bottom of the continuous current element (10) may be comprised of still lower electrical/thermal conductivity such as stainless steel. In this embodiment, the length $L_i(z)$ (260), cross sectional area $A_i(z)$ (270), and material (240) may be adjusted/actuated/switched depending upon the application. The discrete current elements (10) shown in this embodiment may be completely disengaged from either the upper or lower electrical bus (20 and 30) or both, for voltage and thermal isolation of the power source (120) from the device (140) if desired.

41. Detailed Description of FIG. 12

Shown in FIG. 12 is a 2-dimensional cross-sectional view of a simplified electrical schematic of the intelligent current lead device (170) showing a continuous type current element (10) and the upper and lower electrical buses (20 and 30). The other major components of the current lead have been omitted from this figure for clarity and presentation purposes only. The continuous type current element shown in FIG. 12 has a cross sectional area (210) that varies along its axial length (230) as $A_i(z)$ (270). The axial distance between the upper and lower electrical buses (20 and 30) varies as $L_i(z)$ (260) depending upon the desired cross sectional area $A_i$. In this embodiment, either the current element (10), or the upper and/or lower bus (20 and 30), or a combination of both are adjusted/actuated/switched via the actuator (80—not shown). In this embodiment, both the length $L_i$ (260) and the cross section area $A_i$-(270) can be adjusted/actuated/switched depending upon the desired heat transfer and current carrying capacity of the current element (10) connecting the power source (12) operating at temperature reservoir A (130) and machine or device operating at temperature reservoir B (150). In this embodiment, the continuous type current element (10) is comprised of a plurality of hollow (i.e. finite wall thickness) materials (240) with each of the materials possessing a different electrical/thermal conductivity. The length $L_1, L_2 \ldots L_n$ (230), uniform cross sectional area $A_i$ (210), and materials (240) of the current element (10) are optimized for a given application. Multiple continuous current elements (10—not shown) may be used to satisfy the required operational conditions. An example, of such a continuous type current element (10) may be one in which the highest electrical/thermal conductivity and largest cross sectional area section is comprised of Cu or Ag, while the middle section of the current element (10) possessing slightly lower electrical/thermal conductivity is comprised of brass or bronze, and the smallest cross sectional area portion at the bottom of the current element is comprised of still lower electrical/thermal conductivity such as stainless steel. In this embodiment, the length $L_i(z)$ (230), cross sectional area $A_i(z)$ (210), and material (240) can be adjusted/actuated/switched depending upon the application. The discrete current element (10) shown in this embodiment may be completely disengaged from either the upper or lower electrical bus (20 and 30) or both, for voltage and thermal isolation of the power source (120) from the device (140) if desired.

42. Detailed Description of FIG. 13

Shown in FIG. 13 is a 2-dimensional cross-sectional view of a simplified electrical schematic of the intelligent current lead device (170) showing a discrete type current element (10) electrically connected to the upper and lower electrical buses (20 and 30). The other major components of the current lead device (170) have been omitted from this figure for clarity and presentation purposes only. In this embodiment, a given current element (10) is comprised of a plurality of different materials along its axial length (230) with each material possessing a different electrical/thermal conductivity. In this embodiment, the axial length of each section of the current element $L_i$ and cross sectional area $A_i$ is similar. In this embodiment the total length (280) of the current element (10), is comprised of the sum of all the individual sections. In this embodiment, the section of the current element (10) electrically connected (i.e. engaged) to the upper and lower electrical bus (20 and 30) varies depending upon the setting of the actuator (80—not shown). Four different axial positions (290) are shown in FIG. 13, although more are possible if desired. In this embodiment, the actuator (80—not shown) has multiple positions so that for a given current flow (110) as measured by the diagnostic instrumentation and sensors (100—not shown), the optimized material (Material$_1$ ... Material$_j$) (240) can be moved into position as necessary. In this embodiment for example, the upper section of the current element (10) may be comprised of material (Material$_1$) possessing the highest electrical/thermal conductivity (e.g. Cu, Ag, Au, etc.), while the middle section of the current element may be comprised of material (Material$_2$) possessing slightly lower electrical/thermal conductivity, while the bottom section of the current element (10) may be comprised of material (Material$_3$) possessing still lower electrical/thermal conductivity, and so on. The discrete current element (10) shown in this embodiment may be completely disengaged from either the upper or lower electrical bus (20 and 30) or both, for voltage and thermal isolation of the power source (120) from the device (140) if desired.

43. Detailed Description of FIG. 14

Shown in FIG. 14 is a 2-dimensional cross-sectional view of a simplified electrical schematic of the intelligent current lead (170) showing a discrete type current element (10) electrically connected to the upper and lower electrical bus (20 and 30). The other major components of the current lead device (170) have been omitted from this figure for clarity and presentation purposes only. In this embodiment, a given current element (10) is comprised of a plurality of different materials (240) along its axial length (230) with each material possessing a different electrical/thermal conductivity. In this embodiment, the axial length (230) of each section of the current element $L_i$ is similar, while the cross sectional area (210) for each section $A_i$ is different. In this embodiment the total length (280) of the current element (10), is comprised of the sum of all the individual sections. In this embodiment, the section of the current element (10) electrically connected (i.e. engaged) to the upper and lower electrical bus (20 and 30) varies depending upon the setting of the actuator (80—not shown). In this embodiment, the actuator (80—not shown) has multiple positions so that for a given current flow (110) as measured by the diagnostic instrumentation and sensors (100—not shown), the optimized material (Material$_1$ ... Material$_j$) (240) can be moved into position as necessary. Four different axial positions (290) are shown in FIG. 14, although more are possible if desired. In this embodiment for example, the upper section of the current element (10) may be comprised of material (Material$_1$) possessing the highest electrical/thermal conductivity (e.g. Cu, Ag, Au, etc.) and possess the largest cross sectional area $A_1$, while the middle section of the current element may be comprised of material (Material$_2$) possessing slightly lower electrical/thermal conductivity with a smaller cross sectional area $A_2$, while the bottom section of the current element may be comprised of material (Material$_3$) possessing still lower electrical/thermal conductivity with the smallest cross sectional area $A_3$, and so on. The discrete current element (10) shown in this embodiment may be completely disengaged from either the upper or lower electrical bus (20 and 30) or both, for voltage and thermal isolation of the power source (120) from the device (140) if desired.

44. Detailed Description of FIG. 15

Shown in FIG. 15 is a 2-dimensional cross-sectional view of a simplified electrical schematic of the intelligent current lead device (170) showing multiple discrete type current elements (10) ranging in number from $N_1$ to $N_m$ (220) electrically connected in parallel to the upper and lower electrical bus (20 and 30). The other major components of the current lead device (170) have been omitted from this figure for clarity and presentation purposes only. In this embodiment, a given current element (10) is comprised of a plurality of different materials (240) along its axial length (230) with each material possessing a different electrical/thermal conductivity. In this embodiment, the axial length of each section of the current element $L_i$ (230) is similar, while the cross sectional area (210) for each section $A_i$ is different. In this embodiment, the total length (280) of the current element (10), is comprised of the sum of all the individual sections. In this embodiment, the section of the current element (10) electrically connected (i.e. engaged) to the upper and lower electrical bus (20 and 30) varies depending upon the setting of the actuator (80—not shown). In this embodiment, the actuator (80—not shown) has multiple positions so that for a given current flow (110) as measured by the diagnostic instrumentation and sensors (100—not shown), the optimized material (Material$_1$ ... Material$_j$) (240) can be moved into the appropriate position as necessary. Only one axial position (290) is shown in FIG. 15 for simplicity, although more positions (290) are possible if desired. In this embodiment for example, the upper section of the current element (10) may be comprised of material (Material$_1$) possessing the highest electrical/thermal conductivity (e.g. Cu, Ag, Au, etc.) and possess the largest cross sectional area $A_1$, while the middle section of the current element (10) may be comprised of material (Material$_2$) possessing slightly lower electrical/thermal conductivity with a smaller cross sectional area $A_2$, while the bottom section of the current element (10) may be comprised of material (Material$_3$) possessing still lower electrical/thermal conductivity with the smallest cross sectional area $A_3$, and so on. The discrete current elements (10) shown in this embodiment may be completely disengaged from either the upper or lower electrical bus (20 and 30) or both, for voltage and thermal isolation of the power source (120) from the device (140) if desired.

45. Detailed Description of FIG. 16

Shown in FIG. 16 is a 2-dimensional cross-sectional view of a simplified electrical schematic of the intelligent current lead device (170) showing a discrete type current element (10) electrically connected to the upper and lower electrical bus (20 and 30). The other major components of the intelligent current lead device (170) have been omitted from this figure for clarity and presentation purposes only. In this embodiment, a given current element (10) is comprised of a plurality of different materials (240) along its axial length (230) with each material possessing a different electrical/thermal conductivity. In this embodiment, both the axial length $L_i$ (230) of each section of the current element (10) and the cross sectional area $A_i$ (210) for each section of the current element (10) are different. In this embodiment, the section of the current element (10) electrically connected (i.e. engaged) to the upper and lower electrical bus (20 and 30) varies depending upon the setting of the actuator (80—not shown). In this embodiment, the actuator (80—not shown) has multiple positions (290) so that for a given current flow (110) as measured by the diagnostic instrumentation and sensors (100—not shown), the optimized material (240) (Material$_1$ ... Material$_j$) can be moved into position (290) as necessary. Three different axial positions (290) are shown in FIG. 16, although more are possible if desired. In this embodiment for example, the upper section of the current element (10) may be comprised of material (Material$_1$) possessing the highest electrical/thermal conductivity (e.g. Cu) and possess the largest cross sectional area $A_1$, while the middle section of the current element may be comprised of material (Material$_2$) possessing slightly lower electrical/thermal conductivity with a smaller cross sectional area $A_2$, while the bottom section of the current element may be comprised of material (Material$_3$) possessing still lower electrical/thermal conductivity with the smallest cross sectional area $A_3$, and so on. The discrete current element (10) shown in this embodiment may be completely disengaged from either the upper or lower electrical bus or both for voltage and thermal isolation of the power source (120) from the device (140) if desired.

46. Detailed Description of FIG. 17

Shown in FIG. 17 is a 2-dimensional cross-sectional view of a simplified electrical schematic of the intelligent current lead (170) showing a discrete current element (10) electrically connected to the lower electrical bus (30). The other major components of the current lead have been omitted from this figure for clarity and presentation purposes only. In this embodiment, the current element (10) is moved from position (290) to position (290) via a passive actuator (300). In this embodiment, a given current element (10) is comprised of a plurality of different materials (240) along its axial length (230) with each material possessing a different electrical/thermal conductivity. In this embodiment, both the axial length ($L_i$) of each section of the current element (10) and the cross sectional area ($A_i$) (210) for each section of the current element are different. In this embodiment, the discrete current element or multiple elements is moved from position to position via a passive actuator (300), such as inductor which acts as a spring that contracts as the current flow (110) increases and relaxes/expands as the current flow (110) decreases. In this embodiment, the passive actuator (300) has multiple positions so that for a given current flow (110), the optimized material (Material$_1$ ... Material$_j$) can be moved into position (290) as necessary. Three different axial positions (290) are shown in FIG. 17, although more are possible if desired. In this embodiment for example, the lower section of the current element (10) may be comprised of material (Material$_1$) possessing the highest electrical/thermal conductivity (e.g. Cu) and possess the largest cross sectional area A$_1$, while the middle section of the current element (10) may be comprised of material (Material$_2$) possessing slightly lower electrical/thermal conductivity with a smaller cross sectional area A$_2$, while the top section of the current element (10) may be comprised of material (Material$_3$) possessing still lower electrical/thermal conductivity with the smallest cross sectional area A$_3$, and so on. The discrete current element (10) shown in this embodiment may be completely disengaged from either the upper or lower electrical bus (20 and 30) or both for voltage and thermal isolation of the power source (120) from the device (140) if desired.

47. Detailed Description of FIG. 18

Shown in FIG. 18 is a 2-dimensional cross-sectional view of a simplified electrical schematic of the intelligent current lead device (170) showing a discrete current element (10) electrically connected to the lower electrical bus (30). The other major components of the intelligent current lead device (170) have been omitted from this figure for clarity and presentation purposes only. In this embodiment, the current element (10) is moved from position to position via a passive actuator (300). In this embodiment, a given current element (10) is comprised of a plurality of different materials along its axial length with each material possessing a different electrical/thermal conductivity. In this embodiment, both the axial length (L$_i$) of each section of the current element and the cross sectional area (A$_i$) for each section of the current element are different. In this embodiment, the discrete current element (10) or multiple elements is moved from position to position via a passive actuator (300), such as inductor which acts as a spring that contracts as the current flow (110) increases and relaxes/expands as the current flow (110) decreases. In this embodiment, magnetic permeable material (310) has been added to the current element (10) to enhance the electromagnetic force and response time between the passive actuator (300) and the current element (10). In this embodiment, the passive actuator (300) has multiple positions so that for a given current flow (110), the optimized material (Material$_1$ ... Material$_j$) can be moved into position as necessary. Three different axial positions (290) are shown in FIG. 18, although more are possible if desired. In this embodiment for example, the lower section of the current element (10) may be comprised of material (Material$_1$) possessing the highest electrical/thermal conductivity (e.g. Cu) and possess the largest cross sectional area A$_1$, while the middle section of the current element (10) may be comprised of material (Material$_2$) possessing slightly lower electrical/thermal conductivity with a smaller cross sectional area A$_2$, while the top section of the current element (10) may be comprised of material (Material$_3$) possessing still lower electrical/thermal conductivity with the smallest cross sectional area A$_3$, and so on. The discrete current element (10) shown in this embodiment may be completely disengaged from either the upper or lower electrical bus (20 and 30) or both for voltage and thermal isolation of the power source (120) from the device (140) if desired.

48. Note Regarding FIGS.

There are multiple adjustable/actuate-able/switchable parameters settings of the various embodiments of the intelligent current lead device (170) described in this disclosure including but not limited to: current element axial length (230), current element cross sectional area (210), current element number (N$_m$) (220), current element material (240) and hence thermal/electrical conductivity, current element conduction cooling, current element gas cooling, discrete type current elements, continuous type current elements, actively controlled actuators, passively controlled actuators, among other adjust/actuate/switchable parameters. Several different combinations and permutations have been shown in the FIGS. 1-18 of this disclosure; however, it is not possible to illustrate all possible embodiments which result from the various permutations and combinations described in this disclosure. It is understood by one skilled in the art that the intelligent current lead device (170) described in this disclosure can be designed to meet the desired application of the intelligent current lead device and operational methods thereof.

The invention claimed is:

1. A current lead device adapted to selectively provide electrical continuity and thermal continuity between at least one power source in a first temperature reservoir at a first temperature and at least one device in a second temperature reservoir at a second temperature, the current lead device comprising:
a vessel having a first end and a second end, the vessel enclosing an environment,
an upper electrical connection at the first end of the vessel, the upper electrical connection having a first end disposed outside of the vessel and a second end disposed inside of the vessel, the upper electrical connection adapted to electrically connect to the at least one power source at the first end of the upper electrical connection,
an upper voltage bushing that electrically isolates the upper electrical connection from the vessel,
an upper electrical bus electrically connected to the second end of the upper electrical connection,
current elements, where each of the current elements have a first end and a second end, the first end selectively electrically engaged with the upper electrical bus,
a lower electrical bus selectively electrically engaged with the second end of the current elements,
a lower electrical connection at the second end of the vessel, the lower electrical connection having a first end disposed inside of the vessel and a second end disposed outside of the vessel, the lower electrical connection adapted to electrically connect to the at least one device at the second end of the lower electrical connection,
a lower voltage bushing that electrically isolates the lower electrical connection front the vessel,
actuators that are configured to selectively electrically engage and disengage the first ends of the current elements to the upper electrical bus and the second ends of the current elements to the lower electrical bus, and
diagnostic sensors disposed within the vessel adapted to sense properties of at least one of the upper electrical bus, the lower electrical bus, actuators, and the current elements.

2. The current lead device of claim 1, configured to electrically and thermally connect the at least one power sources operating in the first temperature reservoir with the at least one device operating in the second temperature reservoir, wherein heat always flows from a higher temperature reservoir to a lower temperature reservoir.

3. The current lead device of claim 1, wherein the amount of heat flow between the at least one power source and the at least one device is adjusted by selectively engaging and disengaging at least one of the current elements using at least one of the actuators.

4. The current lead device of claim 1, wherein the current carrying capacity between the at least one power source and the at least one device is adjusted by selectively engaging and disengaging at least one of the current elements using at least one of the actuators.

5. The current lead device of claim 1, wherein the current elements are optimized to maximize current carrying capacity while simultaneously minimizing heat flow from the higher temperature reservoir to the lower temperature reservoir.

6. The current lead device of claim 1, wherein at least one of the current elements is disengaged by at least one of the actuators to electrically isolate at least one of the power sources from at least one of the devices, to a rated voltage level.

7. The current lead device of claim 1, wherein at least one of the current elements is disengaged by at least one of the actuators to thermally isolate at least one of the power source from at least one of the devices, to a rated heat leak level.

8. The current lead device of claim 1, wherein the at least one power source comprises at least one of a single-phase AC power source, a three-phase AC power source, and a DC power source.

9. The current lead device of claim 1, wherein at least one of the current elements is cooled by at least one of thermal conduction, gas convection, and vapor boil off from a liquid cryogen.

10. The current lead device of claim 1, wherein at least one or of a heat flow and a current carrying capacity is adjusted by varying at least one of,
a mass flow rate of a coolant gas flowing through at least one of the current elements,
a mass flow rate of a boil off vapor flowing through at least one of the current elements,
selectively engaging and disengaging at least one of the current elements using at least one of the actuators.

11. The current lead device of claim 1, wherein at least one of the current elements is configured for at least one of gas flow and vapor boil off between at least one of the power sources and at least one of the devices.

12. The current lead device of claim 1, wherein at least one of the current elements is configured with at least one internal cooling channel, at least one of whose size, shape, number, and location is optimized for a given application.

13. The current lead device of claim 1, wherein at least one of the actuator is at least one of an electric switch, magnetic switch, piezo-electric switch, magneto-strictive switch, electric motor, magnetic motor, pneumatic motor, pneumatic piston or cylinder, solenoid, linear electric motor, hydraulic motor or piston, wax motor, screw drive, rack and pinion, gear drive, belt drive, and linkage.

14. The current lead device of claim 1, wherein at least one of the actuators is a passive actuator.

15. The current lead device of claim 14, wherein at least one of the passive actuators is at least one of an inductor, capacitor, resistor, spring, wax motor, piezoelectric, bimetallic spring, and magneto-strictive.

16. The current lead device of claim 1, wherein at least one of the current elements is comprised of a single homogenous material including copper, copper-nickel, aluminum, aluminum-alloy, silver, gold, brass, tin, nickel, bronze, stainless steel, permeable steel, carbon, carbon fiber, and SiC.

17. The current lead device of claim 1, wherein at least one of the current elements is comprised of a plurality of materials including at least one of copper, copper-nickel, silver, gold, tin, nickel, aluminum, aluminum-alloy, brass, bronze, stainless steel, permeable steel, carbon, carbon fiber, and SiC.

18. The current lead device of claim 1, wherein at least one of the current elements is comprised of a plurality of different materials that are electrically connected in at least one of series and parallel.

19. The current lead device of claim 1, wherein at least one of the current elements is comprised of a plurality of different materials that are electrically isolated one from another but are thermally connected one to another.

20. The current lead device of claim 1, wherein at least one of the current elements is comprised of at least one of low temperature superconductors and high temperature superconductors.

21. The current lead device of claim 1, wherein at least one of the current elements is coated with a high conductivity material including at least one of gold, silver, nickel, and solder.

22. The current lead device of claim 1, wherein at least one of the current elements is coated with a low friction lubricant including at least one of grease, wax, Ag, Cu, Au, MoS2, metallic powder, and graphite.

23. The current lead device of claim 1, wherein an axial length of at least one of the current elements is adjusted by at least one of the actuators.

24. The current lead device of claim 1, wherein a cross-sectional area of at least one of the current elements is a hollow tube.

25. The current lead device of claim 1, wherein at least one of the current elements is comprised of a single solid homogenous material along its axial length.

26. The current lead device of claim 1, wherein at least one of the current elements is comprised of a plurality of different solid homogenous materials along its axial length.

27. The current lead device of claim 1, wherein at least one of the current elements is comprised of a single hollow tube of homogenous material along its axial length.

28. The current lead device of claim 1, wherein a cross-sectional area of at least one of the current elements is comprised of at least one homogenous material.

29. The current lead device of claim 1, wherein a cross-sectional shape of at least one of the current elements is at least one of round, square, rectangular, hexagonal, ellipsoidal, and multi-sided polygonal.

30. The current lead device of claim 1, wherein the diagnostic sensors comprise at least one of a voltage tap, current transducer, vacuum pressure sensor, temperature sensor, mass flow rate sensor, and pressure sensor.

31. The current lead device of claim 1, wherein at least one of the current elements is thermally and electrically isolated from at least one of the power sources.

32. The current lead device of claim 1, wherein at least one of the current elements is thermally and electrically isolated from at least one of the power sources and at least one of the devices.

33. The current lead device of claim 1, wherein at least one of the current elements is operating at a room temperature and is thermally and electrically isolated from at least one of the devices that is operating at a cold cryogenic temperature.

34. The current lead device of claim 1, wherein at least one of the current elements is operating at a cold cryogenic temperature and is thermally and electrically isolated from at least one of the power sources that is operating at an ambient room temperature.

35. The current lead device of claim 1, further comprising a program logic controller connected to the diagnostic sensors and at least one of the actuators.

36. A current lead device comprising:
current elements, and
actuators that are configured to use with the current elements,
wherein a cross-sectional area of at least one of the current elements is comprised of at least one cooling channel and a number, size, shape, and location of the at least one cooling channel is optimized for an application.

37. The current lead device of claim 26, wherein at least one the cooling channels is a hollow tube of a fixed wall thickness along its axial length with a mesh internal structure.

38. The current lead device of claim 36, wherein at least one of the cooling channels is a hollow tube of a variable wall thickness along its axial length with a mesh internal structure.

39. The current lead device of claim 26, wherein at least one of the cooling channels is a hollow tube of a variable wall thickness along its axial length.

40. A current lead device comprising:
current elements,
actuators that are configured to use with the current elements, and
diagnostic sensors comprising at least one of a voltage tap, current transducer, vacuum pressure sensor, temperature sensor, mass flow rate sensor, and pressure sensor,
wherein at least one of the current elements is at least one of selectively engaged, and disengaged, and adjusted by at least one of the actuators based at least in part upon values measured by the diagnostic sensors.

41. A method of transferring electrical power from a source or load operating at one temperature reservoir to a machine or device operating at another temperature reservoir comprising: measuring the voltage, temperature, gas/vapor flow, or current flowing from the source or a combination of measurements, adjusting the current lead configuration based upon the voltage, temperature, gas/vapor flow and/or current measurement, conducting electricity across at least one or more current elements and powering a device with electricity.

* * * * *